(12) United States Patent
Tuguma

(10) Patent No.: US 12,013,714 B2
(45) Date of Patent: Jun. 18, 2024

(54) VEHICLE OPERATION PEDAL DEVICE

(71) Applicant: TOYODA IRON WORKS CO., LTD., Aichi (JP)

(72) Inventor: Tomohiro Tuguma, Aichi (JP)

(73) Assignee: TOYODA IRON WORKS CO., LTD., Aichi (JP)

( * ) Notice: Subject to any disclaimer, the term of this patent is extended or adjusted under 35 U.S.C. 154(b) by 0 days.

(21) Appl. No.: 17/998,267

(22) PCT Filed: Nov. 19, 2020

(86) PCT No.: PCT/JP2020/043154
§ 371 (c)(1),
(2) Date: Nov. 9, 2022

(87) PCT Pub. No.: WO2021/234982
PCT Pub. Date: Nov. 25, 2021

(65) Prior Publication Data
US 2023/0221749 A1 Jul. 13, 2023

(30) Foreign Application Priority Data
May 19, 2020 (JP) .................................. 2020-087670

(51) Int. Cl.
*G05G 1/38* (2008.04)
*B60K 26/02* (2006.01)
(Continued)

(52) U.S. Cl.
CPC .............. *G05G 1/38* (2013.01); *B60K 26/02* (2013.01); *B60T 7/042* (2013.01); *G05G 1/44* (2013.01); *B60K 23/02* (2013.01)

(58) Field of Classification Search
None
See application file for complete search history.

(56) References Cited

U.S. PATENT DOCUMENTS

| 11,852,473 B2* | 12/2023 | Tsuguma | ................. G05G 1/44 |
| 2003/0112003 A1* | 6/2003 | Pfaffenberger | .......... G01B 7/30 324/207.2 |

(Continued)

FOREIGN PATENT DOCUMENTS

| JP | 2004-090755 A | 3/2004 |
| JP | 2007-256122 A | 10/2007 |

(Continued)

OTHER PUBLICATIONS

International Search Report dated Jan. 19, 2021 filed in PCT/JP2020/043154.

(Continued)

*Primary Examiner* — Vicky A Johnson
(74) *Attorney, Agent, or Firm* — Pearne & Gordon LLP

(57) ABSTRACT

To provide a vehicle operating pedal apparatus configured in such a manner that a magnet mounted on an operating pedal to detect the angle of rotation of the operating pedal resists being detached from the operating pedal. A vehicle operating pedal apparatus 10A includes: an operating pedal 12A pivotably supported by a support member; a magnet 58A used to detect the angle of rotation of the operating pedal 12A; a magnet holder 54A housing the magnet 58A in an engaged state; a first snap-fit portion 74A and a first mounting hole 78A configured to fix the magnet holder 54A to the operating pedal 12A with a pressing force in a Y direction; and a second snap-fit portion 76A and a second mounting hole 80A configured to fix the magnet holder 54A to the operating pedal 12A with a pressing force in a Z direction different from the Y direction.

4 Claims, 42 Drawing Sheets

(51) Int. Cl.
*B60T 7/04* (2006.01)
*G05G 1/44* (2008.04)
*B60K 23/02* (2006.01)

(56) References Cited

U.S. PATENT DOCUMENTS

| | | | |
|---|---|---|---|
| 2007/0193401 A1* | 8/2007 | Campbell | G05G 1/38 74/560 |
| 2011/0197738 A1 | 8/2011 | Groerzinger et al. | |
| 2016/0102997 A1 | 4/2016 | Wurn et al. | |

FOREIGN PATENT DOCUMENTS

| | | |
|---|---|---|
| JP | 2008-201312 A | 9/2008 |
| JP | 2009-248612 A | 10/2009 |
| JP | 3167538 U | 4/2011 |
| JP | 2017-537306 A | 12/2017 |
| JP | 2019-016200 A | 1/2019 |

OTHER PUBLICATIONS

Office Action issued on Dec. 22, 2023 for the corresponding Chinese Patent Application No. 202080099854.3.

* cited by examiner

FIG. 8
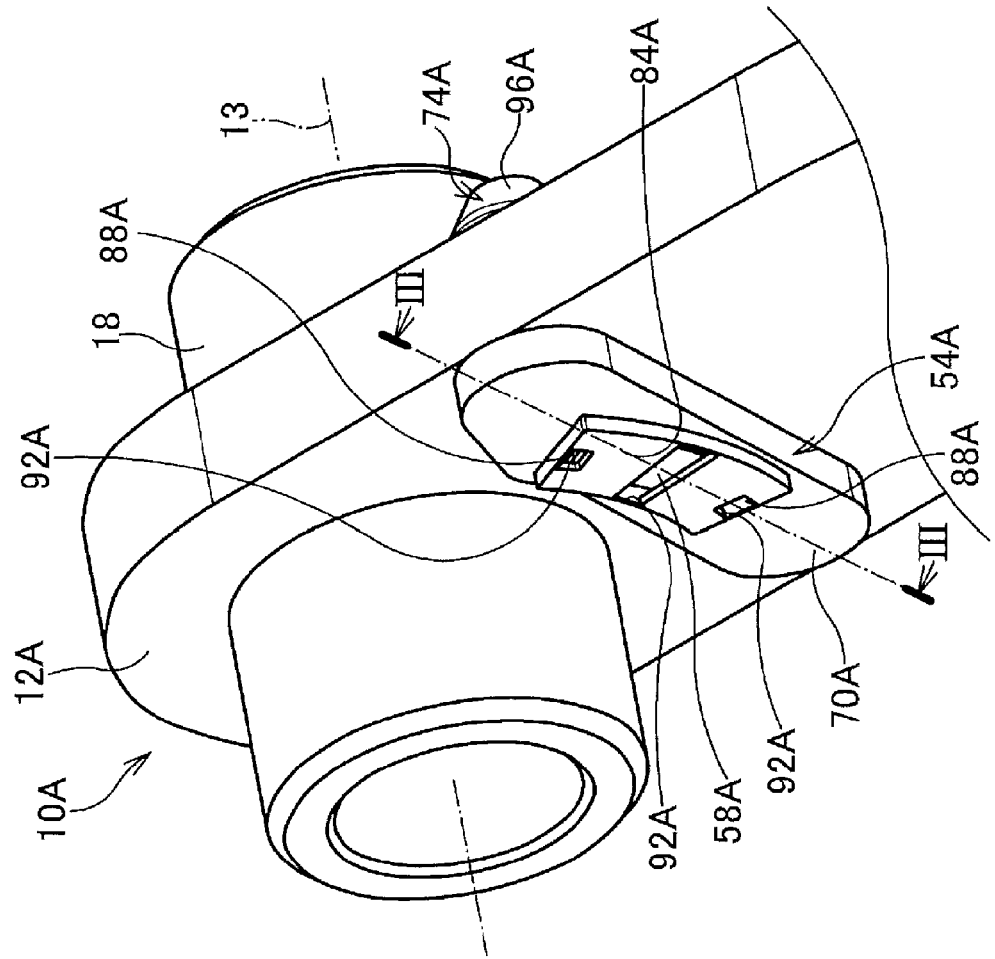
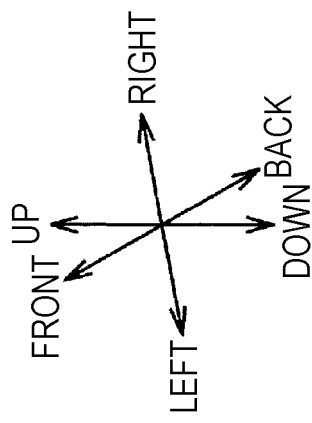

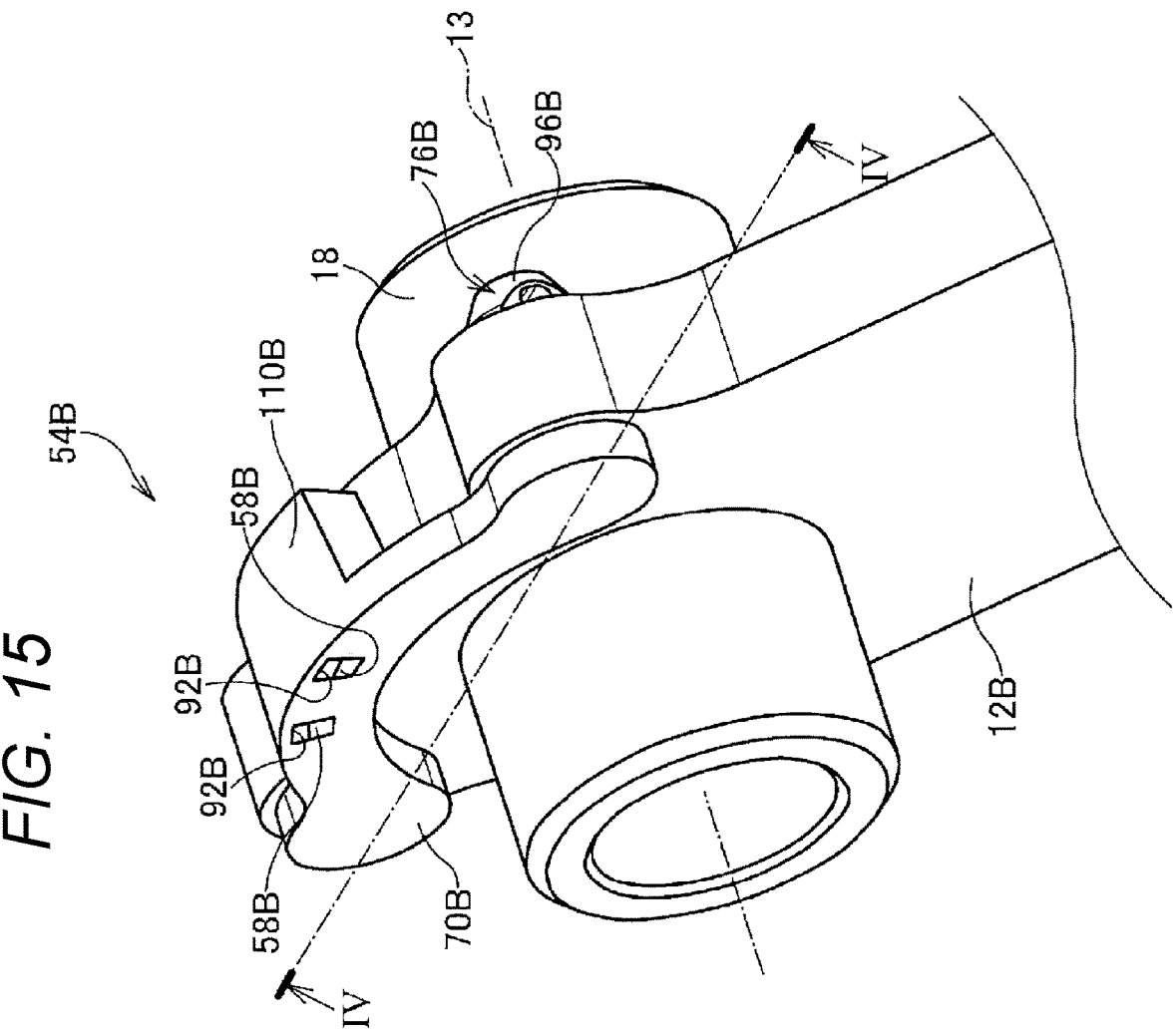
FIG. 15
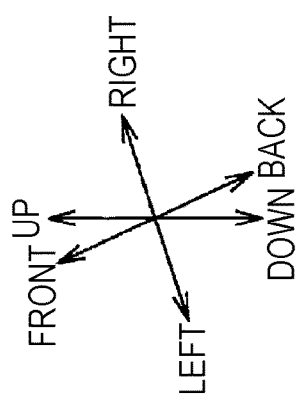

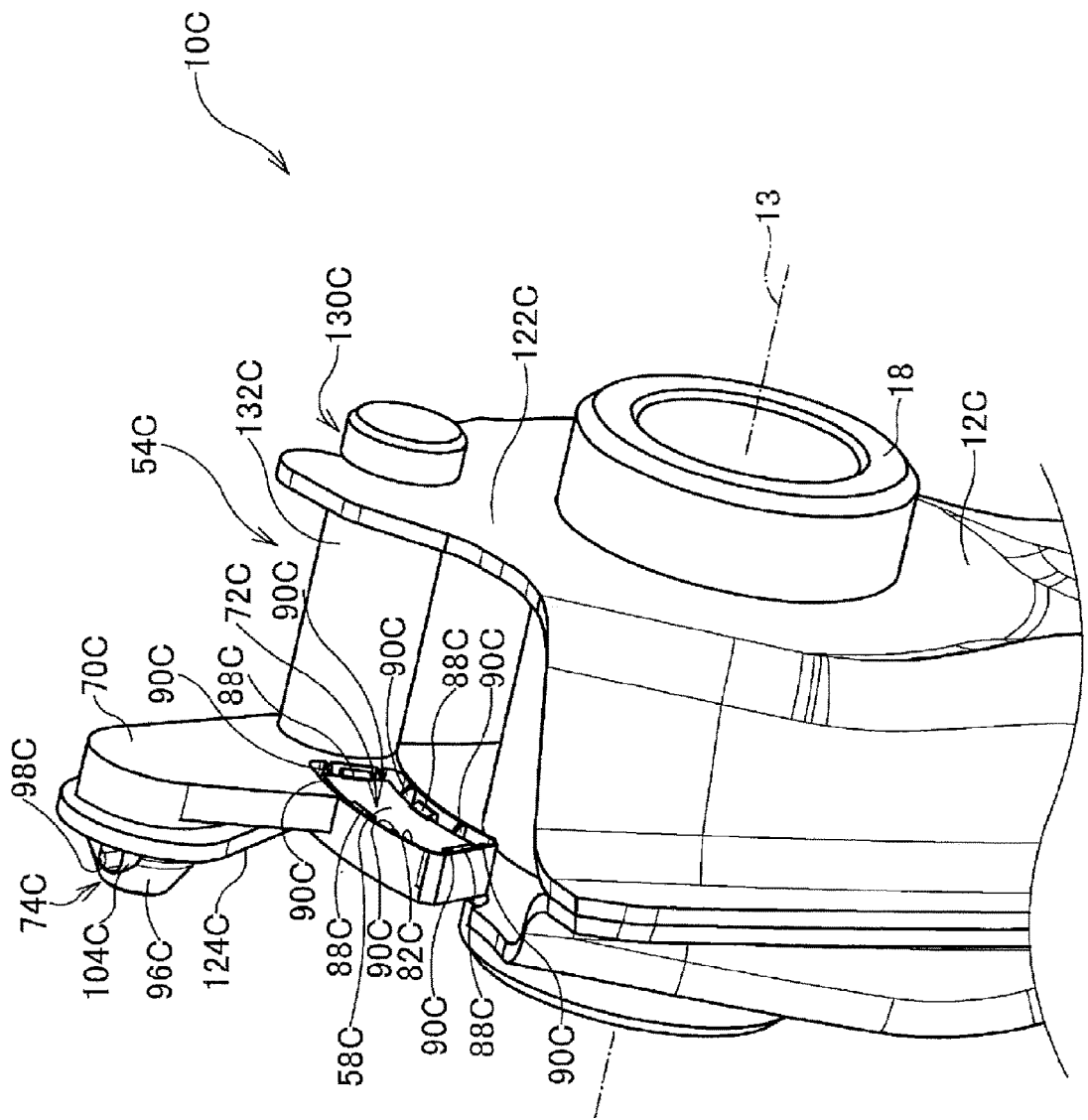
FIG. 22
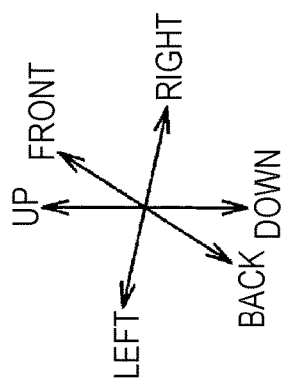

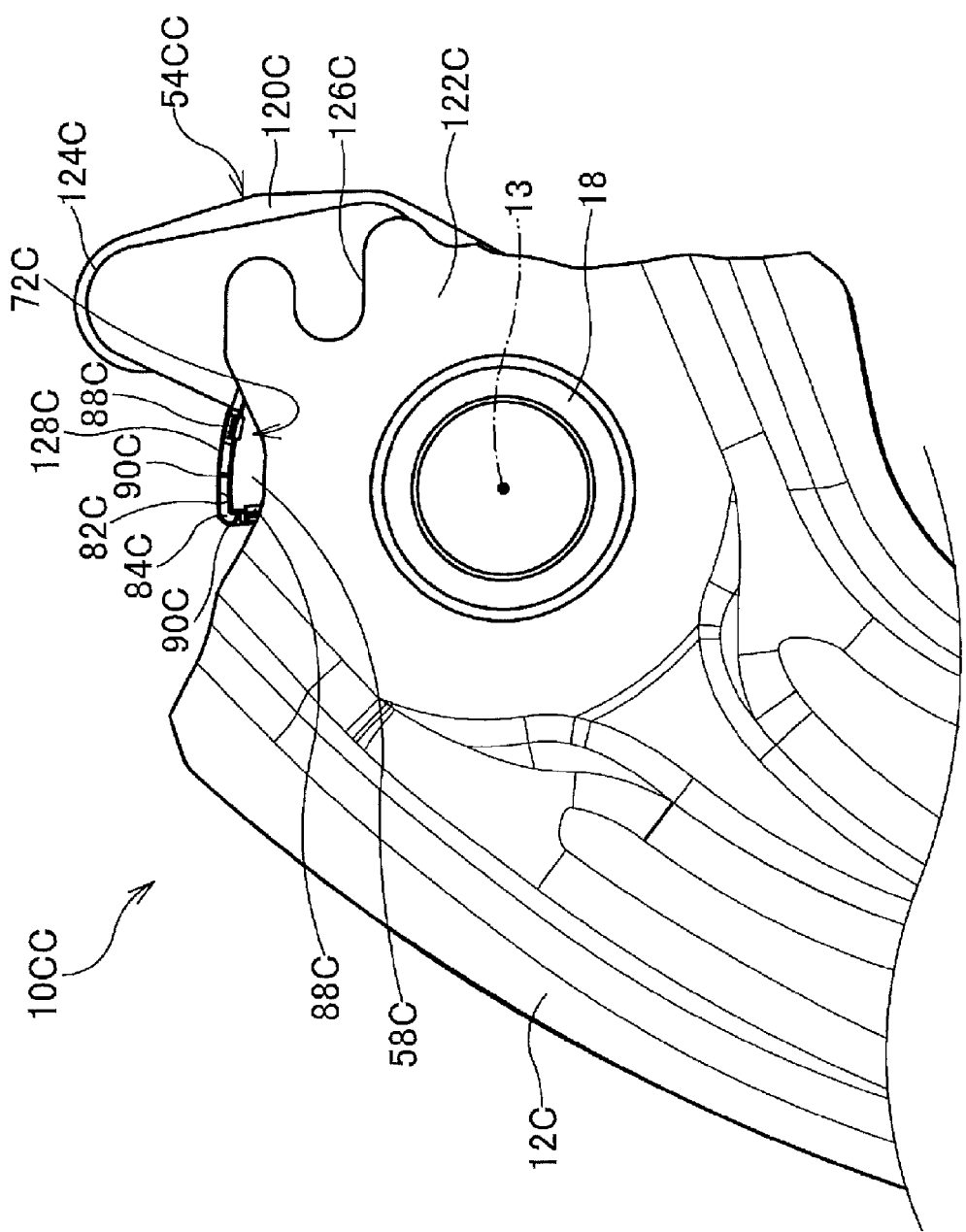
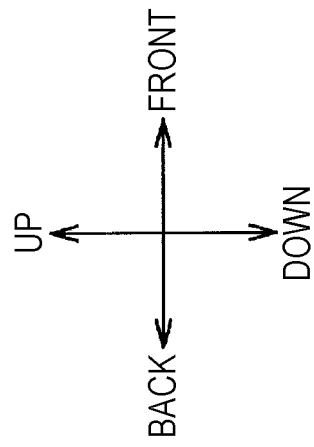

VEHICLE OPERATION PEDAL DEVICE

TECHNICAL FIELD

The present invention relates to a vehicle operating pedal apparatus including a magnet for detecting the angle of rotation of an operating pedal.

BACKGROUND ART

Various technologies related to the above vehicle operating pedal apparatus have conventionally been proposed.

For example, a technology described in Patent Literature 1 below is a structure that mounts, on a pedal, a magnet for measuring the position of a pedal, in which a drum of the pedal defines a pocket and the magnet includes a base fitted into the pocket of the drum, one of the pocket or the base defining at least a first slot and the other of the pocket or the base including at least a first rib fitted in the at least first slot for retaining the base of the magnet in the pocket of the drum.

CITATION LIST

Patent Literature

Patent Literature 1: JP-T-2017-537306

SUMMARY OF INVENTION

Problems to be Solved by Invention

The magnet is retained on the pedal with such a mounting structure. However, a more suitable mounting structure is being desired in which the magnet resists being detached from the pedal.

Hence, the present invention has been made considering the above-mentioned point, and an object thereof is to provide a vehicle operating pedal apparatus configured in such a manner that a magnet mounted on an operating pedal to detect the angle of rotation of the operating pedal resists being detached from the operating pedal.

Solution to Problems

The invention according to claim 1 to solve the problem is a vehicle operating pedal apparatus that includes: an operating pedal pivotably supported by a vehicle member; a magnet used to detect the angle of rotation of the operating pedal; a holder housing the magnet in an engaged state; a first fixing mechanism configured to fix the holder to the operating pedal with a pressing force in a first direction; and a second fixing mechanism configured to fix the holder to the operating pedal with a pressing force in a second direction different from the first direction.

The invention according to claim 2 is the vehicle operating pedal apparatus according to claim 1, in which the first fixing mechanism includes: a first shaft provided to the holder; and a first insertion portion provided to the operating pedal, into which the first shaft is inserted, and the second fixing mechanism includes: a second shaft provided to the holder; and a second insertion portion provided to the operating pedal, into which the second shaft is inserted in the same direction as an insertion direction of the first shaft.

The invention according to claim 3 is the vehicle operating pedal apparatus according to claim 1, in which the first fixing mechanism includes: a first shaft provided to the holder; and a first insertion portion provided to the operating pedal, into which the first shaft is inserted, and the second fixing mechanism includes: a second shaft provided to the holder; and a second insertion portion provided to the operating pedal, into which the second shaft is inserted in a direction different from an insertion direction of the first shaft.

The invention according to claim 4 is the vehicle operating pedal apparatus according to claim 2, in which at least one of the first and second shafts has a tapered shape with a shaft diameter increasing from a proximal end toward a distal end.

The invention according to claim 5 is the vehicle operating pedal apparatus according to claim 3, in which the first or second shaft includes a rib provided on a circumferential edge on a distal end side, the rib being configured to deform upon being inserted into the first or second insertion portion.

The invention according to claim 6 is a vehicle operating pedal apparatus that includes: an operating pedal pivotably supported by a vehicle member; a magnet used to detect the angle of rotation of the operating pedal; and a holder fixed to the operating pedal, in which the holder includes a recessed portion having an opening that is blocked by the operating pedal with the magnet placed therein through the opening.

Effects of Invention

In a vehicle operating pedal apparatus of the present invention, a magnet mounted on an operating pedal to detect the angle of rotation of the operating pedal resists being detached from the operating pedal.

BRIEF DESCRIPTION OF DRAWINGS

FIG. 8 is a perspective view illustrating a part of the vehicle operating pedal apparatus.

FIG. 15 is a perspective view illustrating a part of the vehicle operating pedal apparatus.

FIG. 22 is a perspective view illustrating a part of the vehicle operating pedal apparatus.

FIG. 33 is a side view illustrating a part of the vehicle operating pedal apparatus.

DESCRIPTION OF EMBODIMENTS

Figure 1:
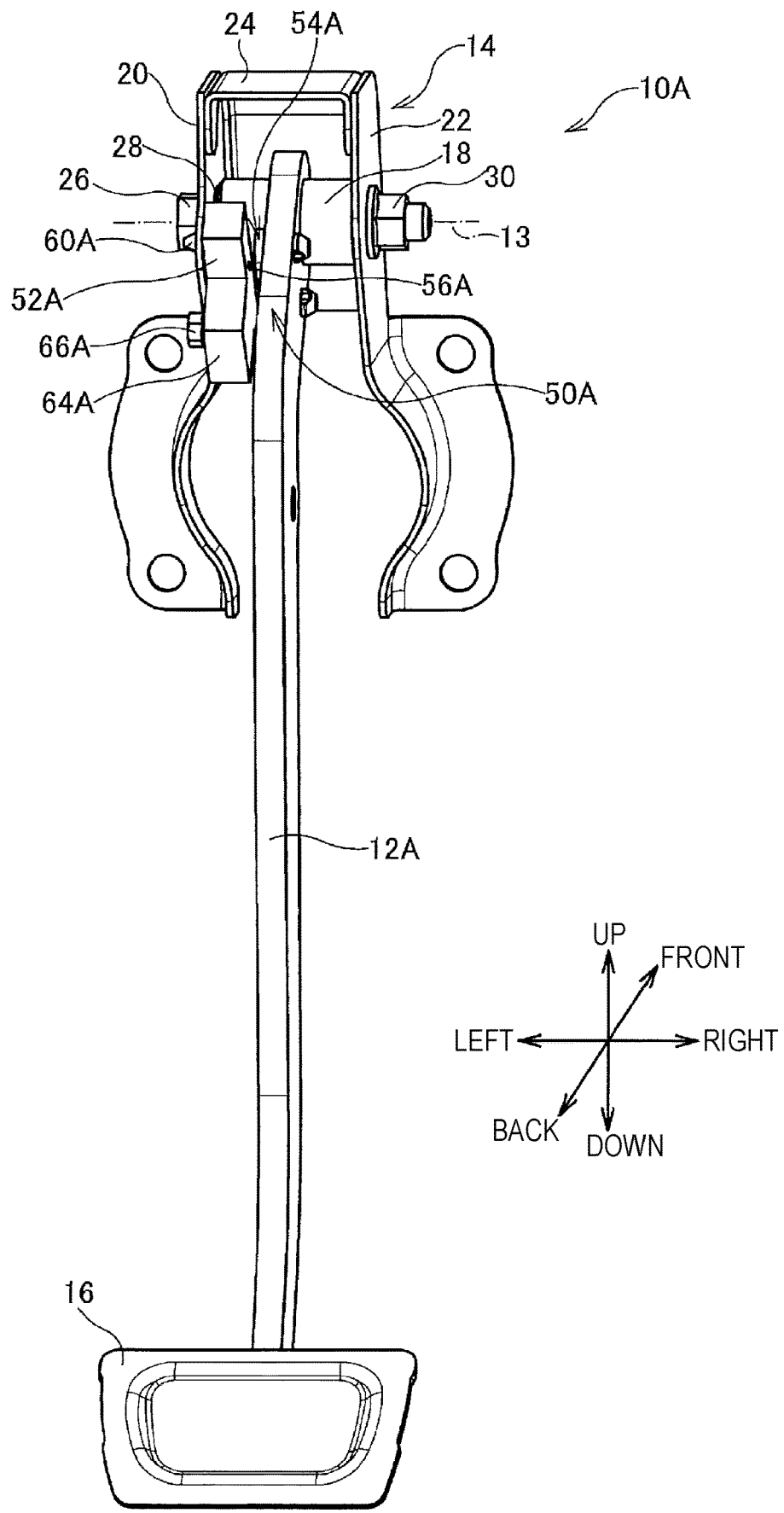
FIG. 1 is a perspective view illustrating a vehicle operating pedal apparatus of a first embodiment.

A vehicle operating pedal apparatus according to the present invention is described hereinafter on the basis of detailed embodiments with reference to the drawings. In the embodiments, the vehicle operating pedal apparatus according to the present invention is mounted on a vehicle to be used as a brake pedal. However, the vehicle operating pedal apparatus according to the present invention may be used as a vehicle pedal other than the brake pedal (for example, an accelerator pedal or clutch pedal).

The drawings used for the following descriptions are drawn, omitting part of a basic configuration. The dimension ratio and the like of each portion drawn are not necessarily correct. The same reference signs are assigned to parts having correspondences among the embodiments. Furthermore, in terms of alphabet letters added to the reference signs, "A" indicates a first embodiment, "B" indicates a second embodiment, "C" indicates a third embodiment, "CC" indicates a fourth embodiment, and "D" indicates a fifth embodiment. However, the same reference signs without the above added alphabet letters are assigned to parts that are substantially common among the embodiments. In the second and subsequent embodiments, detailed descriptions may be omitted. Moreover, when parts and the like are collectively referred to without distinguishing the embodiments, descriptions are given, using the reference signs without the above added alphabet letters.

Moreover, the directions in the drawings are as described in the drawings. However, in FIG. 25, the direction into the page is backward, and the direction out of the page is forward. In other words, the direction orthogonal to the page in FIG. 25 is the front-and-back direction. In FIGS. 23, 32, 40, and 42, the direction into the page is rightward. In FIGS. 24, 33, and 41, the direction into the page is leftward. In other words, the direction orthogonal to the page in FIGS. 23, 24, 32, 33, 40, 41, and 42 is the left-and-right direction.

Figure 4:
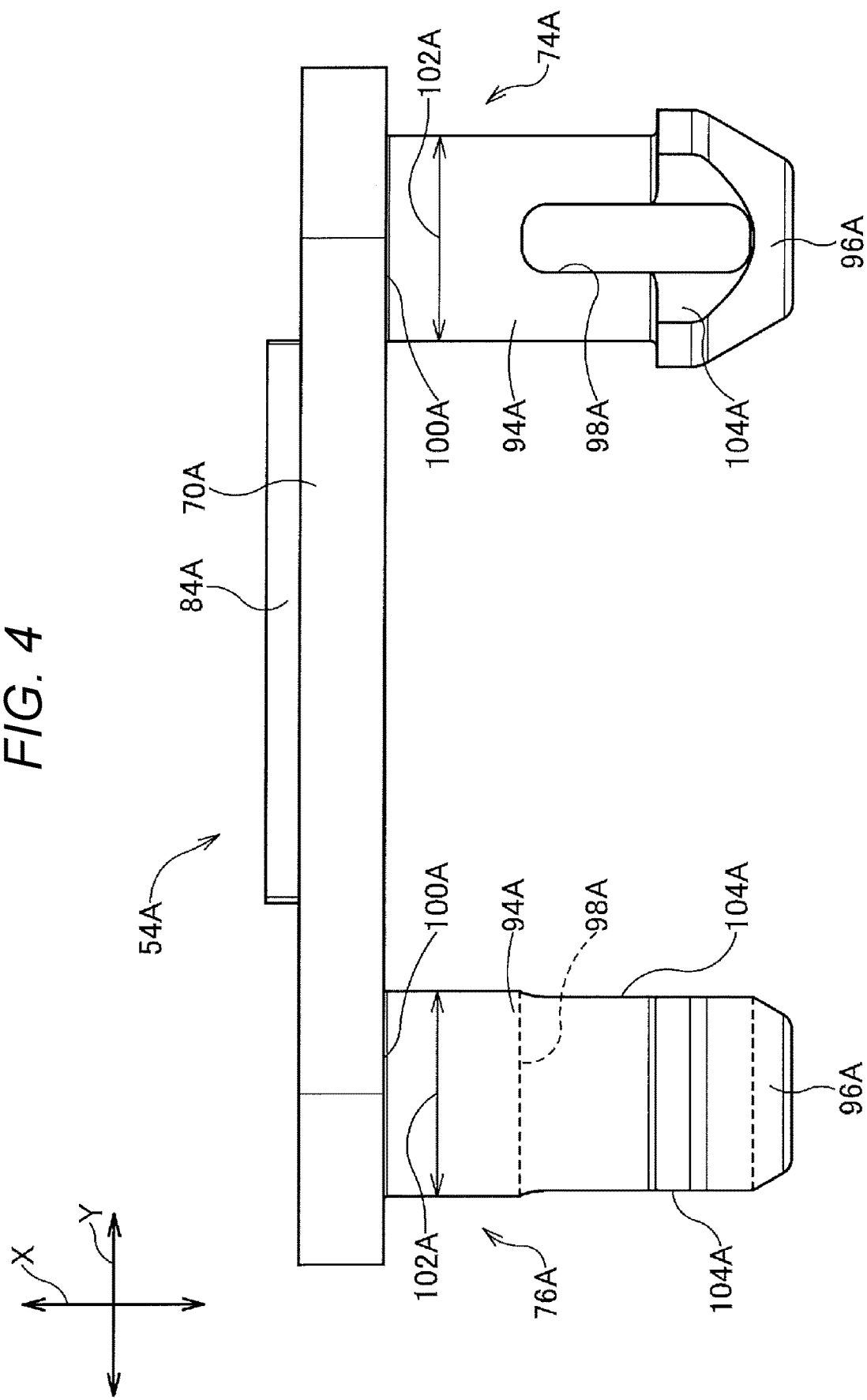
FIG. 4 is a side view illustrating the magnet holder.
Figure 13:
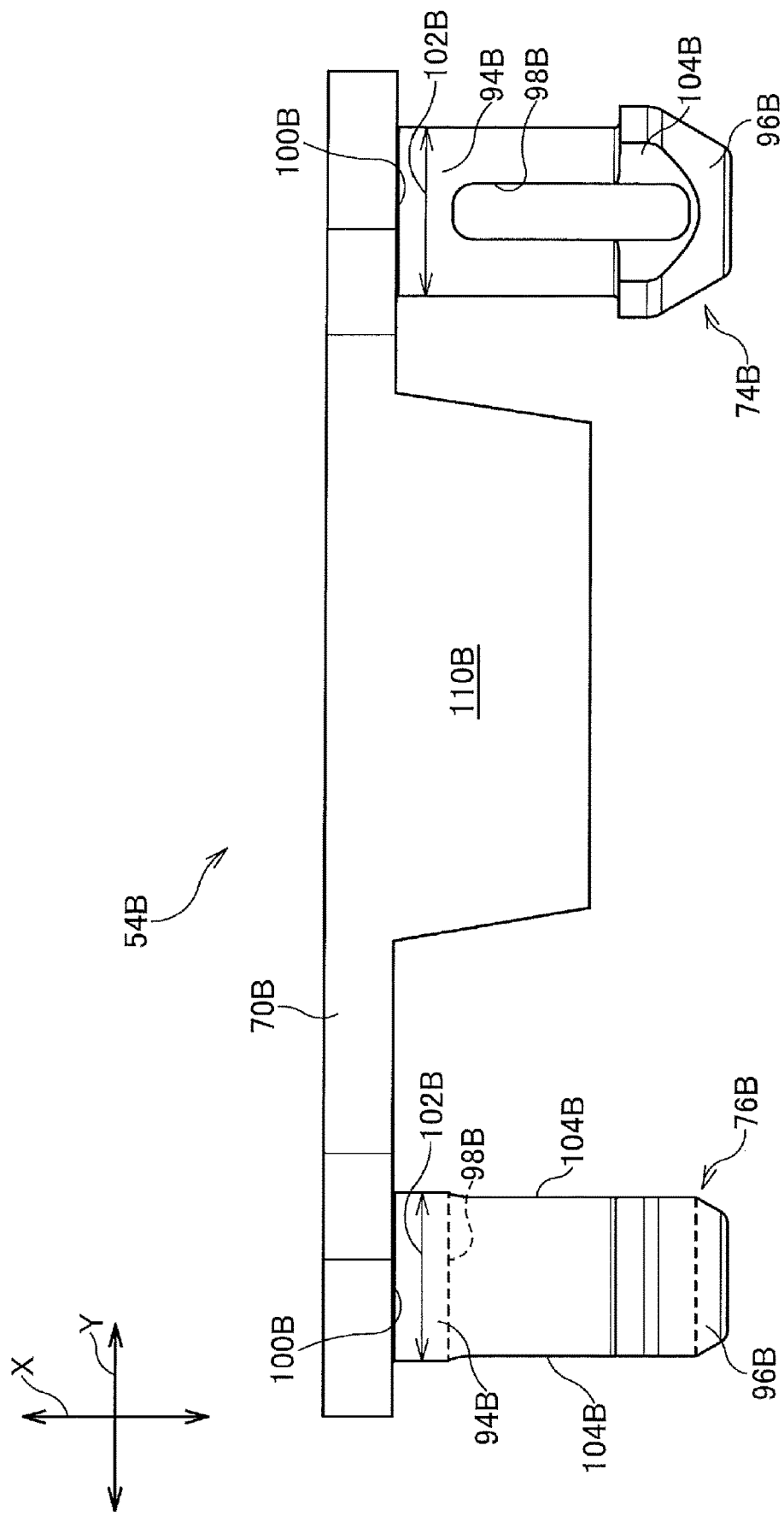
FIG. 13 is a side view illustrating the magnet holder.
Figure 19:
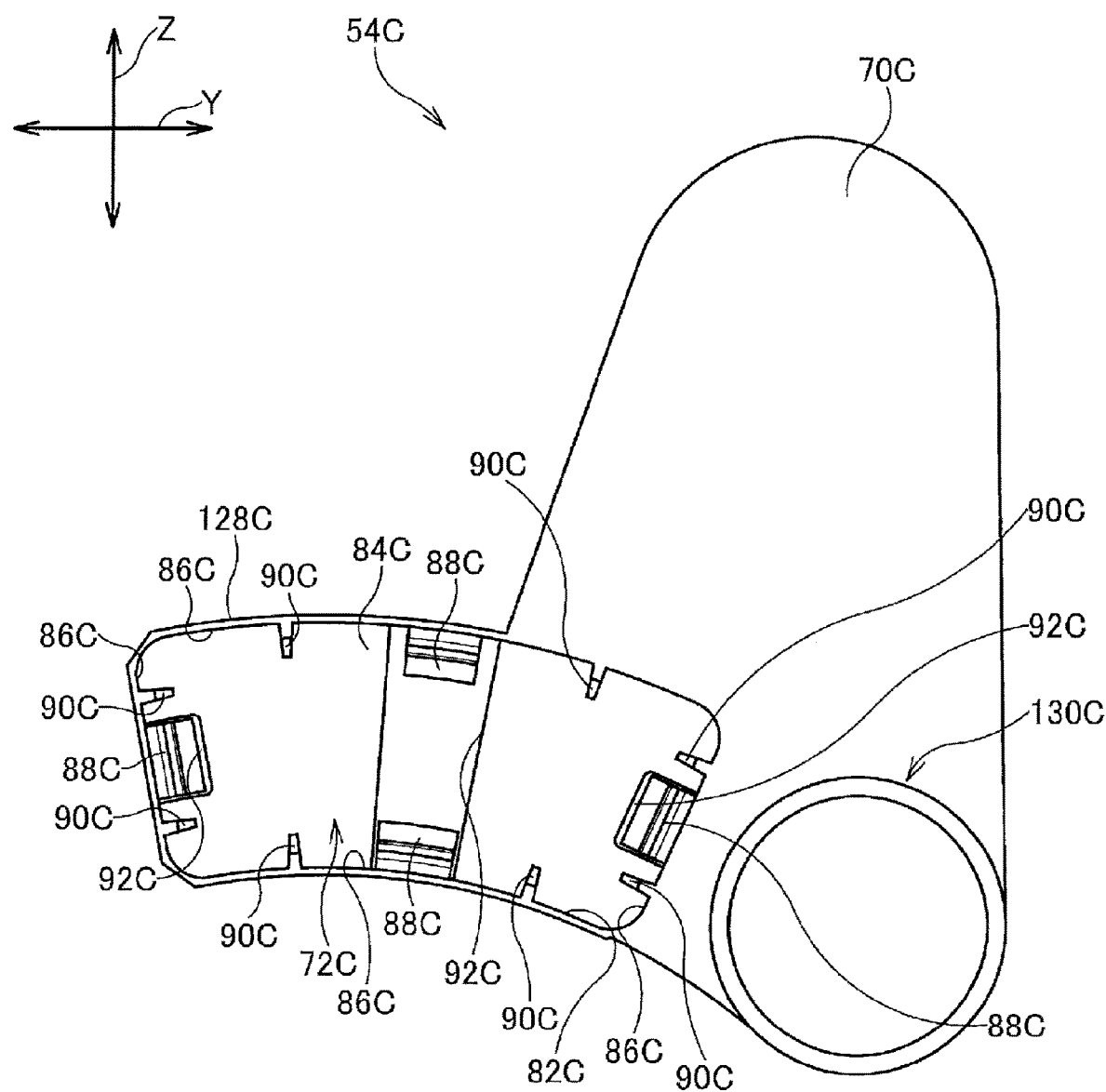
FIG. 19 is a side view illustrating a magnet holder.
Figure 20:
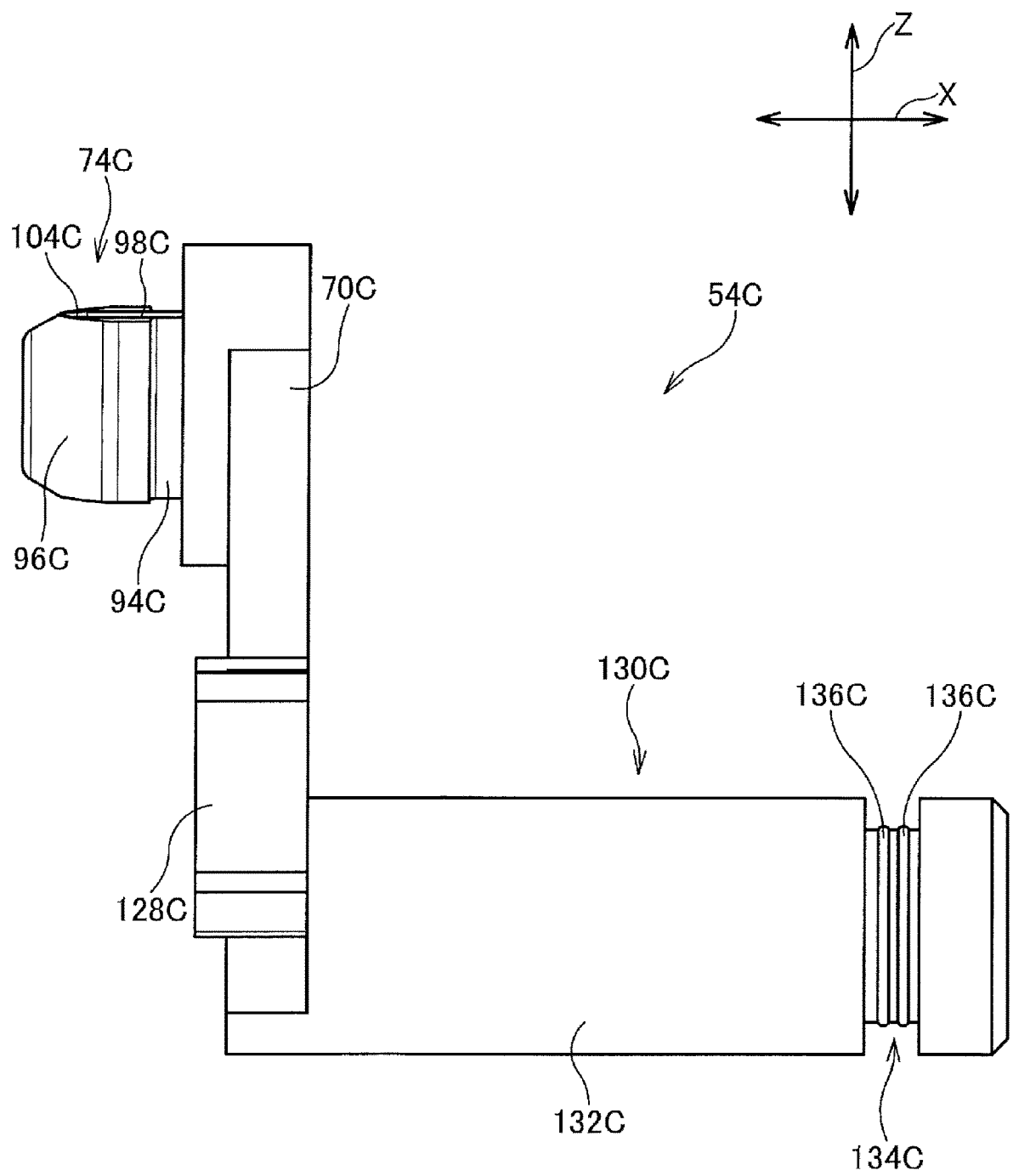
FIG. 20 is a plan view illustrating the magnet holder.
Figure 29:
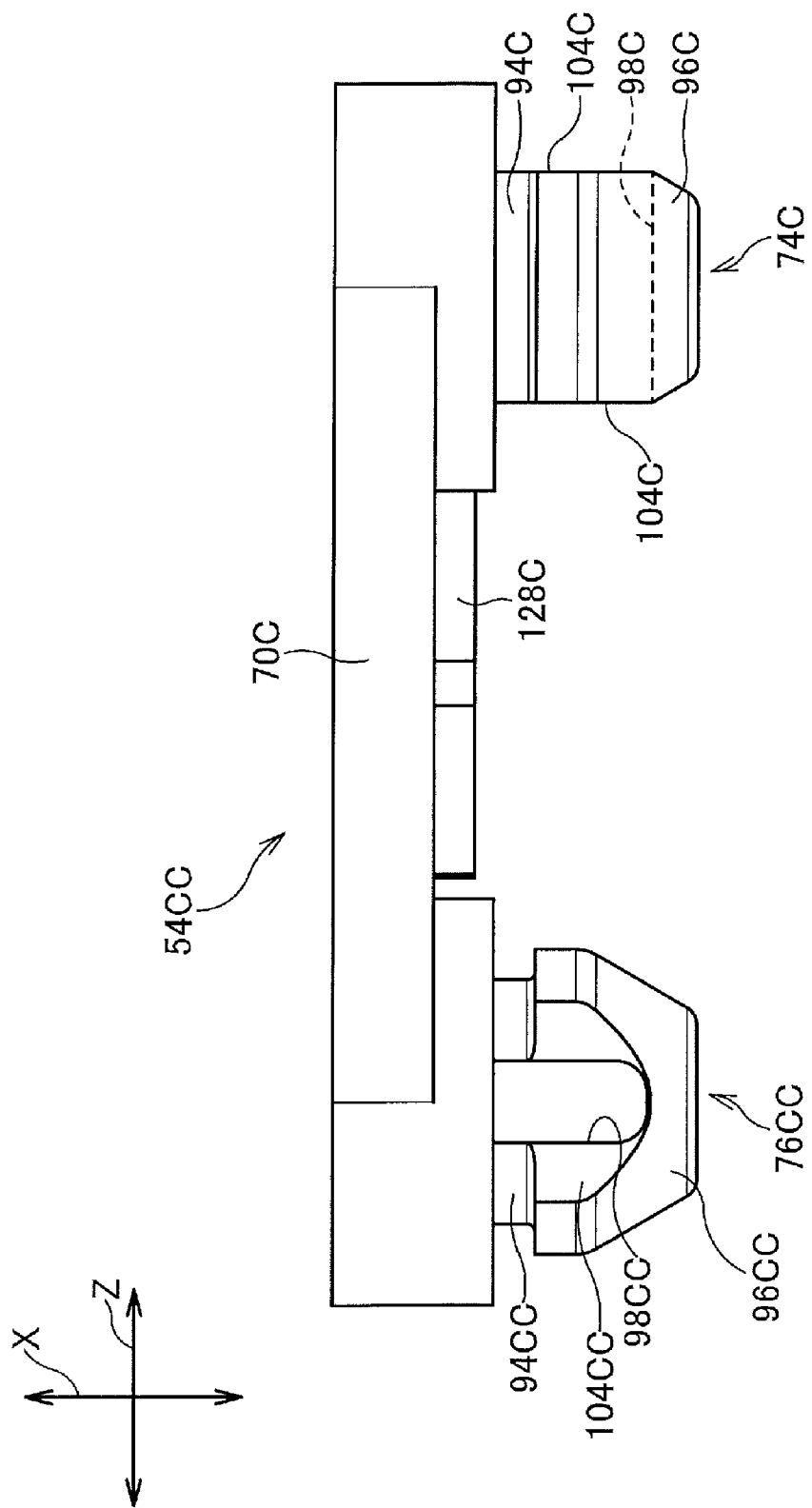
FIG. 29 is a side view illustrating the magnet holder.
Figure 36:
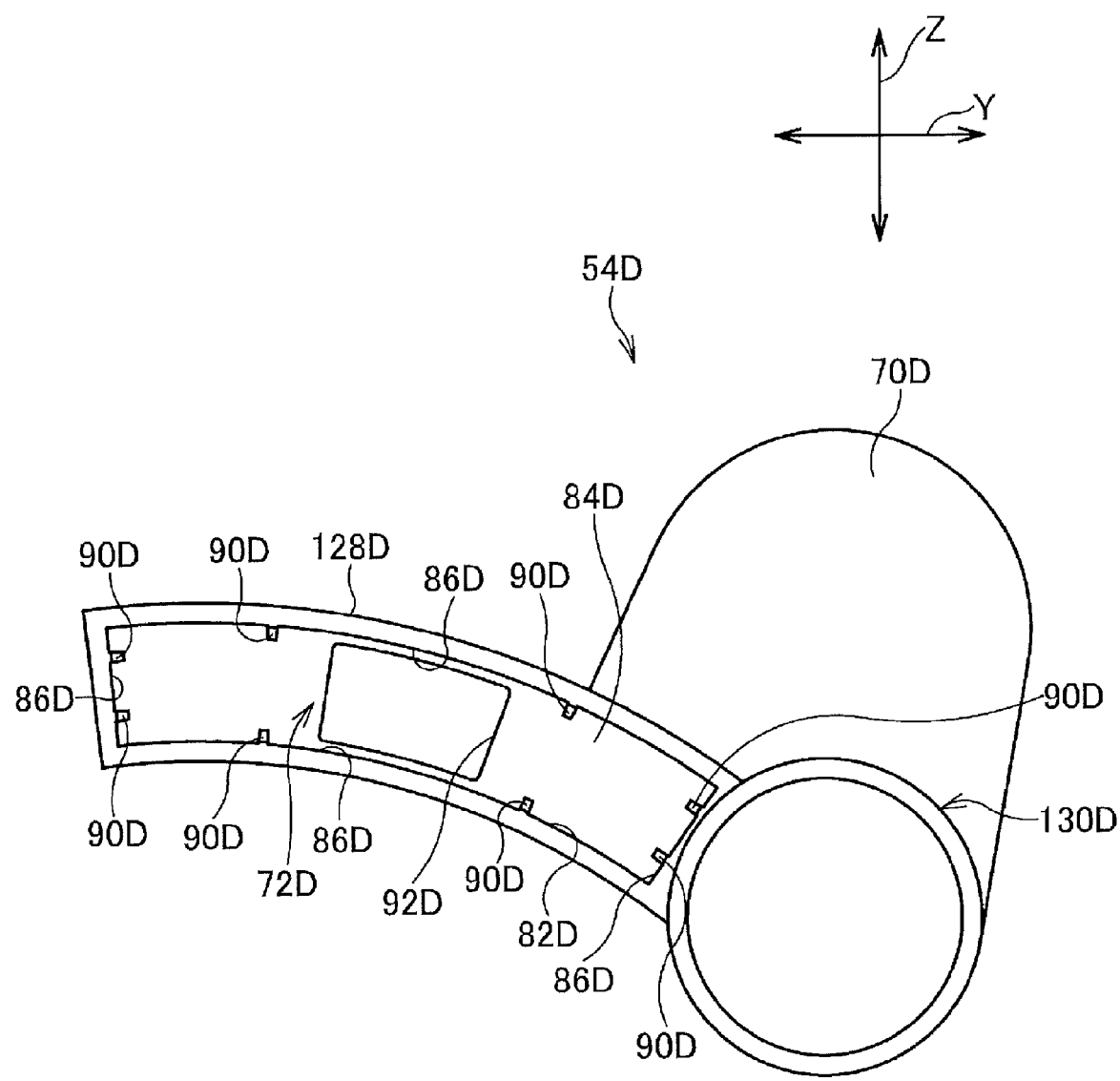
FIG. 36 is a side view illustrating a magnet holder.
Figure 37:
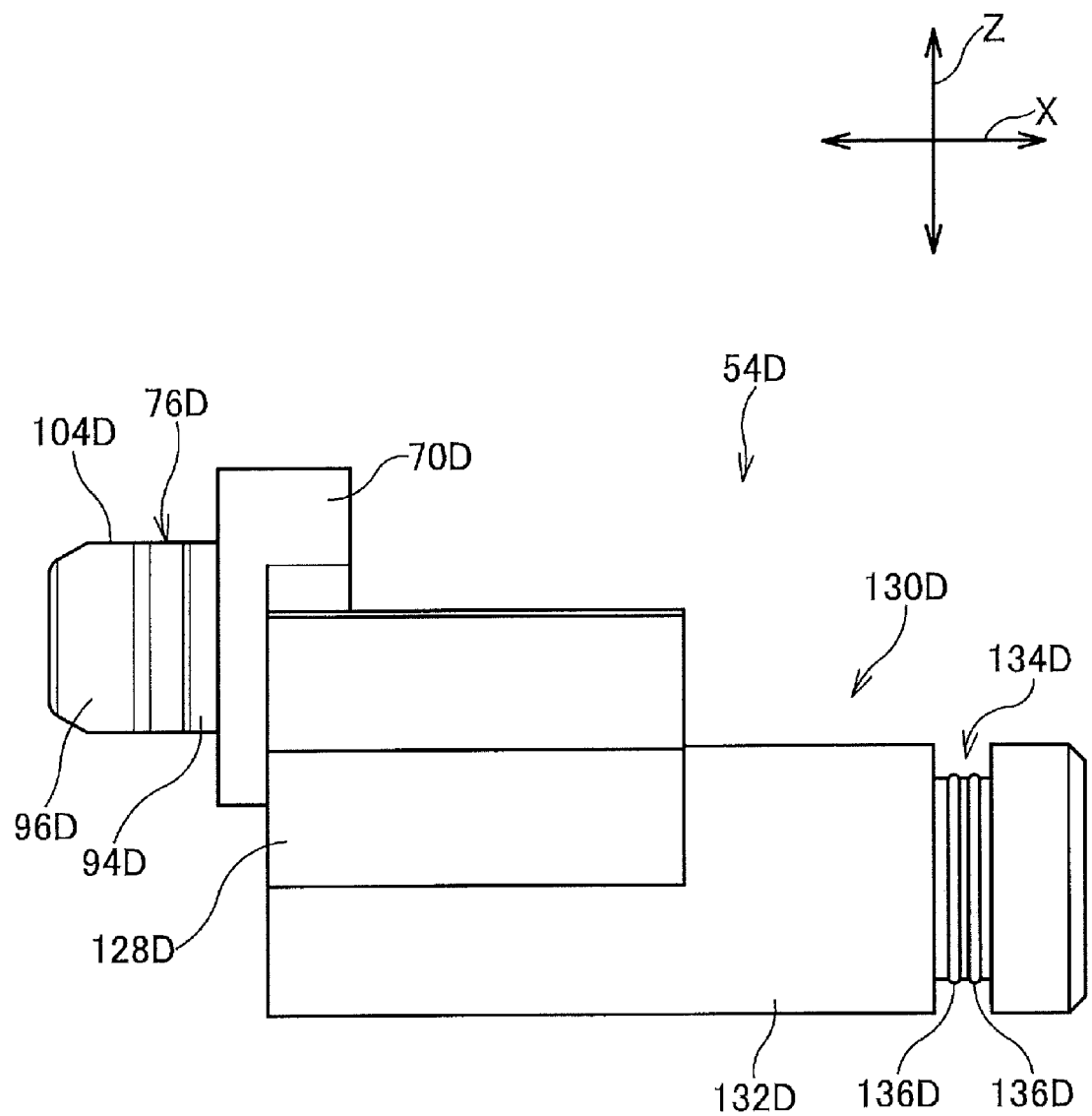
FIG. 37 is a plan view illustrating the magnet holder.

Moreover, in FIGS. 5, 14, 19, 21, 28, 30, 36, and 38, the direction orthogonal to the page is the X direction. In FIGS. 20 and 37, the direction orthogonal to the page is the Y direction. In FIGS. 4, 13, and 29, the direction orthogonal to the page is the Z direction.

(1) First Embodiment

Figure 2:
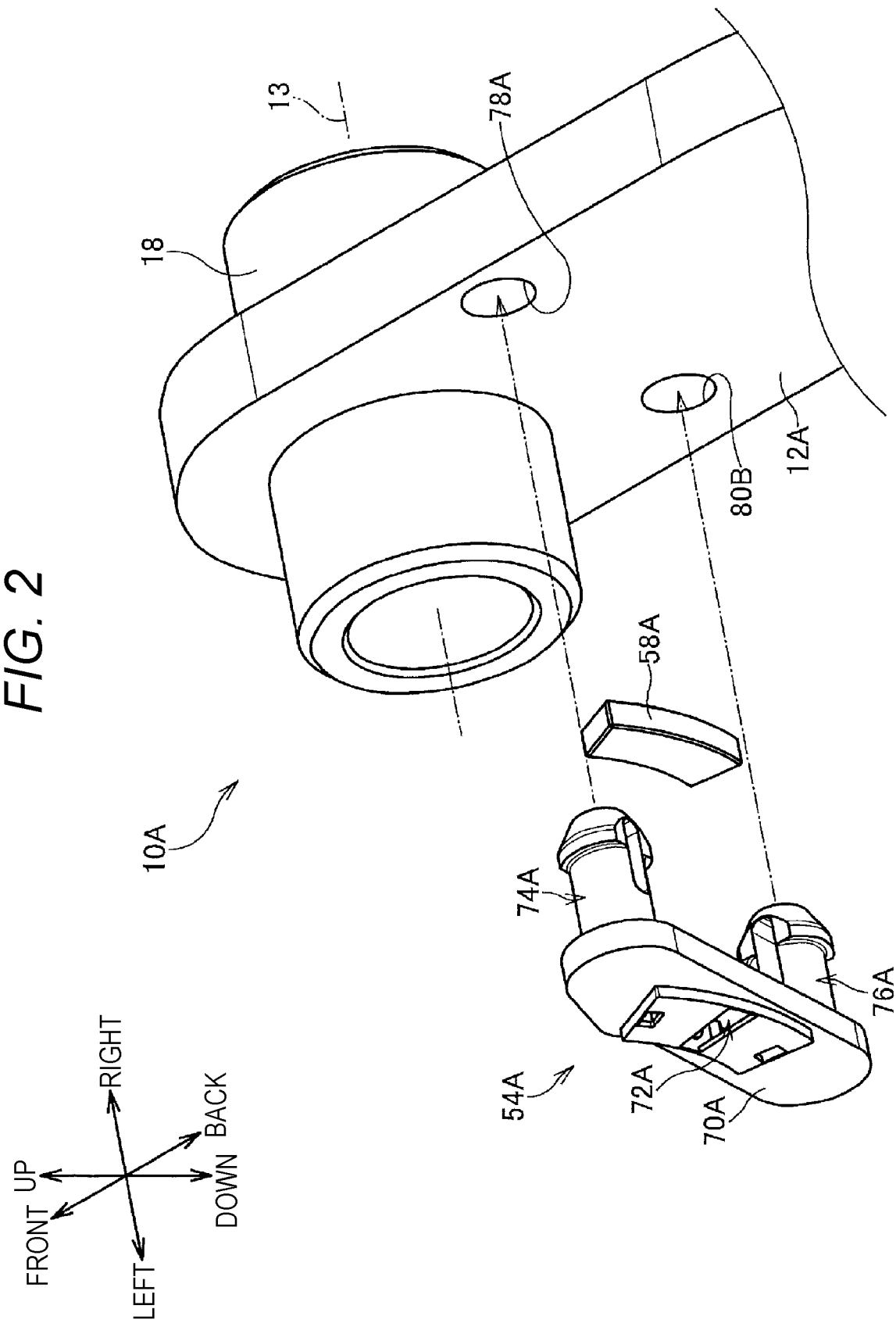
FIG. 2 is an exploded perspective view illustrating a part of the vehicle operating pedal apparatus.

As illustrated in FIGS. 1 and 2, a vehicle operating pedal apparatus 10A of the first embodiment includes an operating pedal 12A and a support member 14, and is installed on a vehicle. A stepping part 16 is provided at the lower end of the operating pedal 12A. A tubular boss 18 is fixed to the upper end of the operating pedal 12A, penetrating the upper end. A collar (not illustrated) on which a pair of bushings 28 is fitted at the left and right ends of the collar is fitted in the boss 18. Consequently, the tubular portions of the bushings 28 are placed between the boss 18 and the collar.

The support member 14 includes a left support member 20, a right support member 22, and an upper middle support member 24, and is fixed to the vehicle (for example, the dash panel). The left support member 20 and the right support member 22 are coupled to the upper middle support member 24 from the front ends along the lengths of the upper ends of the left support member 20 and the right support member 22, and face each other in the left-and-right direction. The boss 18 of the operating pedal 12A is disposed between a left pivot hole (not illustrated) of the left support member 20 and a right pivot hole (not illustrated) of the right support member 22 to cause the left pivot hole and the right pivot hole to communicate with each other in the left-and-right direction via the collar in the boss 18. With the pivot holes communicating with each other, a pivot bolt 26 is passed through the collar in the boss 18 from the left pivot hole of the left support member 20 to the right pivot hole of the right support member 22.

The head of the pivot bolt 26 is in contact with the left support member 20 while the end of the pivot bolt 26 protrudes to the right from the right support member 22. The protruding portion of the pivot bolt 26 is screwed into a nut 30. Consequently, the left and right ends of the collar are sandwiched between the left support member 20 and the right support member 22. As a result, a distance in the left-and-right direction between the left support member 20 and the right support member 22 is maintained constant. Furthermore, a circular flange of one of the bushings 28 is placed at the left end of the boss 18 and between the boss 18 and the left support member 20. Moreover, the circular flange of the other bushing (not illustrated) is placed at the right end of the boss 18 and between the boss 18 and the right support member 22.

In this manner, the boss 18 at the upper end of the operating pedal 12A is pivotably supported between the left support member 20 and the right support member 22. When the stepping part 16 at the lower end of the operating pedal 12A is stepped forward, the operating pedal 12A pivots via, for example, the pivot bolt 26 that has been inserted in the boss 18. This point is a well-known technique.

A dot-and-dash line indicated by a reference sign 13 indicates a straight line that is the center on which the operating pedal 12A pivots (hereinafter referred to as the "pivot center line").

The vehicle operating pedal apparatus 10A is provided with an angle sensor 50A. The angle sensor 50A detects the angle of rotation of the operating pedal 12A that pivots on the pivot center line 13, and includes an IC (Integrated Circuit) holder 52A and a magnet holder 54A. An IC 56A is fixed to and exposed from the IC holder 52A. A part of a magnet 58A is fixed to and exposed from the magnet holder 54A. The IC 56A is a magnetic field sensor that detects the magnetic field of the magnet 58A. Examples of the IC 56A include a Hall IC. As long as the IC 56A can detect the magnetic field of the magnet 58A, it is not necessary for the IC 56A and the magnet 58A to be exposed. The same point can be made in respect of the following embodiments.

The IC holder 52A is substantially cuboid in shape. A snap-fit portion 60A and the like are provided to the left surface of the IC holder 52A. A connector 64A is provided to the back surface of the IC holder 52A. The IC 56A is placed on the right side surface of the IC holder 52A.

The IC holder 52A is mounted on the left support member 20 with the left surface of the IC holder 52A in contact with the inner surface (right surface) of the left support member 20. Hence, the snap-fit portion 60A protrudes from inward to outward of the left support member 20 through a first mounting hole (not illustrated) of the left support member 20, and is engaged with the left support member 20. Furthermore, a mounting bolt 66A protrudes from outward to inward of the left support member 20 through a second mounting hole (not illustrated) of the left support member 20, and is screwed into the IC holder 52A. The IC holder 52A is mounted on the inner surface (right surface) of the left support member 20 in this manner; accordingly, the IC 56A of the IC holder 52A is placed between the left support member 20 and the right support member 22.

The magnet holder 54A includes a flat plate-shaped main body 70A. The main body 70A is provided with, for example, a recessed portion 72A, a first snap-fit portion 74A, and a second snap-fit portion 76A. The recessed portion 72A is placed in the center of the main body 70A. The magnet 58A formed in the form of an arc with a radius substantially equal to a distance between the pivot center line 13 and the IC 56A is housed in the recessed portion 72A. The first snap-fit portion 74A and the second snap-fit portion 76A are placed at two opposite ends, in the longitudinal direction, of the main body portion 70A. Therefore, the recessed portion 72A is located between the first snap-fit portion 74A and the second snap-fit portion 76A.

The first snap-fit portion 74A and the second snap-fit portion 76A are for mounting the magnet holder 54A on the upper end of the operating pedal 12A. In order to achieve this, a first mounting hole 78A and a second mounting hole 80A are provided in the left side surface of the upper end of the operating pedal 12A. Both of the first snap-fit portion 74A and the second snap-fit portion 76A are inserted into the first mounting hole 78A and the second mounting hole 80A from the left to the right and engaged therewith. As a result, the magnet holder 54A is mounted on the upper end of the operating pedal 12A. Consequently, the magnet 58A of the magnet holder 54A is located in the form of an arc formed with the radius substantially equal to the distance between the pivot center line 13 and the IC 56A. Furthermore, the magnet 58A is placed at a position facing the IC 56A.

Figure 3:
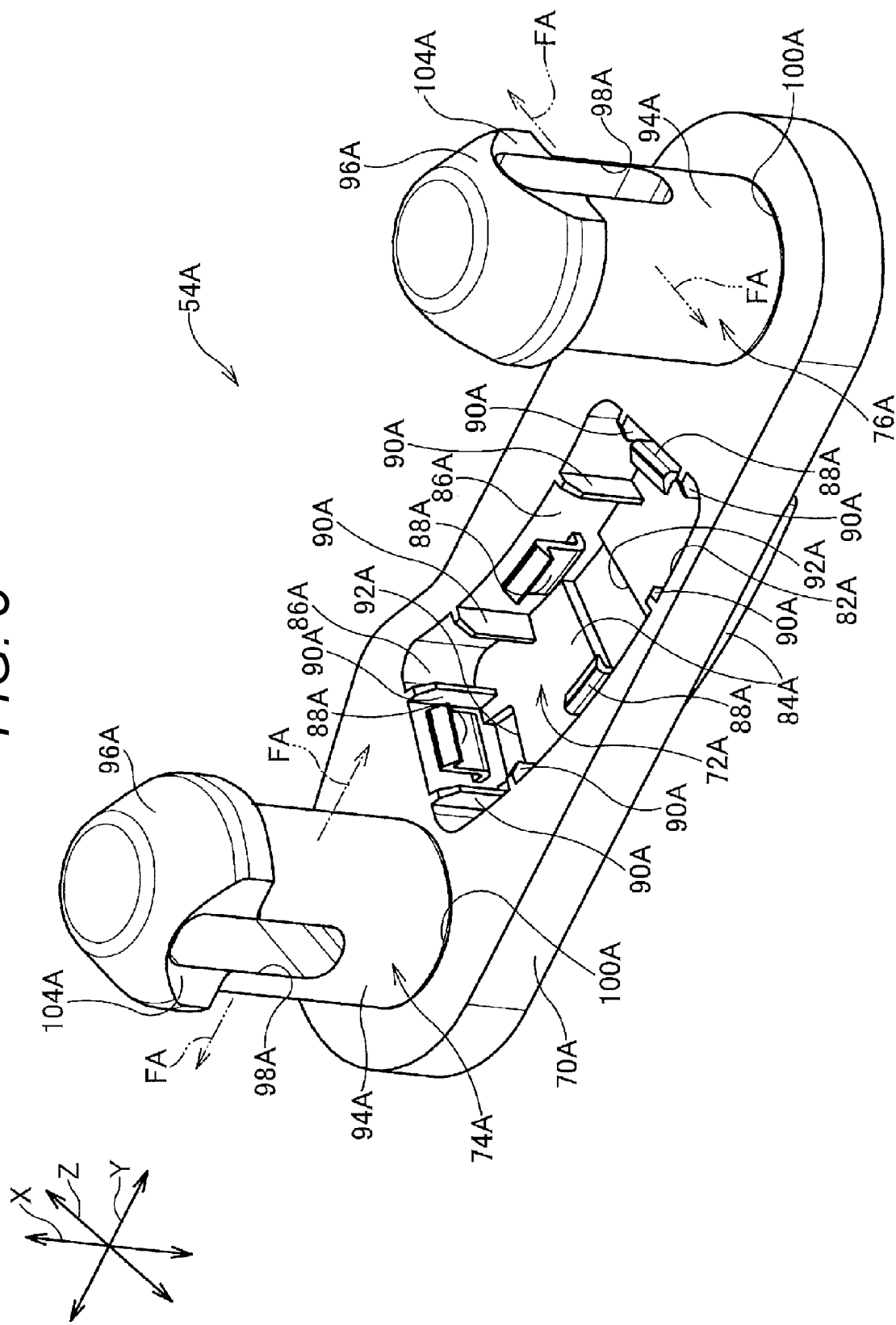
FIG. 3 is a perspective view illustrating a magnet holder.

The magnet holder 54A is described below in more detail. As illustrated in FIGS. 3 and 4, the first snap-fit portion 74A and the second snap-fit portion 76A protrude from the magnet holder 54A at the two ends, in the longitudinal direction, of the main body 70A. In the following description, the protruding direction of the first snap-fit portion 74A and the second snap-fit portion 76A is referred to as the X direction, a direction in which the first snap-fit portion 74A and the second snap-fit portion 76A are aligned, a direction orthogonal to the X direction, is referred to as the Y direction, and a direction orthogonal to the X direction and the Y direction is referred to as the Z direction. In other words, the Y direction is the longitudinal direction of the main body 70A, and the Z direction is the transverse direction of the main body 70A.

The magnet holder 54A is provided with the recessed portion 72A in the center of the main body 70A. The recessed portion 72A has an arc shape formed with a radius substantially equal to the distance between the pivot center line 13 and the IC 56A as in the magnet 58A. Moreover, the recessed portion 72A is in the form of a curved rectangle as viewed in the X direction, and the curved opposite sides are longer than the straight opposite sides. The recessed portion 72A includes an opening 82A, a bottom wall 84A, and four side walls 86A. The opening 82A is provided on a side, from which the first snap-fit portion 74A and the second snap-fit portion 76A protrude, of the main body 70A.

The bottom wall 84A faces the opening 82A in the X direction (the protruding direction of the first snap-fit portion 74A and the second snap-fit portion 76A). A side, which is opposite to an opening 82A side, of the bottom wall 84A protrudes from the main body 70A in the form of a block. The side walls 86A are provided between the circumferential edge of the opening 82A and the circumferential edge of the bottom wall 84A. A snap-fit portion 88A is provided at the center of each of the side walls 86A. Each of the snap-fit portions 88A extends with a bend from a respective side wall 86A toward the opening 82A, and a distal end on an opening 82A side of each of the snap-fit portions 88A is formed into a locking hook protruding inward in the recessed portion 72A. Crush ribs 90A stand on both sides of each of the snap-fit portions 88A on the respective side walls 86A. The crush ribs 90A are placed in substantially the centers between corners continuous with the side walls 86A and the snap-fit portions 88A.

Window portions 92A that penetrate the main body 70A are provided in the bottom wall 84A, at positions each facing a respective snap-fit portion 88A in the X direction. However, among the window portions 92A, the window portions 92A provided for the snap-fit portions 88A facing in the Z direction (the transverse direction of the main body 70A) are continuous with each other along the Z direction. The angle sensor 50A can detect the angle of rotation of the operating pedal 12A without the window portions 92A. The same point can be made about the window portions 92 in each of the embodiments.

The first snap-fit portion 74A includes a shaft 94A, a head 96A, and a through-hole 98A. The shaft 94A is suspended from the main body 70A. The head 96A is formed at the distal end of the shaft 94A. The head 96A has a substantially dome shape having the apex on a side opposite to a shaft 94A side. The shaft 94A side of the head 96A juts out from the shaft 94A. The shaft 94A has a tapered shape with a shaft diameter 102A increasing from a proximal end 100A of the shaft 94A toward the head 96A.

A cut portion 104A is formed on the shaft 94A and the head 96A on each side thereof in the Z direction. The cut portion 104A is provided from the shaft 94A to the head 96A, and has a shape obtained by cutting away a part of each of the shaft 94A and the head 96A. An opening of the through-hole 98A is formed in each of the cut portions 104A. The openings of the through-hole 98A are in the form of an oblong hole with the X direction (the protruding direction of the first snap-fit portion 74A) as the longitudinal direction. In this manner, the through-hole 98A penetrates the shaft 94A and the head 96A along the Z direction. Consequently, the first snap-fit portion 74A can deform elastically in the Y direction.

The magnet holder 54A is mounted on the upper end of the operating pedal 12A, and then the shaft 94A is located in the first mounting hole 78A of the operating pedal 12A. A peripheral wall forming the first mounting hole 78A compresses the shaft 94A and the through-hole 98A of the shaft 94A (refer to FIG. 9). Hence, a pressing force FA (refer to FIG. 3) that the shaft 94A presses back the peripheral wall of the first mounting hole 78A in the Y direction with an elastic force of the shaft 94A is generated outward from the shaft 94A in the shaft 94A.

The same points can be made about the second snap-fit portion 76A. However, the cut portion 104A is formed on the shaft 94A and the head 96A on each side thereof in the Y direction. Therefore, the second snap-fit portion 76A can deform elastically in the Z direction. The magnet holder 54A is mounted on the upper end of the operating pedal 12A, and then the shaft 94A is located in the second mounting hole 80A of the operating pedal 12A. A peripheral wall forming the second mounting hole 80A compresses the shaft 94A and the through-hole 98A of the shaft 94A (refer to FIG. 9). Hence, a pressing force FA that the shaft 94A presses back the peripheral wall of the second mounting hole 80A in the Z direction with an elastic force of the shaft 94A is generated outward from the shaft 94A in the shaft 94A.

In other words, the pressing force FA of the first snap-fit portion 74A is parallel to the Y direction, and the pressing force FA of the second snap-fit portion 76A is parallel to the Z direction. Hence, the pressing force FA of the second snap-fit portion 76A acts on the peripheral wall of the second mounting hole 80A from the shaft 94A in the direction different from the direction of the pressing force FA of the first snap-fit portion 74A.

Figure 5:
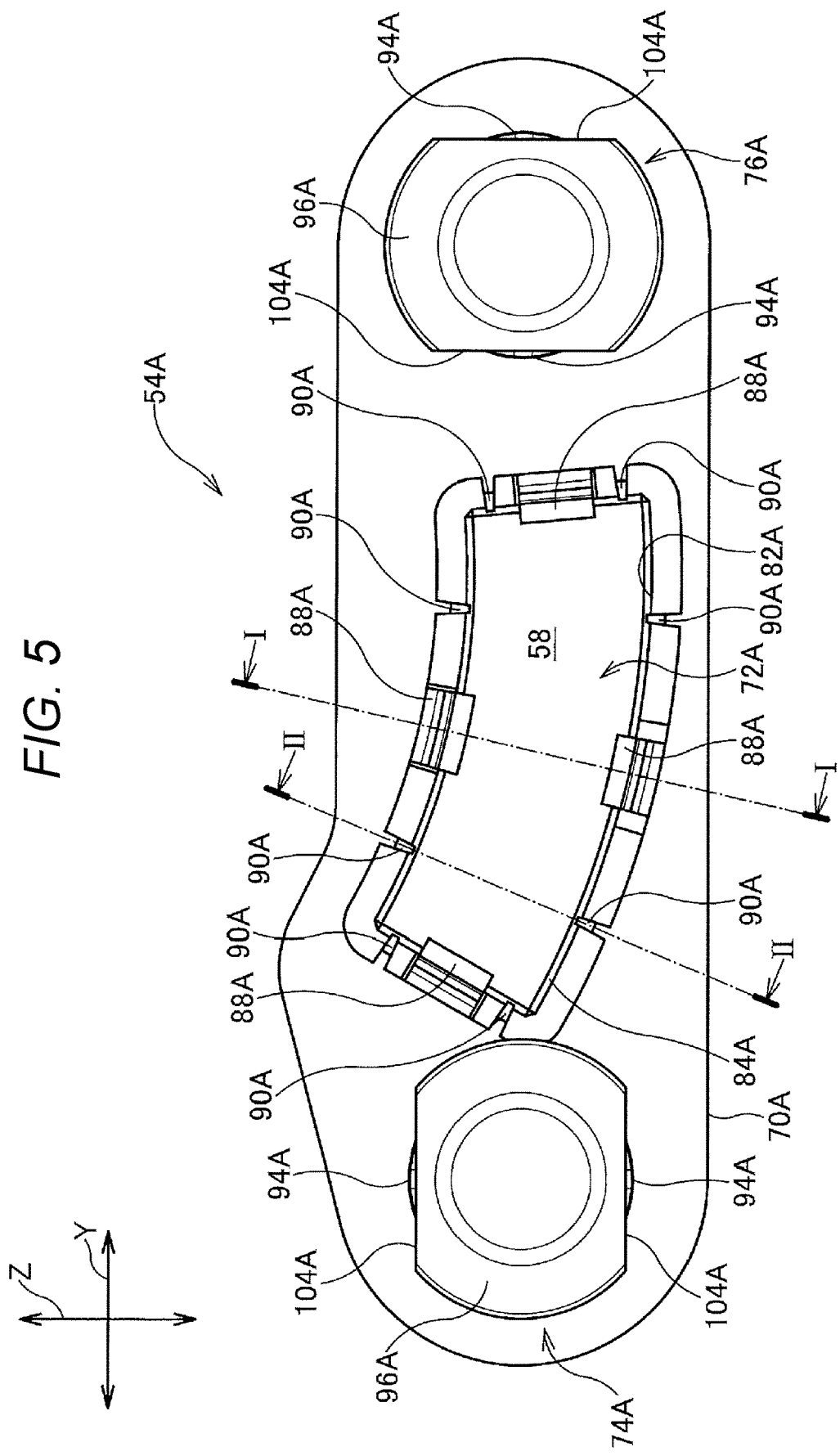
FIG. 5 is a plan view illustrating the magnet holder and a magnet.
Figure 6:
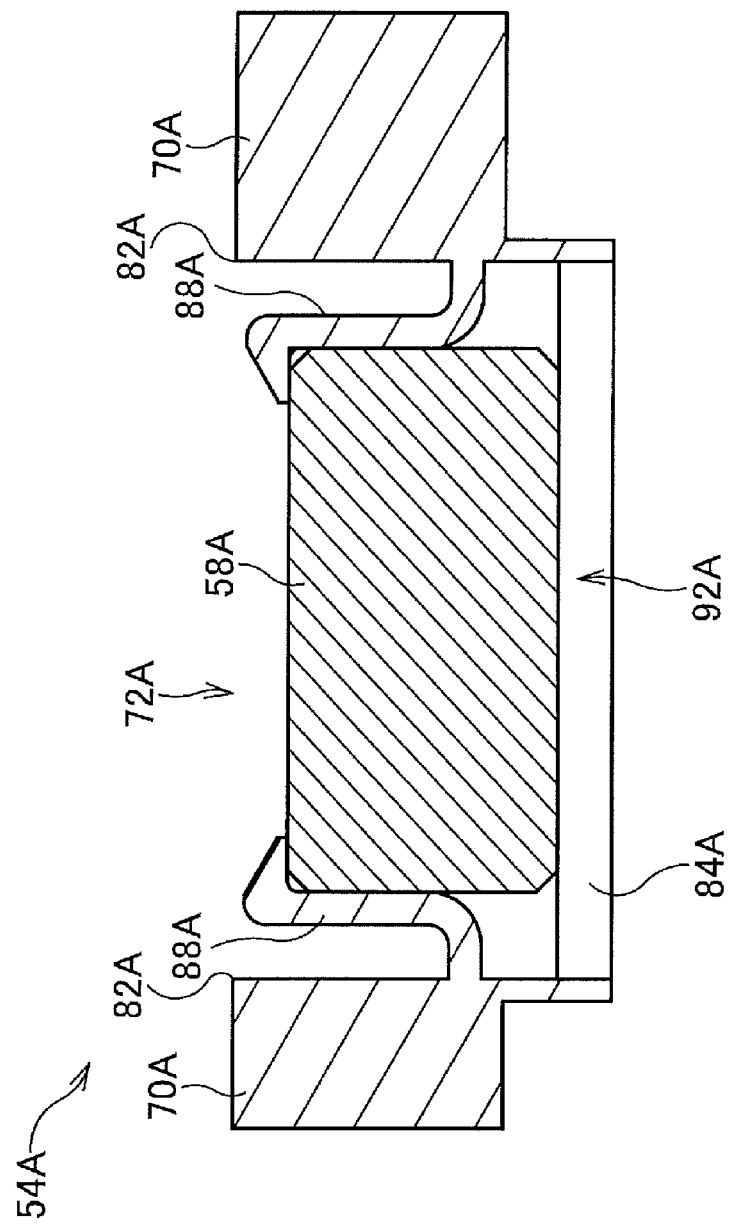
FIG. 6 is a diagram illustrating a cross section of the magnet holder and the magnet taken along line I-I in FIG. 5.
Figure 7:
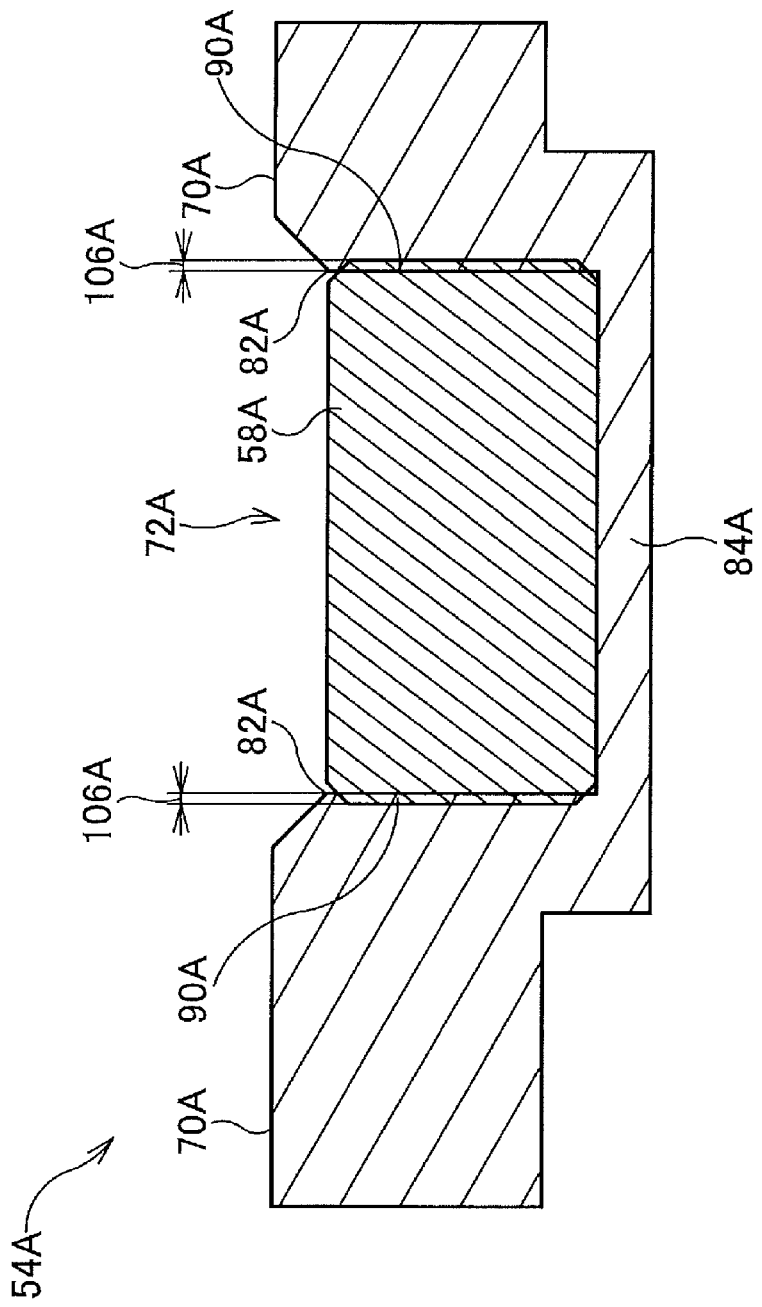
FIG. 7 is a diagram illustrating a cross section of the magnet holder and the magnet taken along line II-II in FIG. 5.

As illustrated in FIG. 5, the magnet 58A is placed in the recessed portion 72A of the main body 70A of the magnet holder 54A through the opening 82A of the recessed portion 72A. At this point in time, the magnet 58A is inscribed with the bottom wall 84A in the recessed portion 72A. Moreover, as illustrated in, for example, FIG. 6, a side, which is opposite to a bottom wall 84A side, of the magnet 58A is engaged with the locking hooks of the snap-fit portions 88A of the recessed portion 72A to be fastened. The same point can be made about the snap-fit portions 88A that are not illustrated in FIG. 6. In this manner, the magnet 58A is easily fixed by the snap-fit portions 88A in the recessed portion 72A of the main body 70A. Furthermore, as illustrated in, for example, FIG. 7, side wall 86A sides of the magnet 58A crush the crush ribs 90A of the recessed portion 72A. A reference sign 106A indicates a crush allowance of each of the crush ribs 90A. The same point can be made about the crush ribs 90A that are not illustrated in FIG. 7. In this manner, the crush ribs 90A prevent the magnet 58A from wobbling in the recessed portion 72A of the main body 70A.

Figure 9:
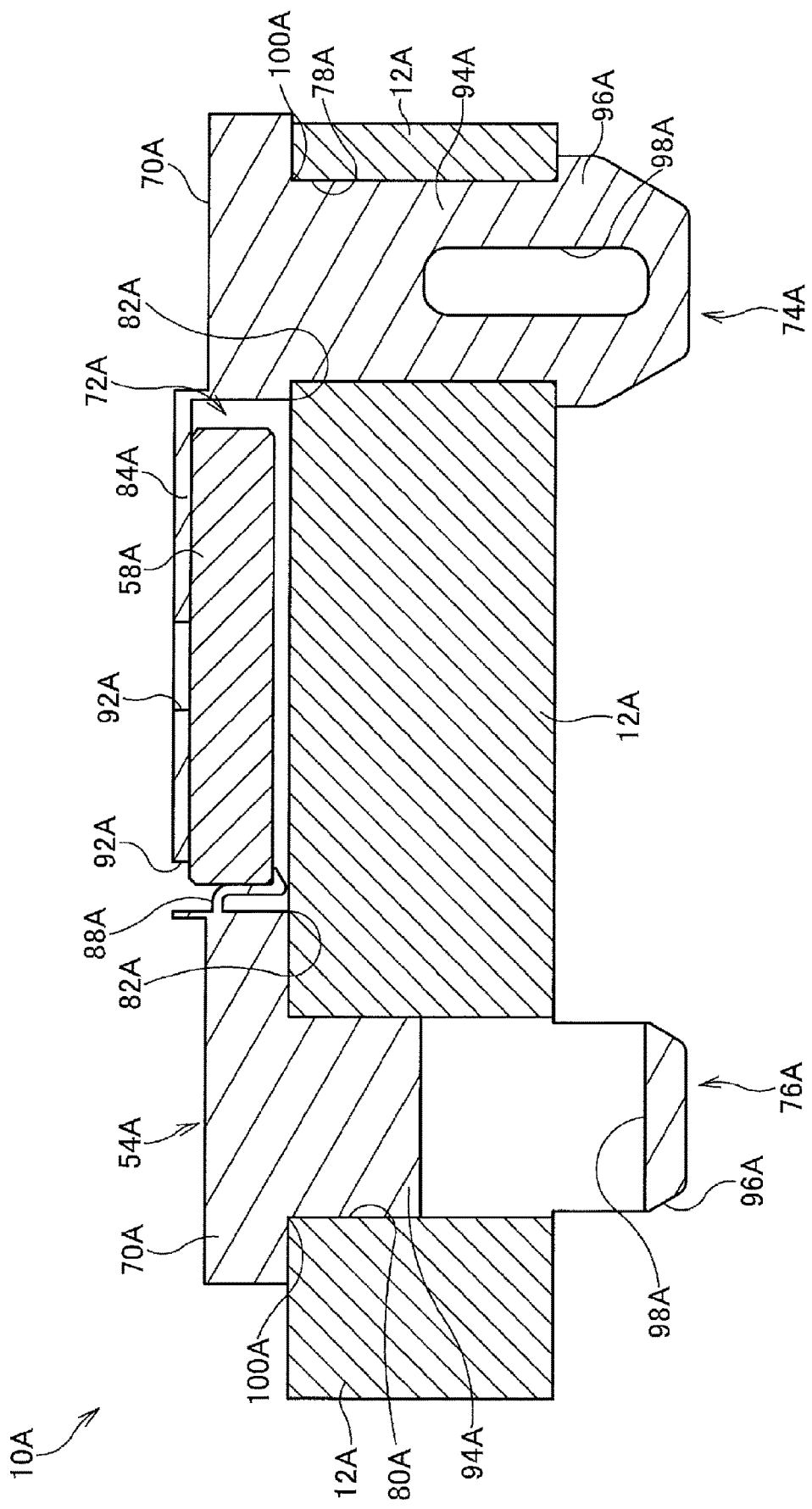
FIG. 9 is a diagram illustrating a cross section of a part of the vehicle operating pedal apparatus taken along line in FIG. 8.

As illustrated in FIGS. 8 and 9, the magnet holder 54A is mounted on the upper end of the operating pedal 12A with the opening 82A of the recessed portion 72A of the main body 70A of the magnet holder 54A pointed toward the operating pedal 12A.

At this point in time, as mentioned above, the first snap-fit portion 74A of the magnet holder 54A is inserted into the first mounting hole 78A of the operating pedal 12A, undergoing elastic deformation (compressive deformation) in the Y direction (refer to FIG. 3). The head 96A protrudes through the first mounting hole 78A from a side (right side) opposite to a side (left side) where the first snap-fit portion 74A is inserted, and is engaged with the operating pedal 12A. In contrast, the shaft 94A is located in the first mounting hole 78A, and the pressing force FA that presses back the peripheral wall of the first mounting hole 78A in the Y direction is generated in the shaft 94A (refer to FIG. 3).

Similarly, as mentioned above, the second snap-fit portion 76A of the magnet holder 54A is inserted into the second mounting hole 80A of the operating pedal 12A, undergoing elastic deformation (compressive deformation) in the Z direction (refer to FIG. 3). The head 96A protrudes through the second mounting hole 80A from a side (right side) opposite to a side (left side) where the second snap-fit portion 76A is inserted, and is engaged with the operating pedal 12A. In contrast, the shaft 94A is located in the second mounting hole 80A, and the pressing force FA that presses back the peripheral wall of the second mounting hole 80A in the Z direction is generated in the shaft 94A (refer to FIG. 3).

In this manner, the magnet holder 54A is fixed to the operating pedal 12A by the two pressing forces FA generated in the different directions between the first snap-fit portion 74A and the second snap-fit portion 76A. Furthermore, the opening 82A of the recessed portion 72A of the magnet holder 54A is blocked by the operating pedal 12A. At this point in time, the magnet 58A, which has been placed through the opening 82A, is fixed by the snap-fit portions 88A and the crush ribs 90A in the recessed portion 72A of the magnet holder 54A while being sandwiched between the magnet holder 54A and the operating pedal 12A.

(2) Second Embodiment

Figure 10:
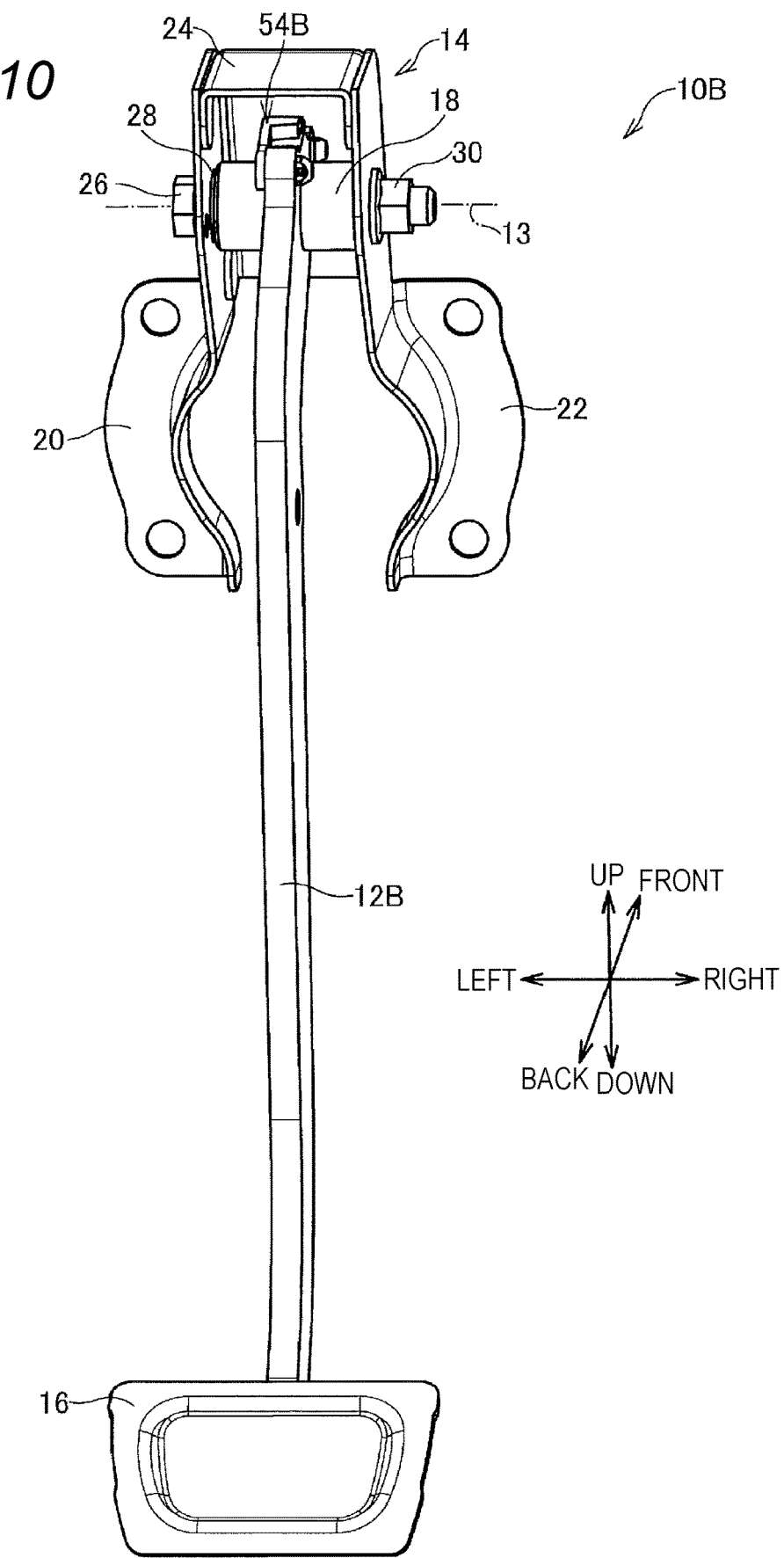
FIG. 10 is a perspective view illustrating a vehicle operating pedal apparatus of a second embodiment.
Figure 11:
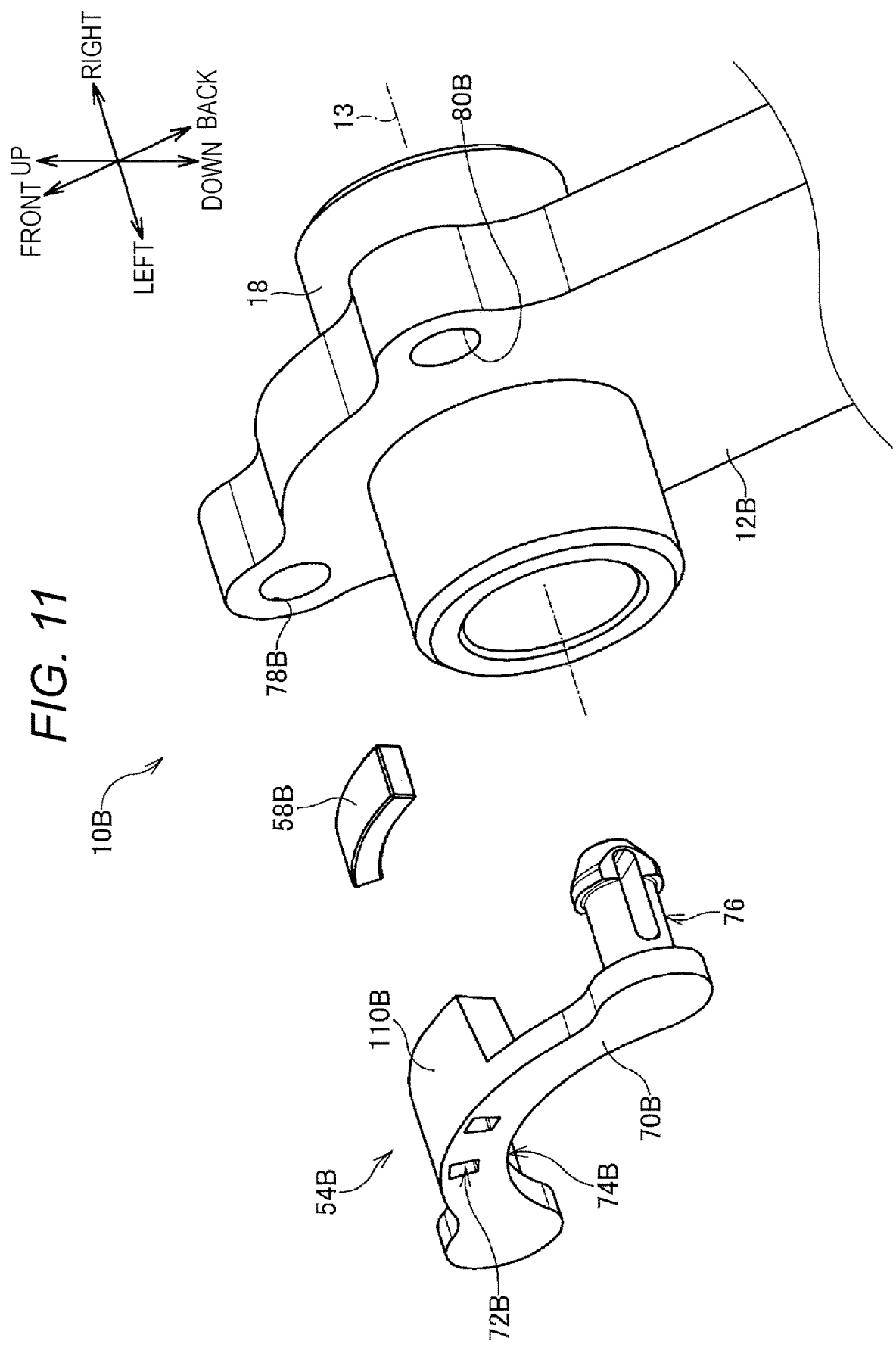
FIG. 11 is an exploded perspective view illustrating a part of the vehicle operating pedal apparatus.

As illustrated in FIGS. 10 and 11, a vehicle operating pedal apparatus 10B of the second embodiment includes an operating pedal 12B. When the stepping part 16 at the lower end of the operating pedal 12B is stepped forward, the operating pedal 12B pivots on the pivot center line 13 via, for example, the boss 18 at the upper end of the operating pedal 12B as in (the operating pedal 12A of) the first embodiment. An angle sensor detects the angle of rotation of the operating pedal 12B. However, in the second embodiment, the illustrations of an IC holder and an IC among components of the angle sensor are omitted. The IC is placed between the upper middle support member 24 and the upper end surface of the operating pedal 12B.

The upper end surface of the operating pedal 12B of the vehicle operating pedal apparatus 10B of the second embodiment is formed into a curved surface, any point on which is equidistant from the pivot center line 13 of the operating pedal 12B.

A magnet holder 54B includes a flat plate-shaped main body 70B and a cuboid case portion 110B. The main body 70B has a substantially arc shape, and curves with a curvature substantially equal to that of the upper end surface of the operating pedal 12B. The main body 70B is provided with, for example, a recessed portion 72B, a first snap-fit portion 74B, a second snap-fit portion 76B, and the case portion 110B. The case portion 110B is provided along the main body 70B in the center of the main body 70B. Therefore, the case portion 110B curves with a curvature substantially equal to that of the upper end surface of the operating pedal 12B as in the main body 70B. The recessed portion 72B is formed in the case portion 110B. A magnet 58B formed in the form of an arc with a curvature substantially equal to that of the upper end surface of the operating pedal 12B is housed in the recessed portion 72B. The first snap-fit portion 74B and the second snap-fit portion 76B are placed at two opposite ends, in the longitudinal direction, of the main body portion 70B. Therefore, the recessed portion 72B and the case portion 110B are located between the first snap-fit portion 74B and the second snap-fit portion 76B.

The first snap-fit portion 74B and the second snap-fit portion 76B are for mounting the case portion 110B of the magnet holder 54B with the case portion 110B placed on the upper end surface of the operating pedal 12B. In order to achieve this, a first mounting hole 78B and a second mounting hole 80B are provided in the left side surface of the upper end of the operating pedal 12B. Both of the first snap-fit portion 74B and the second snap-fit portion 76B are inserted into the first mounting hole 78B and the second mounting hole 80B from the left to the right and engaged therewith. As a result, the case portion 110B of the magnet holder 54B is mounted while placed on the upper end surface of the operating pedal 12B. Consequently, the magnet 58B of the magnet holder 54B is located on the upper end surface of the operating pedal 12B in the form of an arc, any point on which is substantially equidistant from the pivot center line 13. Furthermore, the magnet 58B is placed at a position facing the IC in the up-and-down direction.

Figure 12:
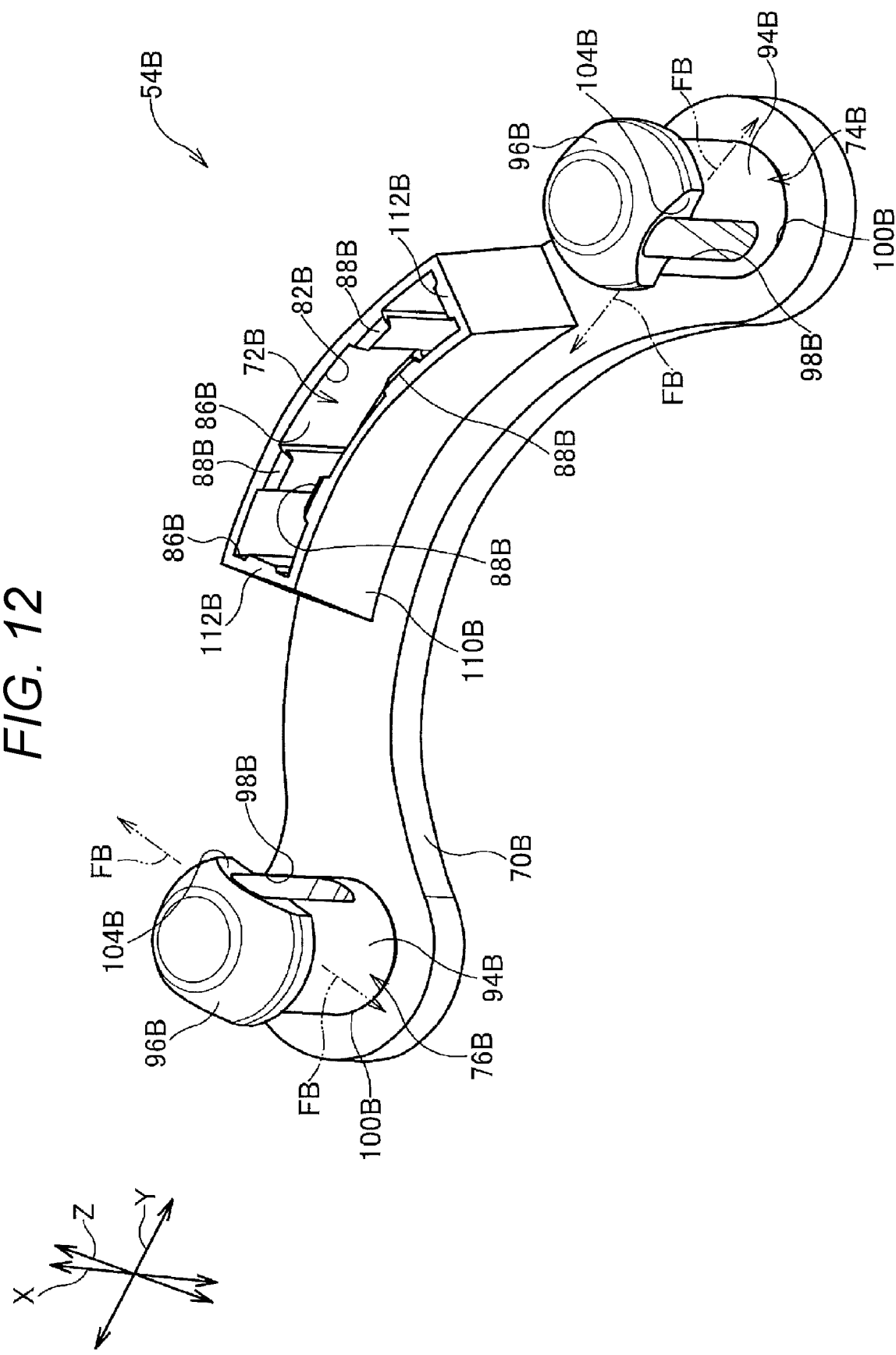
FIG. 12 is a perspective view illustrating a magnet holder.
Figure 14:
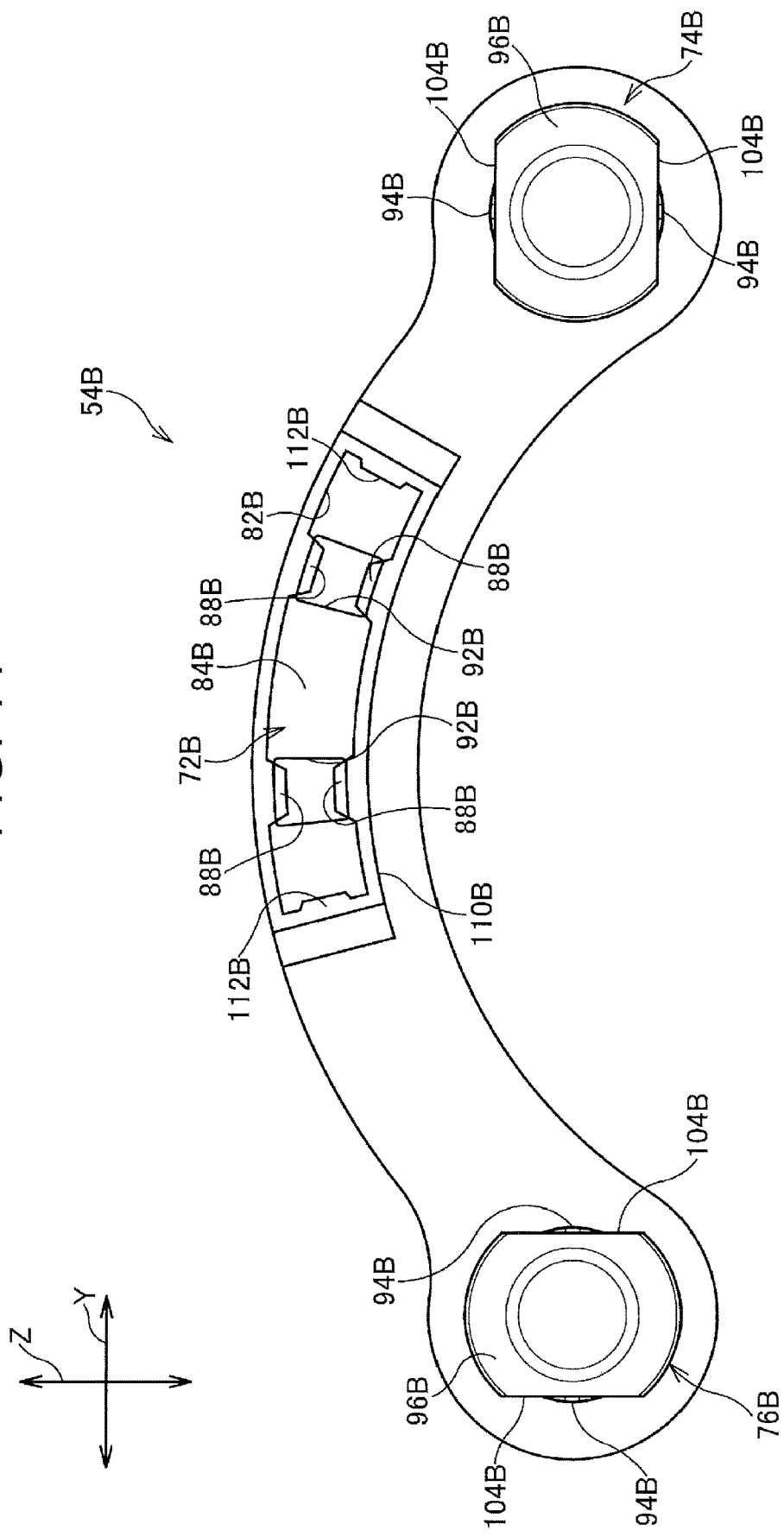
FIG. 14 is a plan view illustrating the magnet holder.

The magnet holder 54B is described below in more detail. As illustrated in FIGS. 12 to 14, the first snap-fit portion 74B and the second snap-fit portion 76B protrude from the magnet holder 54B at the two ends, in the longitudinal direction, of the main body 70B. The X, Y, and Z directions that are used in the following description are similar to those of the first embodiment.

The case portion 110B is provided in the center of the main body 70B of the magnet holder 54B. The case portion 110B is placed on a side, from which the first snap-fit portion 74B and the second snap-fit portion 76B protrude, of the main body 70B. A pair of side walls, which faces each other in the Y direction (a direction where the first snap-fit portion 74B and the second snap-fit portion 76B are aligned), of the case portion 110B inclines inward toward the distal end of the case portion 110B in the case portion 110B. The case portion 110B is provided with the recessed portion 72B. The recessed portion 72B has an arc shape with a curvature substantially equal to that of the upper end surface of the operating pedal 12B as in the magnet 58B. Moreover, the recessed portion 72B is in the form of a curved rectangle as viewed in the X direction, and the curved opposite sides are longer than the straight opposite sides. The recessed portion 72B includes an opening 82B, a bottom wall 84B, and four side walls 86B. The opening 82B is provided on a side, from which the first snap-fit portion 74B and the second snap-fit portion 76B protrude, of the case portion 110B of the main body 70B.

The bottom wall 84B faces the opening 82B in the X direction (the protruding direction of the first snap-fit portion 74B and the second snap-fit portion 76B). The side walls 86B are provided between the circumferential edge of the opening 82B and the circumferential edge of the bottom wall 84B. Two snap-fit portions 88B are provided on each of a pair of the curved side walls 86B of the side walls 86B, facing each other in the Z direction (the transverse direction of the main body 70B). The two snap-fit portions 88B are placed on each of the curved side walls 86B, spaced apart in the Y direction. An opening 82B side of each of the snap-fit portions 88B is formed into a locking hook that protrudes inward in the recessed portion 72B. In contrast, a rib 112B stands on each of a pair of the flat side walls 86B of the side walls 86B.

Two window portions 92B are provided in the bottom wall 84B. The window portions 92B penetrate the main body 70B, and are placed between each pair of two snap-fit portions 88B facing each other in the Z direction.

The first snap-fit portion 74B is similar to (the first snap-fit portion 74A of) the first embodiment. Therefore, a shaft 94B of the first snap-fit portion 74B has a tapered shape with a shaft diameter 102B increasing from a proximal end 100B of the shaft 94B toward a head 96B. The first snap-fit portion 74B can deform elastically in the Y direction. The magnet holder 54B is mounted on the upper end surface of the operating pedal 12B, and then the shaft 94B is located in the first mounting hole 78B of the operating pedal 12B. A peripheral wall forming the first mounting hole 78B compresses the shaft 94B and a through-hole 98B of the shaft 94B (refer to FIG. 16). Hence, a pressing force FB that the shaft 94B presses back the peripheral wall of the first mounting hole 78B in the Y direction with an elastic force of the shaft 94B is generated outward from the shaft 94B in the shaft 94B.

The second snap-fit portion 76B is also similar to (the second snap-fit portion 76A of) the first embodiment. Therefore, the shaft 94B of the second snap-fit portion 76B has a tapered shape with the shaft diameter 102B increasing from the proximal end 100B of the shaft 94B toward the head 96B. The second snap-fit portion 76B can deform elastically in the Z direction. The magnet holder 54B is mounted on the upper end surface of the operating pedal 12B, and then the shaft 94B is located in the second mounting hole 80B of the operating pedal 12B. A peripheral wall forming the second mounting hole 80B compresses the shaft 94B and the through-hole 98B of the shaft 94B (refer to FIG. 16). Hence, a pressing force FB (refer to FIG. 12) that the shaft 94B presses back the peripheral wall of the second mounting hole 80B in the Z direction with an elastic force of the shaft 94B is generated outward from the shaft 94B in the shaft 94B.

In other words, the pressing force FB of the first snap-fit portion 74B is parallel to the Y direction, and the pressing force FB of the second snap-fit portion 76B is parallel to the Z direction. Hence, the pressing force FB of the second snap-fit portion 76B acts on the peripheral wall of the second mounting hole 80B from the shaft 94B in the direction different from the direction of the pressing force FB of the first snap-fit portion 74B.

The magnet 58B is placed in the recessed portion 72B of the main body 70B of the magnet holder 54B through the opening 82B of the recessed portion 72B. At this point in time, the magnet 58B is inscribed with the bottom wall 84B in the recessed portion 72B. Moreover, a side, which is opposite to a bottom wall 84B side, of the magnet 58B is engaged with the locking hooks of the snap-fit portions 88B of the recessed portion 72B to be fastened. In this manner, the magnet 58B is easily fixed by the snap-fit portions 88B in the recessed portion 72B of the main body 70B. Furthermore, sides, which face the flat side walls 86B, of the magnet 58B touch the ribs 112B of the recessed portion 72B. In this manner, the ribs 112B prevent the magnet 58B from wobbling in the recessed portion 72B of the main body 70B.

Figure 16:
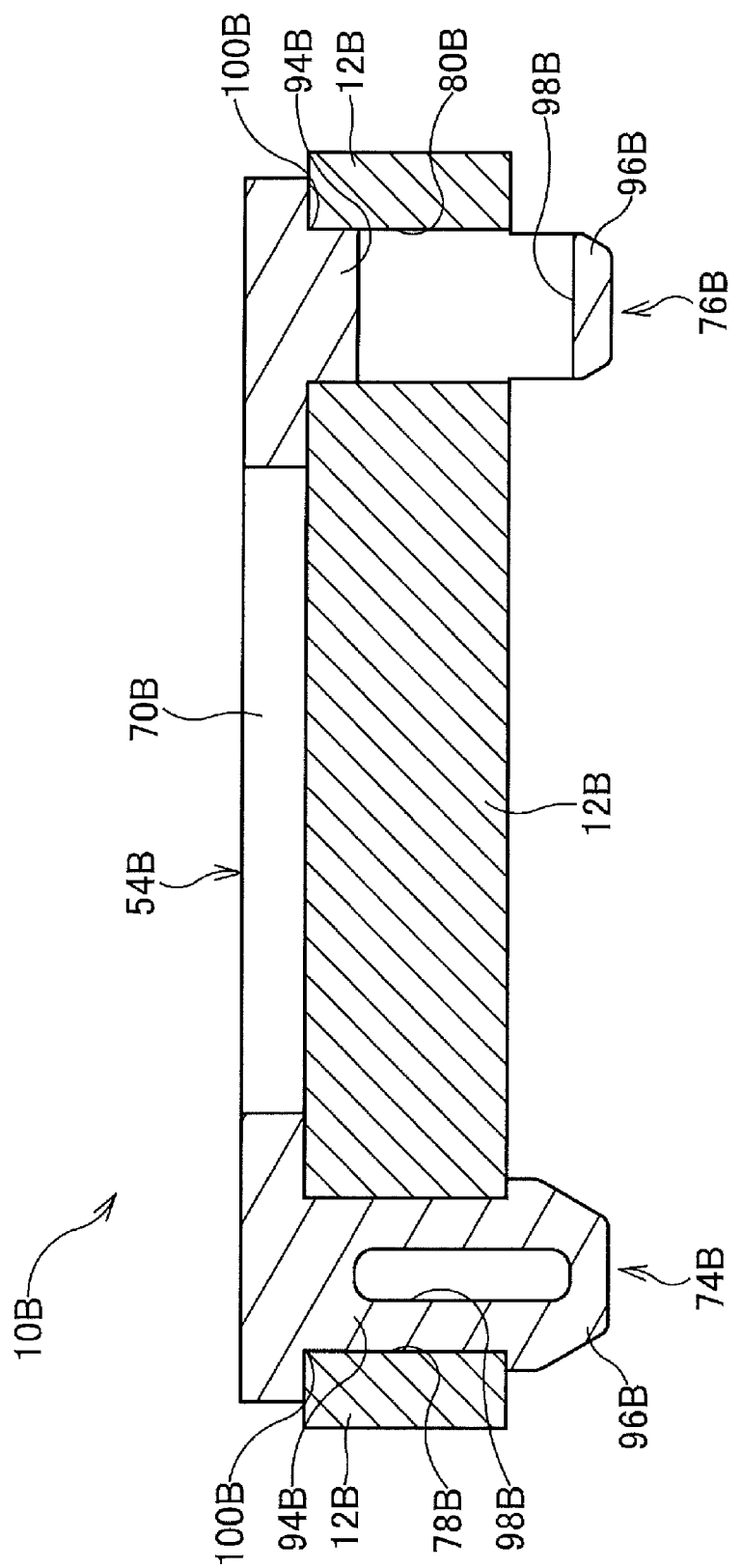
FIG. 16 is a diagram illustrating a cross section of a part of the vehicle operating pedal apparatus taken along line Iv-Iv in FIG. 15.

As illustrated in FIGS. 15 and 16, the magnet holder 54B is mounted on the upper end surface of the operating pedal 12B with the opening 82B of the recessed portion 72B of the main body 70B of the magnet holder 54B pointed toward the operating pedal 12B.

At this point in time, as mentioned above, the first snap-fit portion 74B of the magnet holder 54B is inserted into the first mounting hole 78B of the operating pedal 12B, undergoing elastic deformation (compressive deformation) in the Y direction (refer to FIG. 12). The head 96B protrudes through the first mounting hole 78B from a side (right side) opposite to a side (left side) where the first snap-fit portion 74B is inserted, and is engaged with the operating pedal 12B. In contrast, the shaft 94B is located in the first mounting hole 78B, and the pressing force FB that presses back the peripheral wall of the first mounting hole 78B in the Y direction is generated in the shaft 94B (refer to FIG. 12).

Similarly, as mentioned above, the second snap-fit portion 76B of the magnet holder 54B is inserted into the second mounting hole 80B of the operating pedal 12B, undergoing elastic deformation (compressive deformation) in the Z direction (refer to FIG. 12). The head 96B protrudes through the second mounting hole 80B from a side (right side) opposite to a side (left side) where the second snap-fit portion 76B is inserted, and is engaged with the operating pedal 12B. In contrast, the shaft 94B is located in the second mounting hole 80B, and the pressing force FB that presses back the peripheral wall of the second mounting hole 80B in the Z direction is generated in the shaft 94B (refer to FIG. 12).

In this manner, the magnet holder 54B is fixed to the operating pedal 12B by the two pressing forces FB generated in the different directions between the first snap-fit portion 74B and the second snap-fit portion 76B.

(3) Third Embodiment

Figure 17:
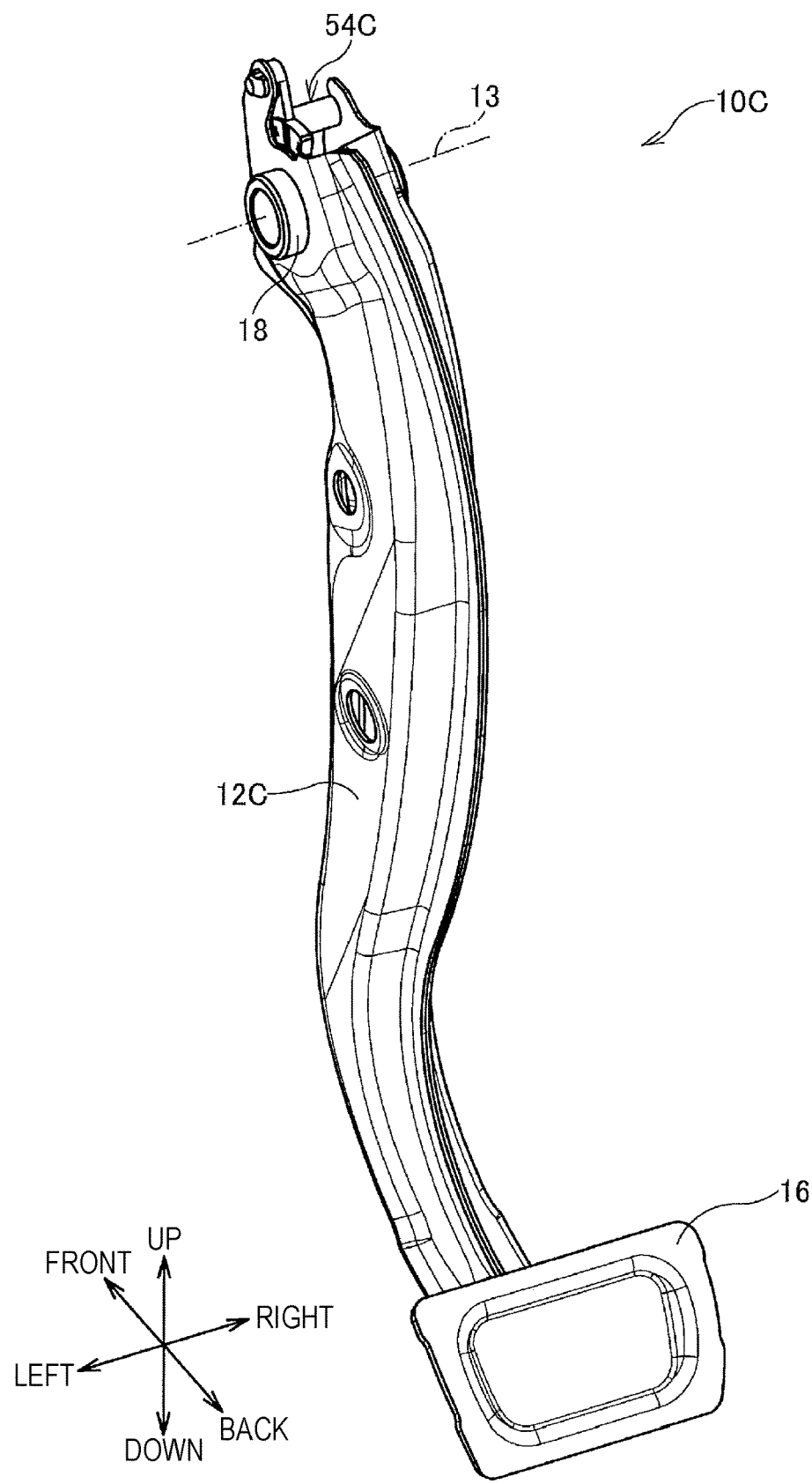
FIG. 17 is a perspective view illustrating a vehicle operating pedal apparatus of a third embodiment.
Figure 18:
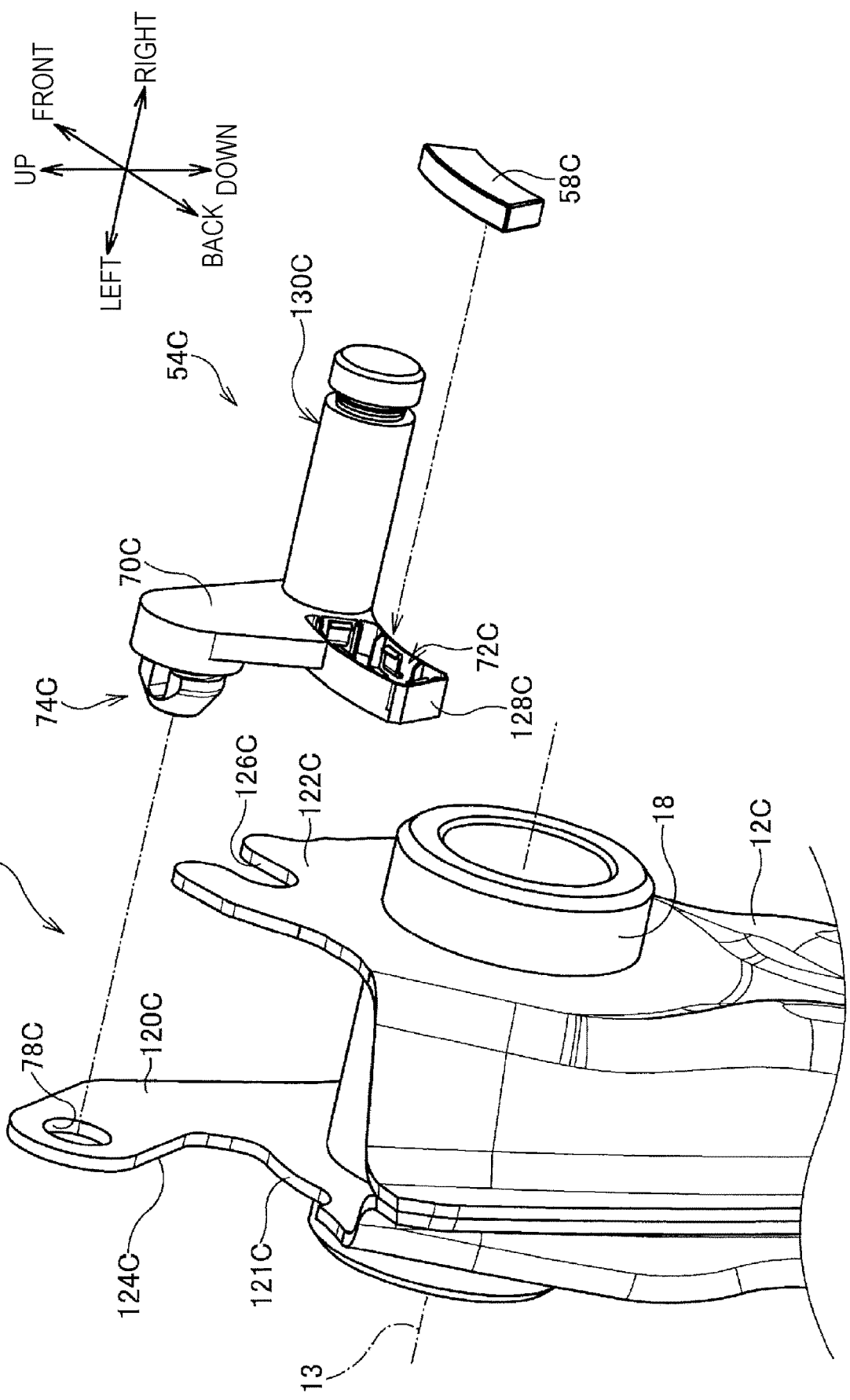
FIG. 18 is an exploded perspective view illustrating a part of the vehicle operating pedal apparatus.

As illustrated in FIGS. 17 and 18, a vehicle operating pedal apparatus 10C of the third embodiment includes an operating pedal 12C. When the stepping part 16 at the lower end of the operating pedal 12C is stepped forward, the operating pedal 12C pivots on the pivot center line 13 via, for example, the boss 18 at the upper end of the operating pedal 12C as in (the operating pedal 12A of) the first embodiment. An angle sensor detects the angle of rotation of the operating pedal 12C. However, in the third embodiment, the illustration of, for example, a support member that pivotably supports the operating pedal 12C is omitted. Moreover, the angle sensor that is similar to that of the first embodiment is used. However, the illustrations of an IC holder and an IC among components of the angle sensor are omitted. The same points can be made in respect of the fourth embodiment.

The operating pedal 12C is a hollow pedal formed by mating a pair of split halves 120C and 122C together. The pair of split halves 120C and 122C are apart from each other at the upper end of the operating pedal 12C. The left split half 120C is provided at the front upper end with a protruding portion 124C protruding upward in the form of a bay. The protruding portion 124C is provided with a mounting hole 78C. The mounting hole 78C has a circular shape as viewed in the left-and-right direction. In contrast, the right split half 122C is provided at the front upper end with a cut groove 126C. The cut groove 126C has a U shape formed with an edge of the right split half 122C recessed backward, as viewed in the left-and-right direction. Therefore, the cut groove 126C is open on the front side.

An upper end surface 121C located backward of the protruding portion 124C and upward of the boss 18 on the upper end surface of the left split half 120C is formed into a curved surface, any point on which is equidistant from the pivot center line 13 of the operating pedal 12C.

A magnet holder 54C includes a flat plate-shaped main body 70C, a cuboid case portion 128C, and a rod-like groove mechanism 130C. The case portion 128C protrudes backward from the lower end of the main body 70C. The undersurfaces of the main body 70C and the case portion 128C together form a continuous curved shape with a curvature substantially equal to that of the upper end surface 121C of the left split half 120C. Furthermore, the top surface of the case portion 128C also has a curved shape with a curvature substantially equal to that of the upper end surface 121C of the left split half 120C. A recessed portion 72C is formed in the case portion 128C. A magnet 58C formed in the form of an arc with a curvature substantially equal to that of the upper end surface 121C of the left split half 120C is housed in the recessed portion 72C. A snap-fit portion 74C is placed at the upper end of the main body 70C. The groove mechanism 130C is provided at the lower end of the main body 70C at a position adjacent to the front side of the case portion 128C.

The snap-fit portion 74C and the groove mechanism 130C are for mounting the case portion 128C of the magnet holder 54C on the upper end of the left split half 120C of the operating pedal 12C. In order to achieve this, the mounting hole 78C is provided in the protruding portion 124C at the front upper end of the left split half 120C of the operating pedal 12C. Moreover, the cut groove 126C is provided at the front upper end of the right split half 122C of the operating pedal 12C. The snap-fit portion 74C is inserted into the mounting hole 78C from the right to the left and engaged therewith. Furthermore, a part of the groove mechanism 130C is inserted into the cut groove 126C from the front to the back and engaged therewith. As a result, the case portion 128C of the magnet holder 54C is placed on the upper end surface 121C of the left split half 120C of the operating pedal 12C. Consequently, the magnet 58C of the magnet holder 54C is located in the form of an arc formed with a radius substantially equal to the distance between the pivot center line 13 and the IC. Consequently, the magnet 58C is placed at a position facing the IC.

Figure 21:
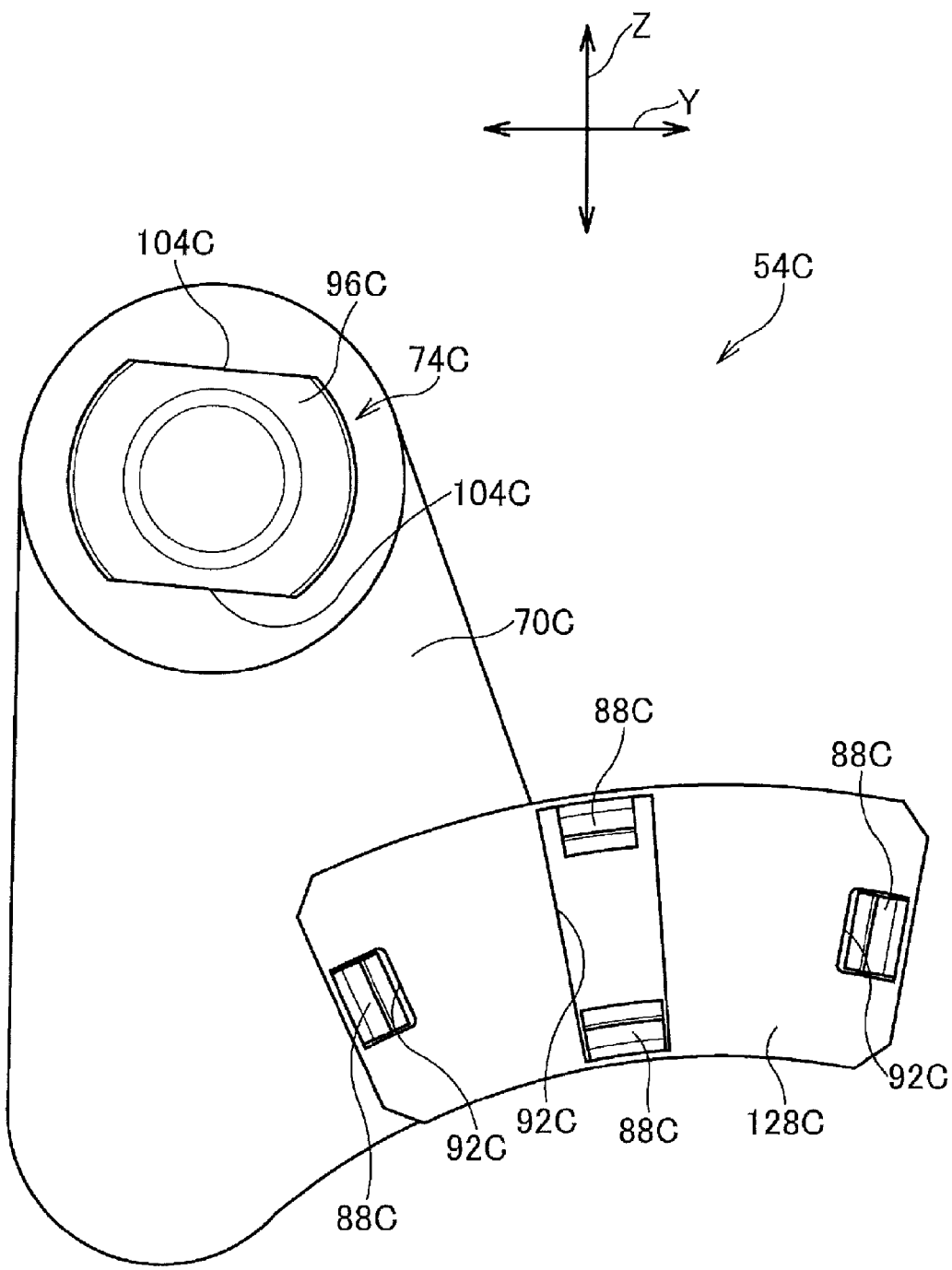
FIG. 21 is a side view illustrating the magnet holder.

The magnet holder 54C is described below in more detail. The snap-fit portion 74C protrudes from the upper end of the main body 70C of the magnet holder 54C. Moreover, the groove mechanism 130C protrudes from the lower end of the main body 70C. In the following description, as illustrated in FIGS. 19 to 21, the protruding direction of the snap-fit portion 74C and the groove mechanism 130C is referred to as the X direction, a direction in which the snap-fit portion 74C and the groove mechanism 130C are aligned on the main body 70C, a direction orthogonal to the X direction, is referred to as the Z direction, and a direction orthogonal to the X direction and the Z direction is referred to as the Y direction.

The case portion 128C protrudes outward from the main body 70C in a side, which is adjacent to the groove mechanism 130C in the Y direction, of the main body 70C of the magnet holder 54C. The case portion 128C is provided with the recessed portion 72C. The recessed portion 72C has an arc shape with a curvature substantially equal to that of the upper end surface 121C of the left split half 120C as in the magnet 58C. Moreover, the recessed portion 72C is in the form of a curved rectangle as viewed in the X direction, and the curved opposite sides are longer than the straight opposite sides. The recessed portion 72C includes an opening 82C, a bottom wall 84C, four side walls 86C, four snap-fit portions 88C, eight crush ribs 90C, and three window portions 92C. The opening 82C is provided in the case portion 128C on a side, from which the groove mechanism 130C protrudes, of the main body 70C. The other points are similar to (the recessed portion 72A of) the first embodiment. Hence, the detailed description of the recessed portion 72C is omitted.

The snap-fit portion 74C is similar to (the first snap-fit portion 74A of) the first embodiment. Therefore, the snap-fit portion 74C can deform elastically in the Y direction. A shaft 94C (except a cut portion 104C) is in the form of a cylinder having a constant diameter, but may have a tapered shape as in the first embodiment.

The groove mechanism 130C includes a shaft 132C, a ring-shaped groove portion 134C, and a pair of crush ribs 136C. The shaft 132C is placed at one end, in the Z direction, of the main body 70C opposite to the other end from which the snap-fit portion 74C protrudes, and protrudes along the X direction in a direction opposite to the direction where the snap-fit portion 74C protrudes. A side surface (circumferential edge) of the distal end of the shaft 132C is recessed inward along the circumferential direction to form the ring-shaped groove portion 134C. The pair of crush ribs 136C is formed in the form of a ring along the circumferential direction, spaced apart in the X direction, on an outer peripheral wall forming the bottom of the ring-shaped groove portion 134C.

Figure 23:
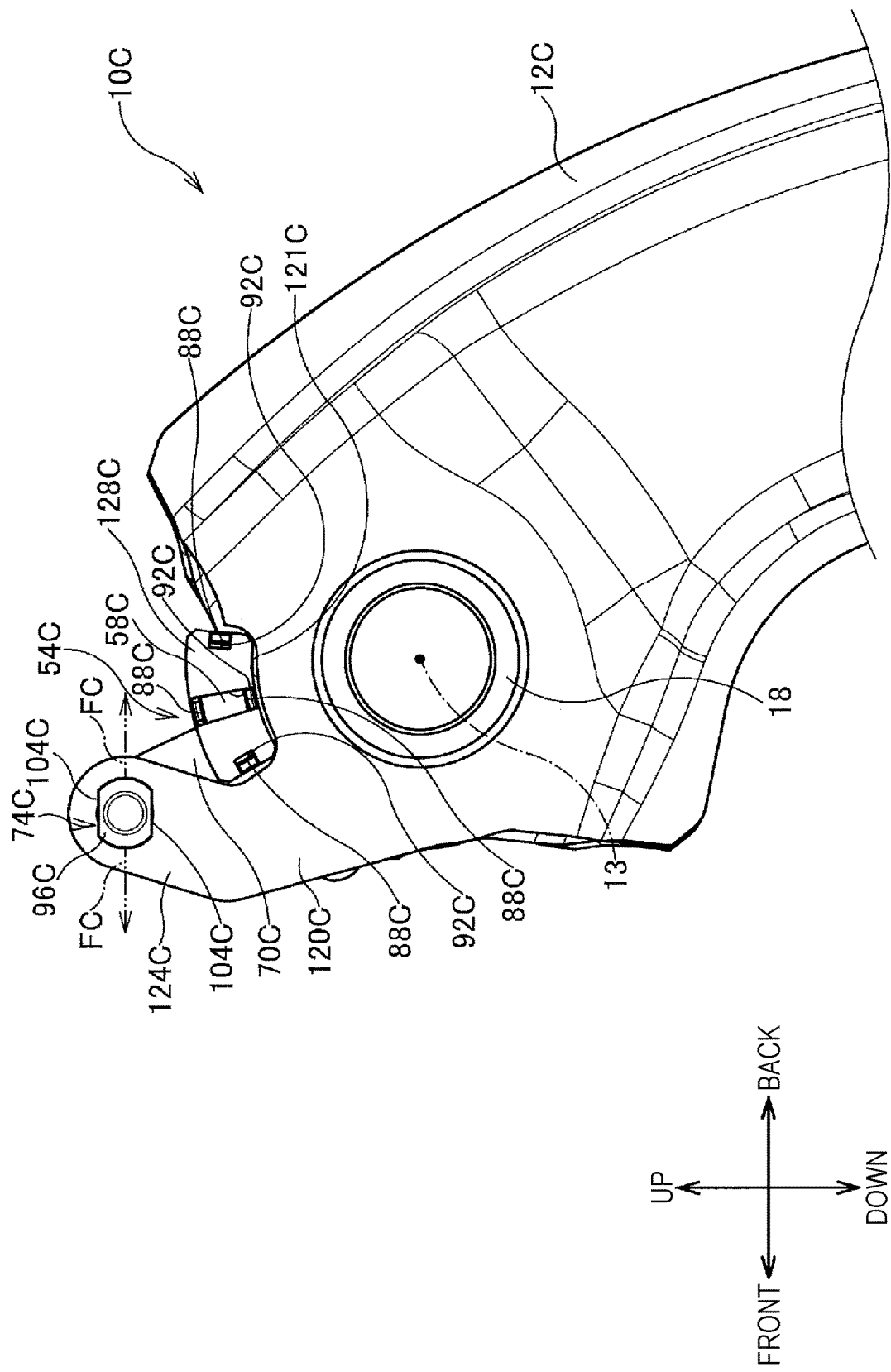
FIG. 23 is a side view illustrating a part of the vehicle operating pedal apparatus.
Figure 24:
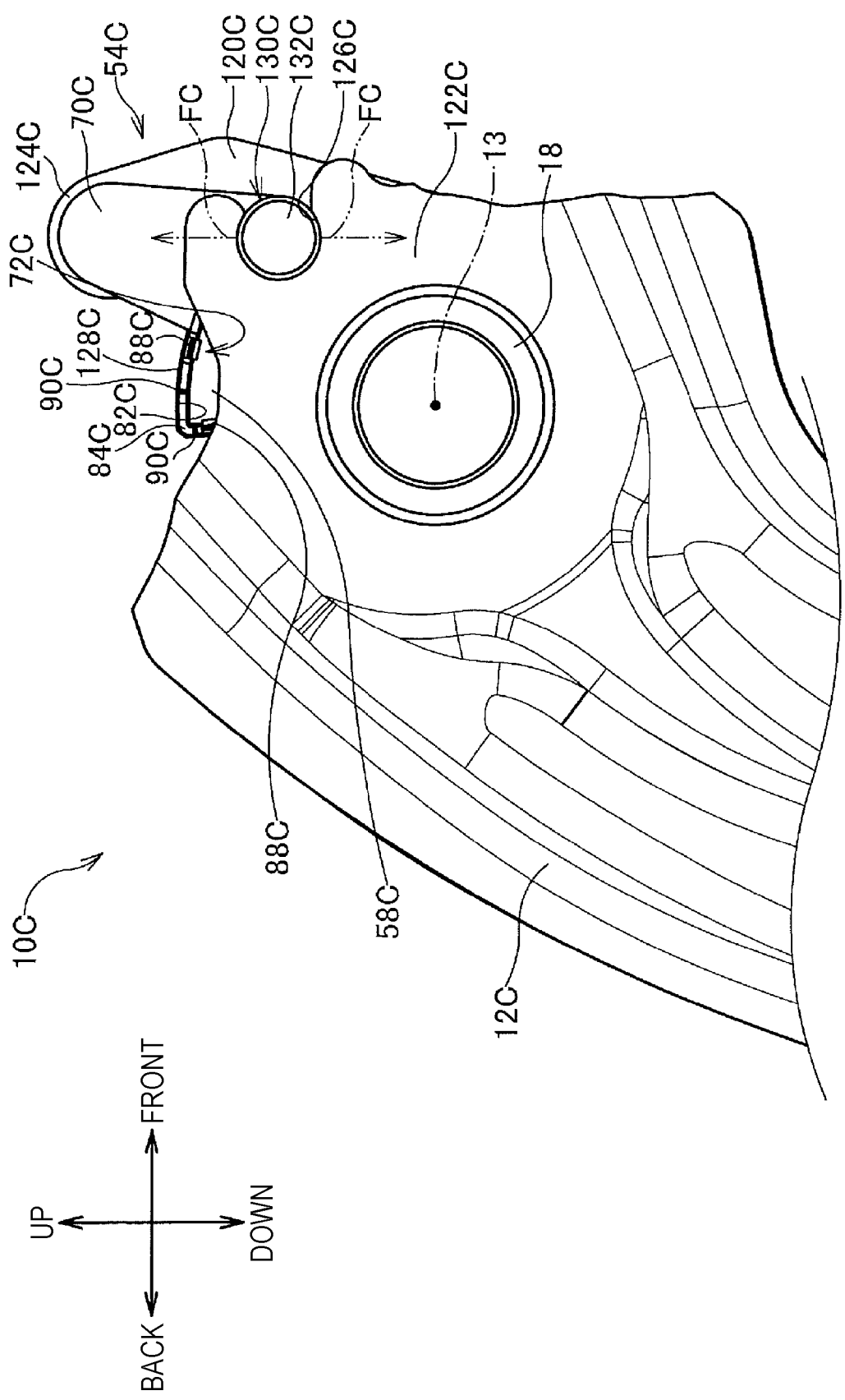
FIG. 24 is a side view illustrating a part of the vehicle operating pedal apparatus.
Figure 25:
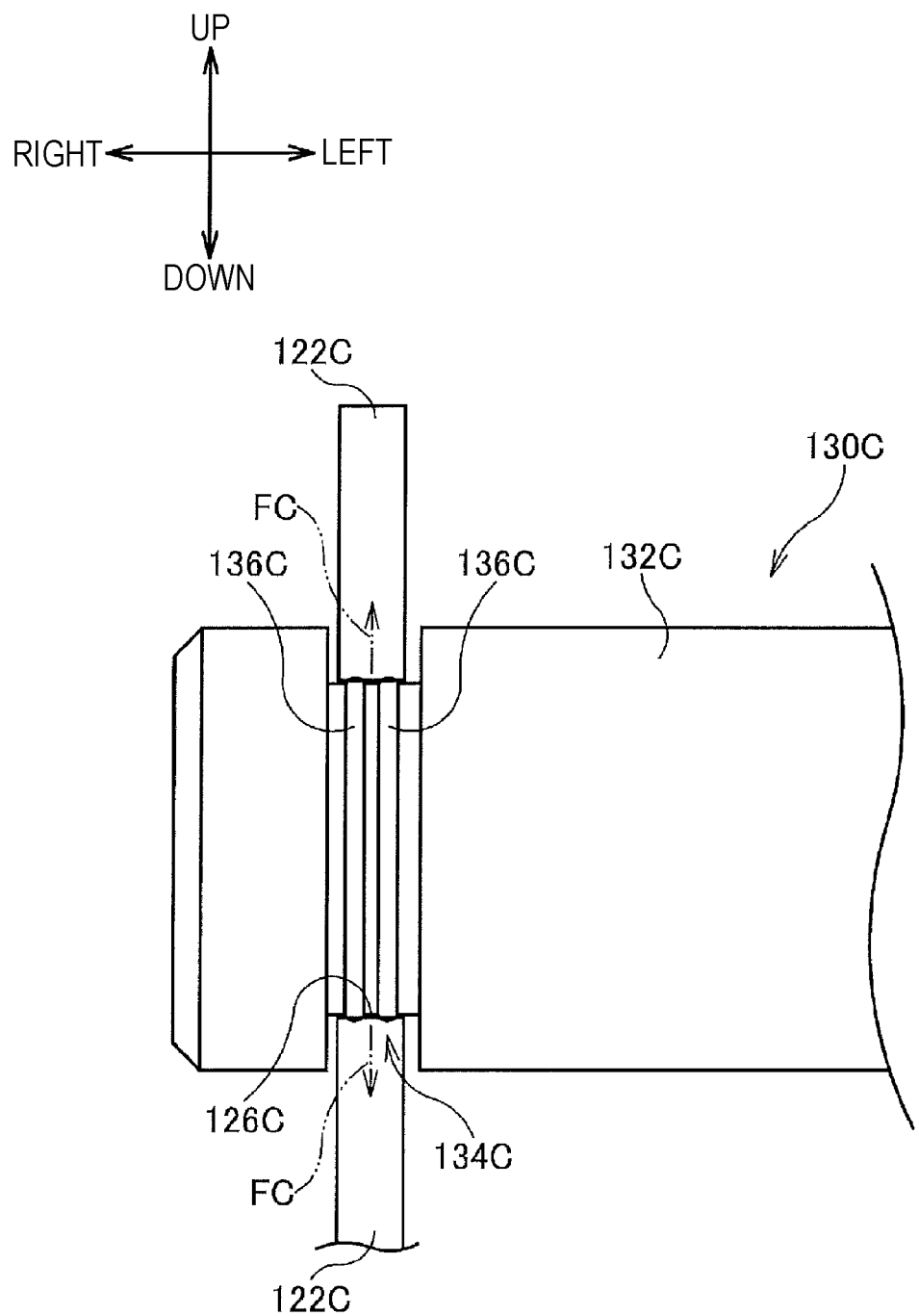
FIG. 25 is a diagram illustrating a fixing mechanism of the magnet holder and a right split half of an operating pedal.

As illustrated in FIGS. 22 to 24, the magnet 58C is placed in the recessed portion 72C of the main body 70C of the magnet holder 54C through the opening 82C of the recessed portion 72C. At this point in time, the magnet 58C is inscribed with the bottom wall 84C (refer to FIG. 19) in the recessed portion 72C. Moreover, a side, which is opposite to a bottom wall 84C side, of the magnet 58C is engaged with the locking hooks of the snap-fit portions 88C of the recessed portion 72C to be fastened. In this manner, the magnet 58C is easily fixed by the snap-fit portions 88C in the recessed portion 72C of the main body 70C. Furthermore, side wall 86C sides of the magnet 58C crush the crush ribs 90C of the recessed portion 72C. In this manner, the crush ribs 90C prevent the magnet 58C from wobbling in the recessed portion 72C of the main body 70C.

Furthermore, the magnet holder 54C is mounted on the upper end of the left split half 120C of the operating pedal 12C with the opening 82C of the recessed portion 72C of the main body 70C of the magnet holder 54C pointed toward the right split half 122C of the operating pedal 12C. Consequently, the case portion 128C of the magnet holder 54C is placed on the upper end surface 121C of the left split half 120C of the operating pedal 12C.

At this point in time, the snap-fit portion 74C of the magnet holder 54C is inserted into the mounting hole 78C of the operating pedal 12C from the right to the left, undergoing elastic deformation (compressive deformation) in the Y direction (refer to FIG. 21). A head 96C protrudes through the mounting hole 78C from a side (left side) opposite to a side (right side) where the snap-fit portion 74C is inserted, and is engaged with the left split half 120C of the operating pedal 12C. In contrast, the shaft 94C is located in the mounting hole 78C, and a pressing force FC (refer to FIG. 23) that presses back the peripheral wall of the mounting hole 78C in the Y direction is generated in the shaft 94C. The Y direction is substantially the same as the front-and-back direction in the third embodiment.

On the other hand, the groove mechanism 130C of the magnet holder 54C is inserted into the cut groove 126C of the right split half 122C from the front to the back. At this point in time, as illustrated in FIGS. 24 and 25, the ring-shaped groove portion 134C of the shaft 132C enters the cut groove 126C to press the crush ribs 136C of the shaft 132C against the peripheral wall of the cut groove 126C and then be crushed. Consequently, at least a pressing force FC that presses back the peripheral wall of the cut groove 126C in the up-and-down direction is generated in the shaft 132C.

In this manner, the magnet holder 54C is fixed to the operating pedal 12C by the two pressing forces FC generated in the different directions between the snap-fit portion 74C and the groove mechanism 130C.

(4) Fourth Embodiment

Figure 26:
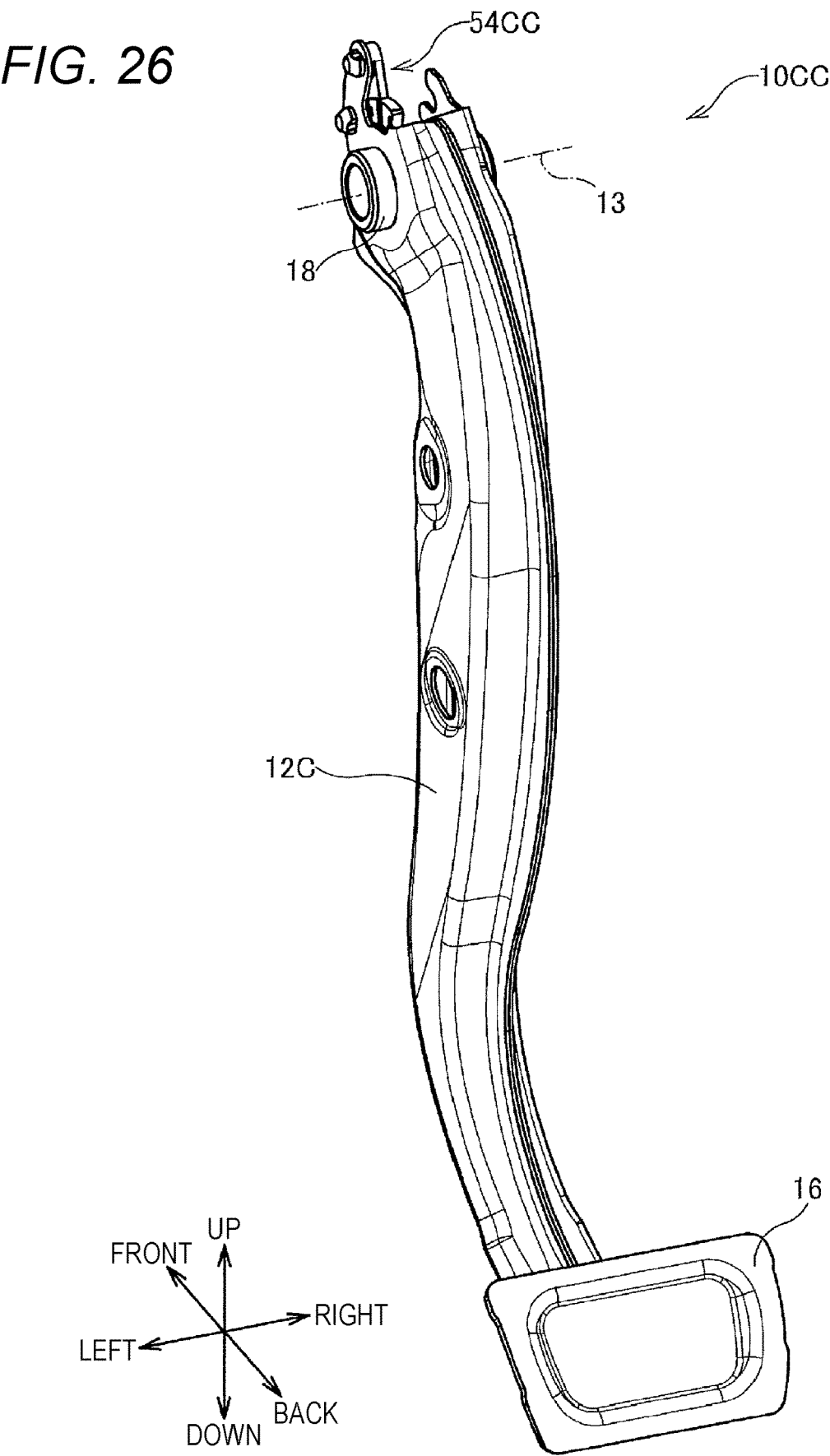
FIG. 26 is a perspective view illustrating a vehicle operating pedal apparatus of a fourth embodiment.
Figure 27:
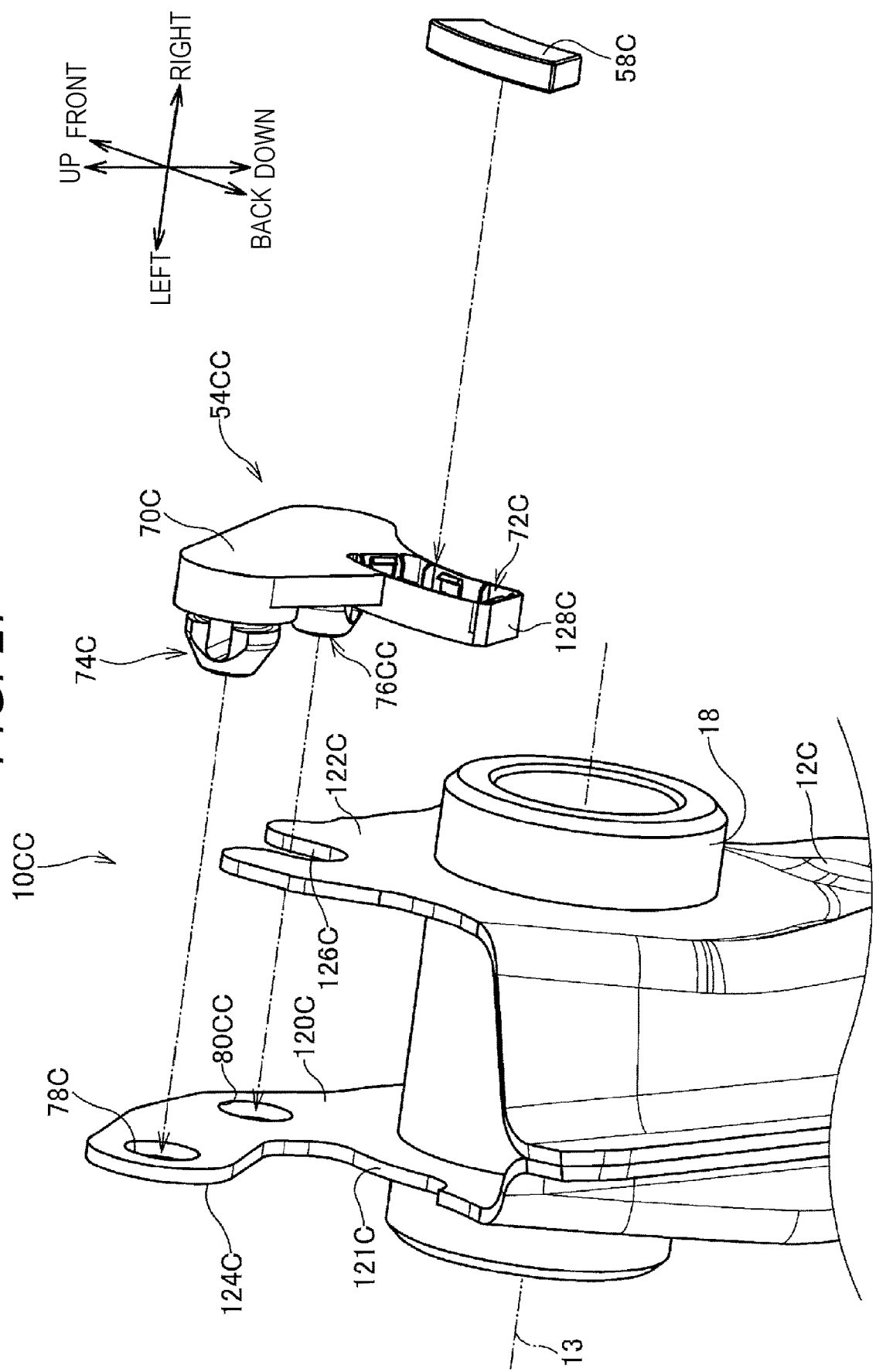
FIG. 27 is an exploded perspective view illustrating a part of the vehicle operating pedal apparatus.
Figure 28:
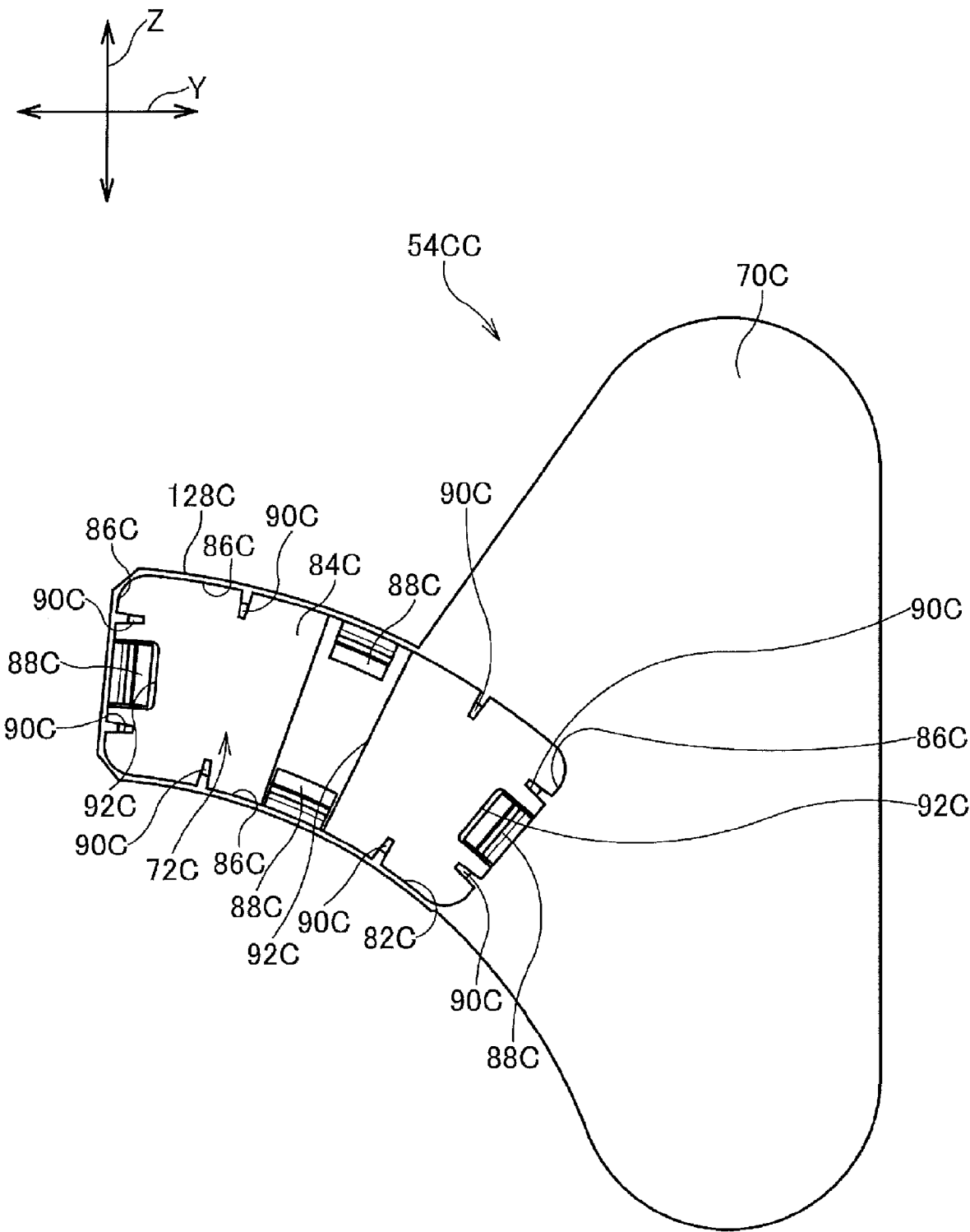
FIG. 28 is a side view illustrating a magnet holder.

As illustrated in FIGS. 26 and 27, a vehicle operating pedal apparatus 10CC of the fourth embodiment includes the operating pedal 12C similar to that of the third embodiment. However, a second mounting hole 80CC is provided in the front upper end of the left split half 120C and downward of the protruding portion 124C. The second mounting hole 80CC has a circular shape as viewed in the left-and-right direction. A mounting hole with the reference sign 78C is referred to as the first mounting hole 78C in the fourth embodiment.

A magnet holder 54CC includes the flat plate-shaped main body 70C and the cuboid case portion 128C. In comparison with the magnet holder 54C of the third embodiment, the main body 70C of the magnet holder 54CC is provided with a second snap-fit portion 76CC whereas the groove mechanism 130C is omitted from the main body 70C. Therefore, for example, the case portion 128C, the recessed portion 72C provided in the case portion 128C, and the magnet 58C housed in the recessed portion 72C are similar to those of the third embodiment. Therefore, detailed descriptions thereof are omitted. The second snap-fit portion 76CC is described below in detail. A snap-fit portion with the reference sign 74C is referred to as the first snap-fit portion 74C in the fourth embodiment.

The first snap-fit portion 74C and the second snap-fit portion 76CC are for mounting the case portion 128C of the magnet holder 54CC on the upper end of the left split half 120C of the operating pedal 12C. In order to achieve this, the first mounting hole 78C and the second mounting hole 80CC are provided in the front upper end of the left split half 120C of the operating pedal 12C. Both of the first snap-fit portion 74C and the second snap-fit portion 76CC are inserted into the first mounting hole 78C and the second mounting hole 80CC from the right to the left and engaged therewith. As a result, the case portion 128C of the magnet holder 54CC is placed on the upper end surface 121C of the left split half 120C of the operating pedal 12C. Consequently, the magnet 58C of the magnet holder 54CC is located in the form of an arc formed with a radius substantially equal to the distance between the pivot center line 13 and the IC (not illustrated). Consequently, the magnet 58C is placed at a position facing the IC.

The magnet holder 54CC is described below in more detail. The first snap-fit portion 74C protrudes from the upper end of the main body 70C of the magnet holder 54CC. Moreover, the second snap-fit portion 76CC protrudes from the lower end of the main body 70C. The first snap-fit portion 74C and the second snap-fit portion 76CC protrude from the main body 70C toward a side opposite to an opening 82C side of the recessed portion 72C.

The first snap-fit portion 74C is similar to (the first snap-fit portion 74A of) the first embodiment. Therefore, the first snap-fit portion 74C can deform elastically in the Y direction. The shaft 94C (except the cut portion 104C) is in the form of a cylinder having a constant diameter, but may have a tapered shape as in the first embodiment.

The second snap-fit portion 76CC is similar to (the second snap-fit portion 76A of) the first embodiment. Therefore, the second snap-fit portion 76CC can deform elastically in the Z direction. A shaft 94CC (except a cut portion 104CC) is in the form of a cylinder having a constant diameter, but may have a tapered shape as in the first embodiment.

Figure 31:
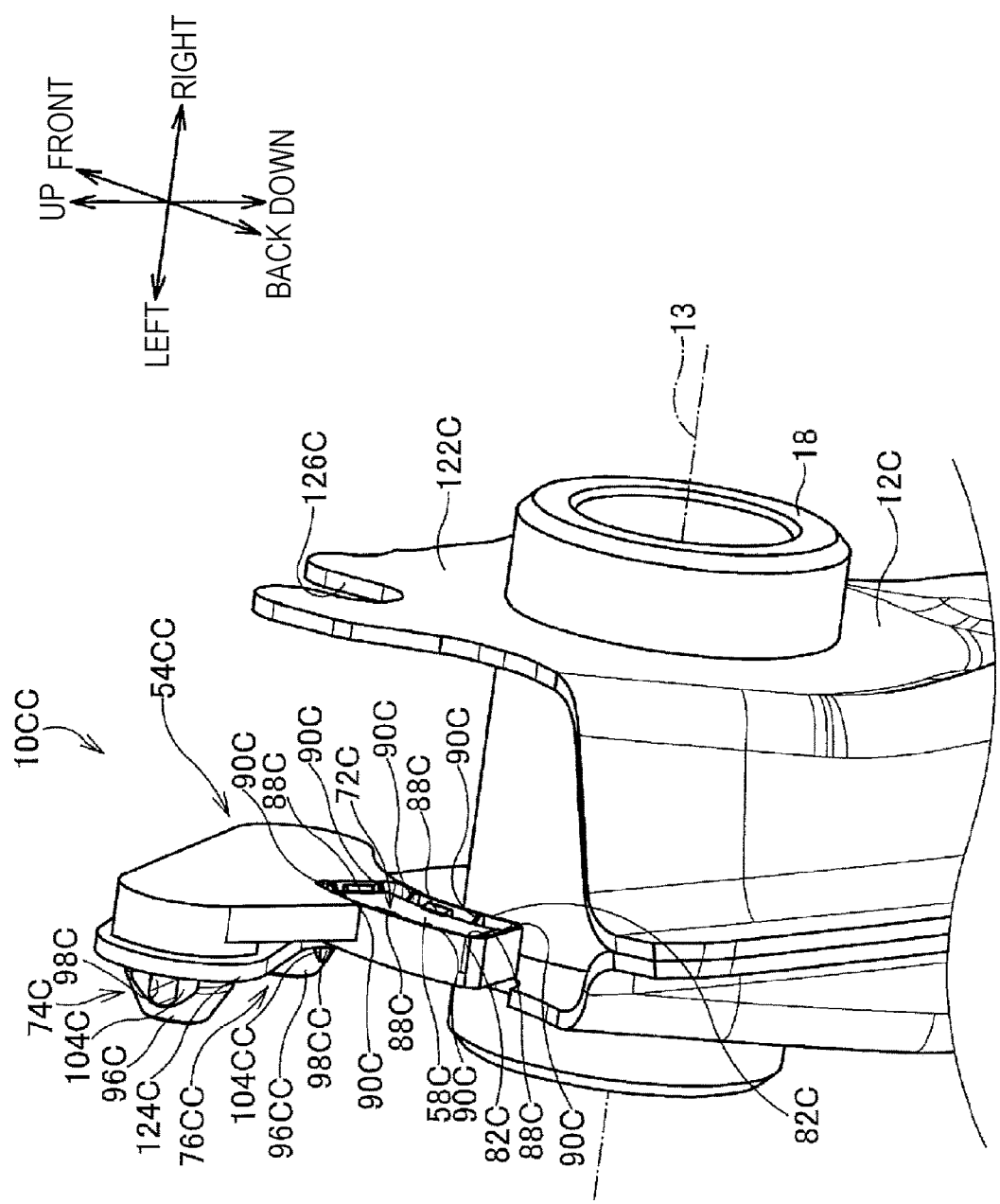
FIG. 31 is a perspective view illustrating a part of the vehicle operating pedal apparatus.
Figure 32:
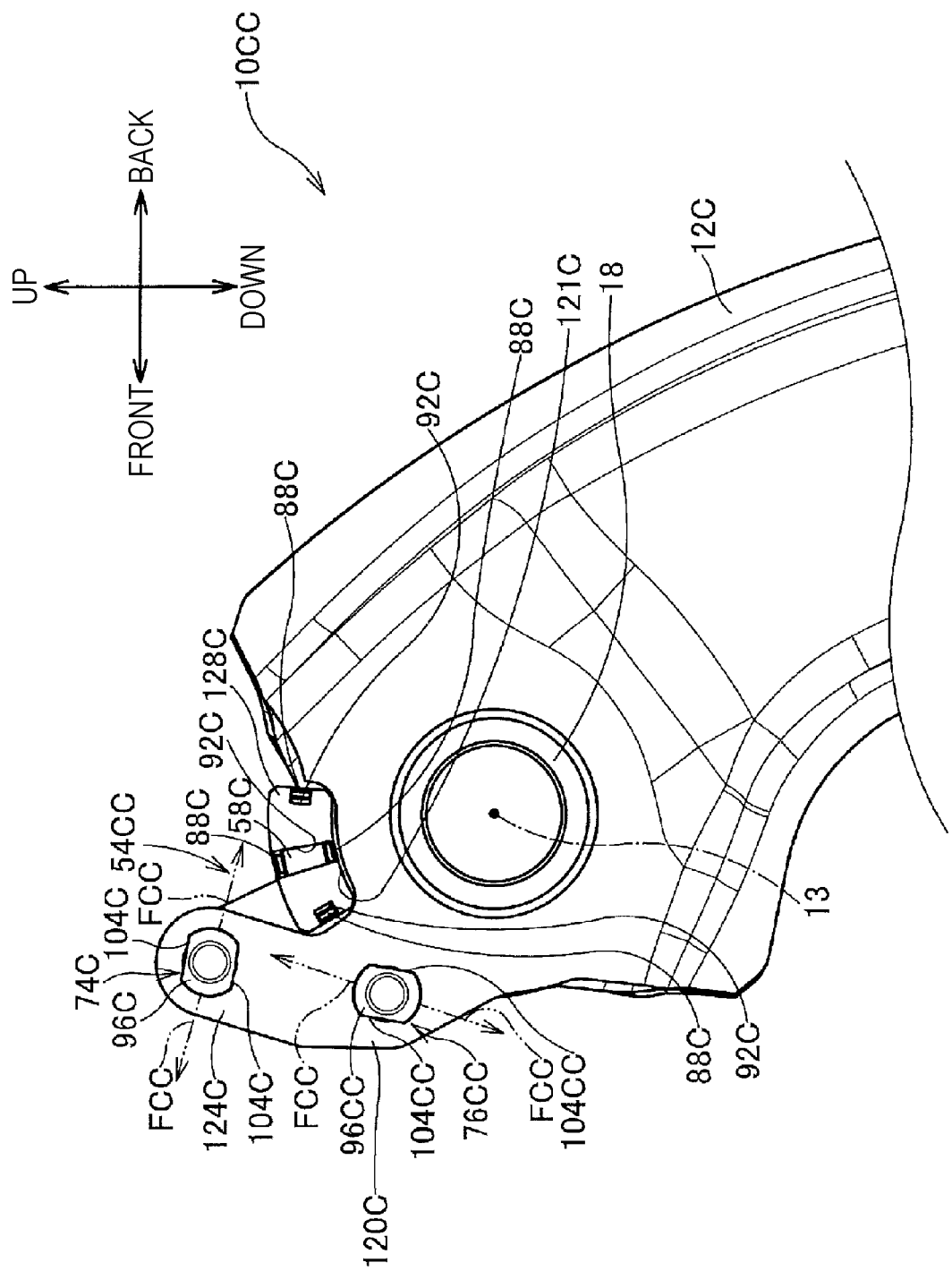
FIG. 32 is a side view illustrating a part of the vehicle operating pedal apparatus.

As illustrated in FIGS. 31 to 33, the magnet 58C is placed in the recessed portion 72C of the main body 70C of the magnet holder 54CC through the opening 82C of the recessed portion 72C. At this point in time, the magnet 58C is inscribed with the bottom wall 84C (refer to FIG. 28) in the recessed portion 72C. Moreover, the side, which is opposite to the bottom wall 84C side, of the magnet 58C is engaged with the locking hooks of the snap-fit portions 88C of the recessed portion 72C to be fastened. In this manner, the magnet 58C is easily fixed by the snap-fit portions 88C in the recessed portion 72C of the main body 70C. Furthermore, the side wall 86C sides of the magnet 58C crush the crush ribs 90C of the recessed portion 72C. In this manner, the crush ribs 90C prevent the magnet 58C from wobbling in the recessed portion 72C of the main body 70C.

Furthermore, the magnet holder 54CC is mounted on the upper end of the left split half 120C of the operating pedal 12C with the opening 82C of the recessed portion 72C of the main body 70C of the magnet holder 54CC pointed toward the right split half 122C of the operating pedal 12C. Consequently, the case portion 128C of the magnet holder 54CC is placed on the upper end surface 121C of the left split half 120C of the operating pedal 12C.

Figure 30:
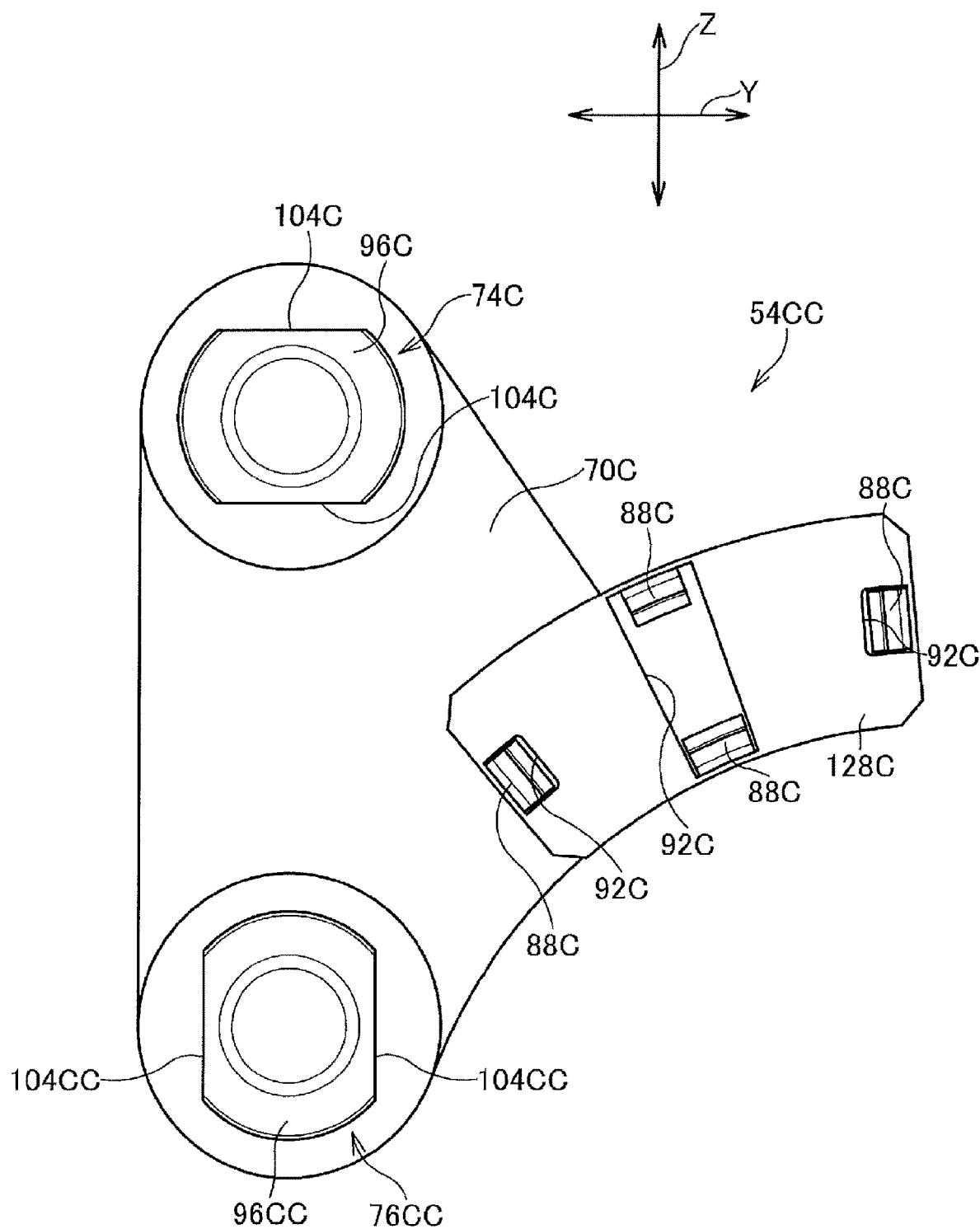
FIG. 30 is a front view illustrating the magnet holder.

At this point in time, the first snap-fit portion 74C of the magnet holder 54CC is inserted into the first mounting hole 78C of the operating pedal 12C from the right to the left, undergoing elastic deformation (compressive deformation) in the Y direction (refer to FIG. 30). The head 96C protrudes through the first mounting hole 78C from the side (left side) opposite to the side (right side) where the first snap-fit portion 74C is inserted, and is engaged with the left split half 120C of the operating pedal 12C. In contrast, the shaft 94C is located in the first mounting hole 78C, and a pressing force FCC (refer to FIG. 32) that presses back the peripheral wall of the first mounting hole 78C in the Y direction is generated in the shaft 94C. The Y direction is substantially the same as the front-and-back direction in the fourth embodiment.

Similarly, the second snap-fit portion 76CC of the magnet holder 54CC is inserted into the second mounting hole 80CC of the operating pedal 12C, undergoing elastic deformation (compressive deformation) in the Z direction (refer to FIG. 30). A head 96CC protrudes through the second mounting hole 80CC from a side (left side) opposite to a side (right side) where the second snap-fit portion 76CC is inserted, and is engaged with the left split half 120C of the operating pedal 12C. In contrast, the shaft 94CC is located in the second mounting hole 80CC, and a pressing force FCC that presses back the peripheral wall of the second mounting hole 80CC in the Z direction is generated in the shaft 94CC. The Z direction is substantially the same as the up-and-down direction in the fourth embodiment.

In this manner, the magnet holder 54CC is fixed to the operating pedal 12C by the two pressing forces FCC generated in the different directions between the first snap-fit portion 74C and the second snap-fit portion 76CC.

(5) Fifth Embodiment

Figure 34:
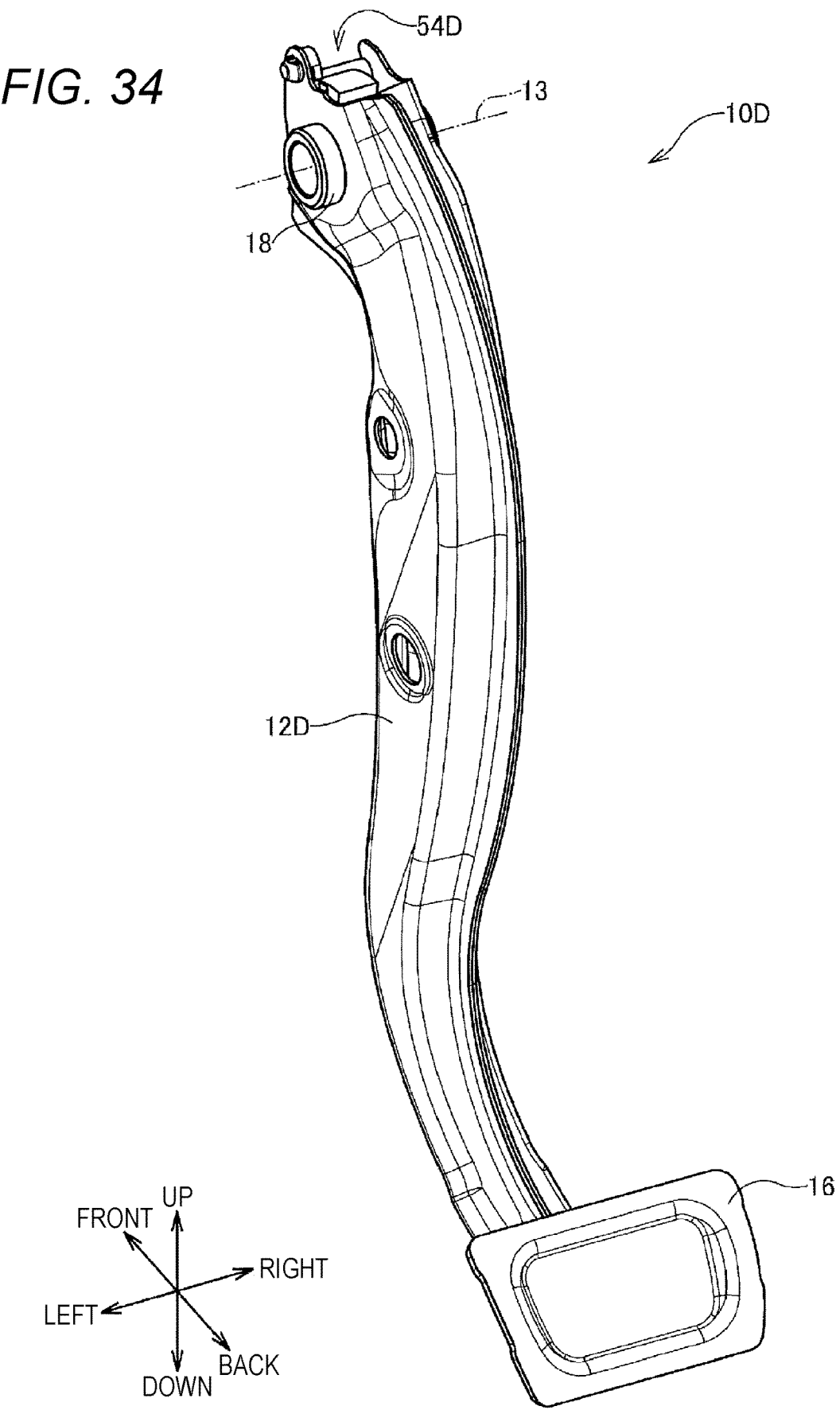
FIG. 34 is a perspective view illustrating a vehicle operating pedal apparatus of a fifth embodiment.
Figure 35:
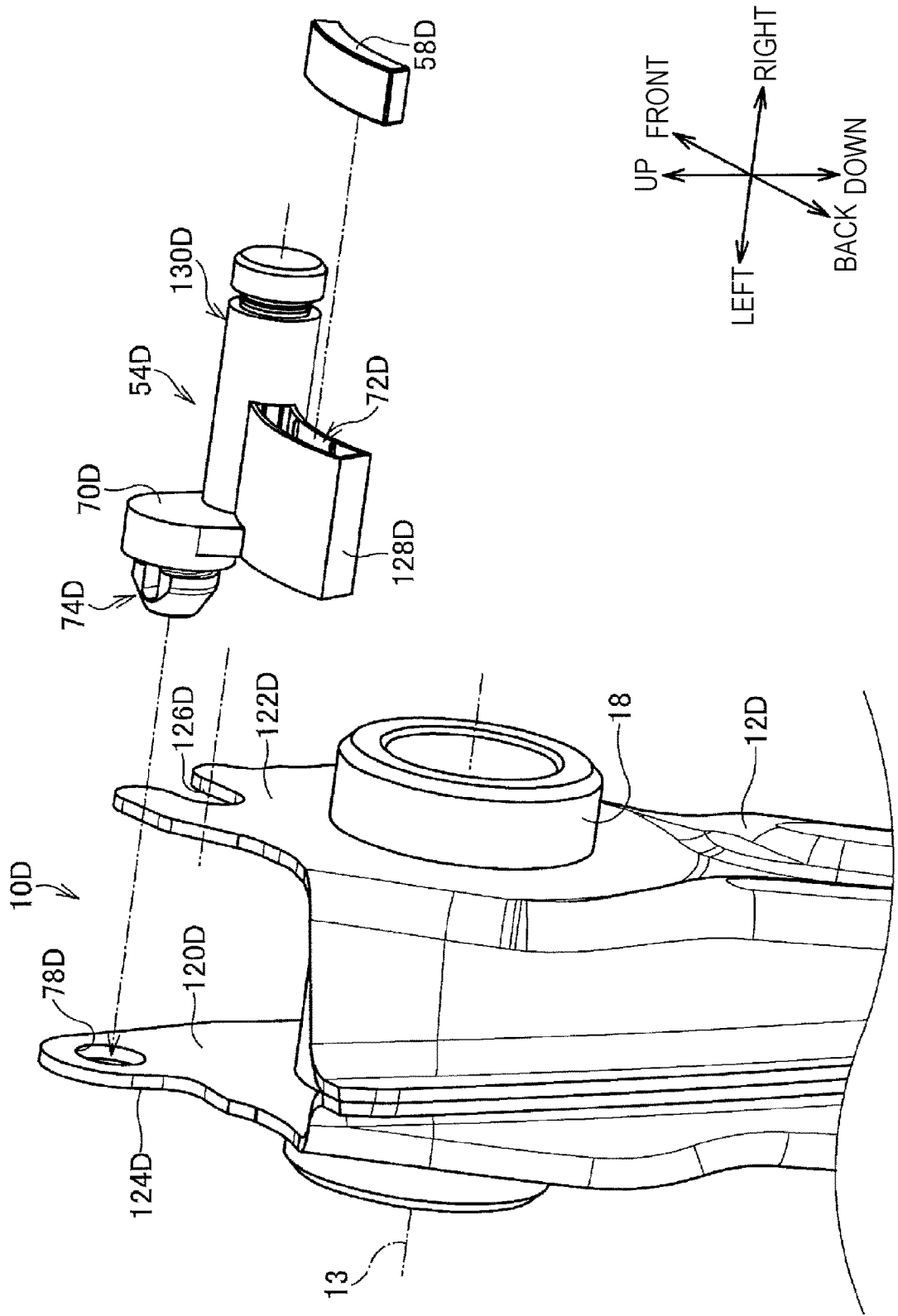
FIG. 35 is an exploded perspective view illustrating a part of the vehicle operating pedal apparatus.

As illustrated in FIGS. 34 and 35, a vehicle operating pedal apparatus 10D of the fifth embodiment includes an operating pedal 12D. When the stepping part 16 at the lower end of the operating pedal 12D is stepped forward, the operating pedal 12D pivots on the pivot center line 13 via, for example, the boss 18 at the upper end of the operating pedal 12D as in (the operating pedal 12A of) the first embodiment. An angle sensor detects the angle of rotation of the operating pedal 12D. However, in the fifth embodiment, the illustration of, for example, a support member that pivotably supports the operating pedal 12D is omitted. Furthermore, the illustrations of an IC holder and an IC among components of the angle sensor are omitted. The IC is placed upward of the upper end surface of the operating pedal 12D.

The operating pedal 12D is similar to (the operating pedal 12C of) the third embodiment. Therefore, the detailed description of the operation pedal 12D is omitted.

A magnet holder 54D includes a flat plate-shaped main body 70D, a cuboid case portion 128D, and a rod-like groove mechanism 130D. The case portion 128D protrudes backward from the lower end of the main body 70D. The undersurfaces of the main body 70D and the case portion 128D together form a continuous curved surface, any point on which is equidistant from the pivot center line 13 of the operating pedal 12D. Furthermore, the top surface of the case portion 128D also has a curved surface, any point on which is equidistant from the pivot center line 13 of the operating pedal 12D. A recessed portion 72D is formed in the case portion 128D. A magnet 58D formed in the form of an arc with a curvature substantially equal to that of the case portion 128D is housed in the recessed portion 72D. A snap-fit portion 74D is placed at the upper end of the main body 70D. The groove mechanism 130D is provided at the lower end of the main body 70D at a position contiguous with the front side of the case portion 128D.

The snap-fit portion 74D and the groove mechanism 130D are for mounting the case portion 128D of the magnet holder 54D on the upper end of the operating pedal 12D between a left split half 120D and a right split half 122D of the operating pedal 12D. In order to achieve this, a mounting hole 78D is provided in a protruding portion 124D at the front upper end of the left split half 120D of the operating pedal 12D. Moreover, a cut groove 126D is provided at the front upper end of the right split half 122D of the operating pedal 12D. The snap-fit portion 74D is inserted into the mounting hole 78D from the right to the left and engaged therewith. Furthermore, a part of the groove mechanism 130D is inserted into the cut groove 126D from the front to the back and engaged therewith. As a result, the case portion 128D of the magnet holder 54D is placed at the upper end of the operating pedal 12D between the left split half 120D and the right split half 122D of the operating pedal 12D. Consequently, the magnet 58D of the magnet holder 54D is located in the form of an arc, any point on which is equidistant from the pivot center line 13, at the upper end of the operating pedal 12D, and is placed at a position facing the IC in the up-and-down direction.

Figure 38:
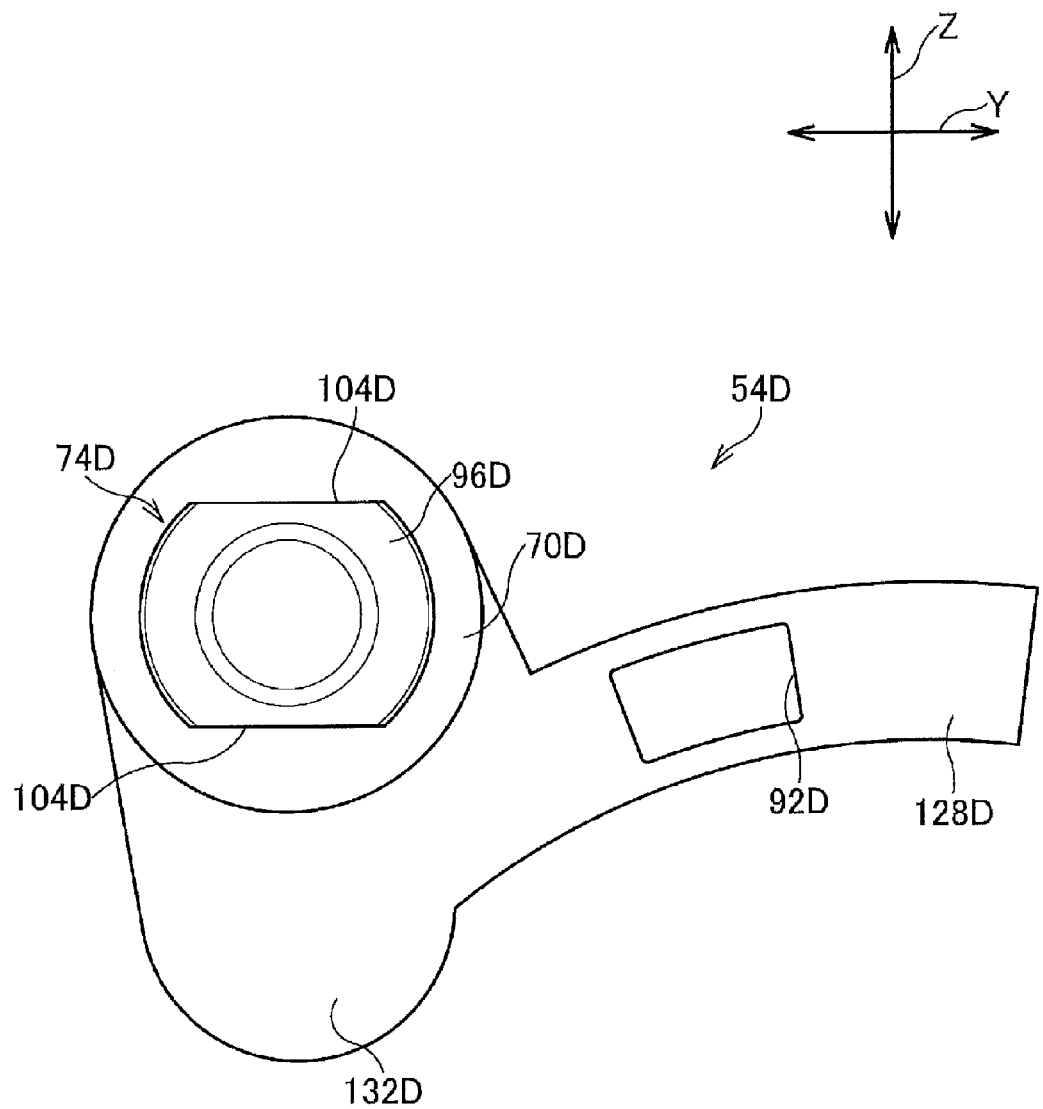
FIG. 38 is a side view illustrating the magnet holder.

The magnet holder 54D is described below in more detail. The snap-fit portion 74D protrudes from the upper end of the main body 70D of the magnet holder 54D. Moreover, the groove mechanism 130D protrudes from the lower end of the main body 70D. In the following description, as illustrated in FIGS. 36 to 38, the protruding direction of the snap-fit portion 74D and the groove mechanism 130D is referred to as the X direction, a direction in which the snap-fit portion 74D and the groove mechanism 130D are aligned on the main body 70D, a direction orthogonal to the X direction, is referred to as the Z direction, and a direction orthogonal to the X direction and the Z direction is referred to as the Y direction.

The case portion 128D protrudes outward from of the main body 70D in a side, which is contiguous with the groove mechanism 130D in the Y direction, of the main body 70D of the magnet holder 54D. The case portion 128D is provided with the recessed portion 72D. The recessed portion 72D has an arc shape, any point on which is equidistant from the pivot center line 13 of the operating pedal 12D. Moreover, the recessed portion 72D is in the form of a curved rectangle as viewed in the X direction, and the curved opposite sides are longer than the straight opposite sides. The recessed portion 72D includes an opening 82D, a bottom wall 84D, and four side walls 86D. The opening 82D is provided in the case portion 128D on a side, from which the groove mechanism 130D protrudes, of the main body 70D.

The bottom wall 84D faces the opening 82D in the X direction (the protruding direction of the snap-fit portion 74D and the groove mechanism 130D). The side walls 86D are provided between the circumferential edge of the opening 82D and the circumferential edge of the bottom wall 84D. A pair of crush ribs 90D stands on each of the side walls 86D, spaced apart in the Y or Z direction.

A window portion 92D is provided in the center of the bottom wall 84D. The window portion 92D penetrates the main body 70D.

The snap-fit portion 74D is similar to (the first snap-fit portion 74A of) the first embodiment. Therefore, the snap-fit portion 74D can deform elastically in the Y direction. A shaft 94D (except a cut portion 104D) is in the form of a cylinder having a constant diameter, but may have a tapered shape as in the first embodiment.

The groove mechanism 130D is similar to (the groove mechanism 130C of) the third embodiment. Therefore, the detailed description of the groove mechanism 130D is omitted.

Figure 39:
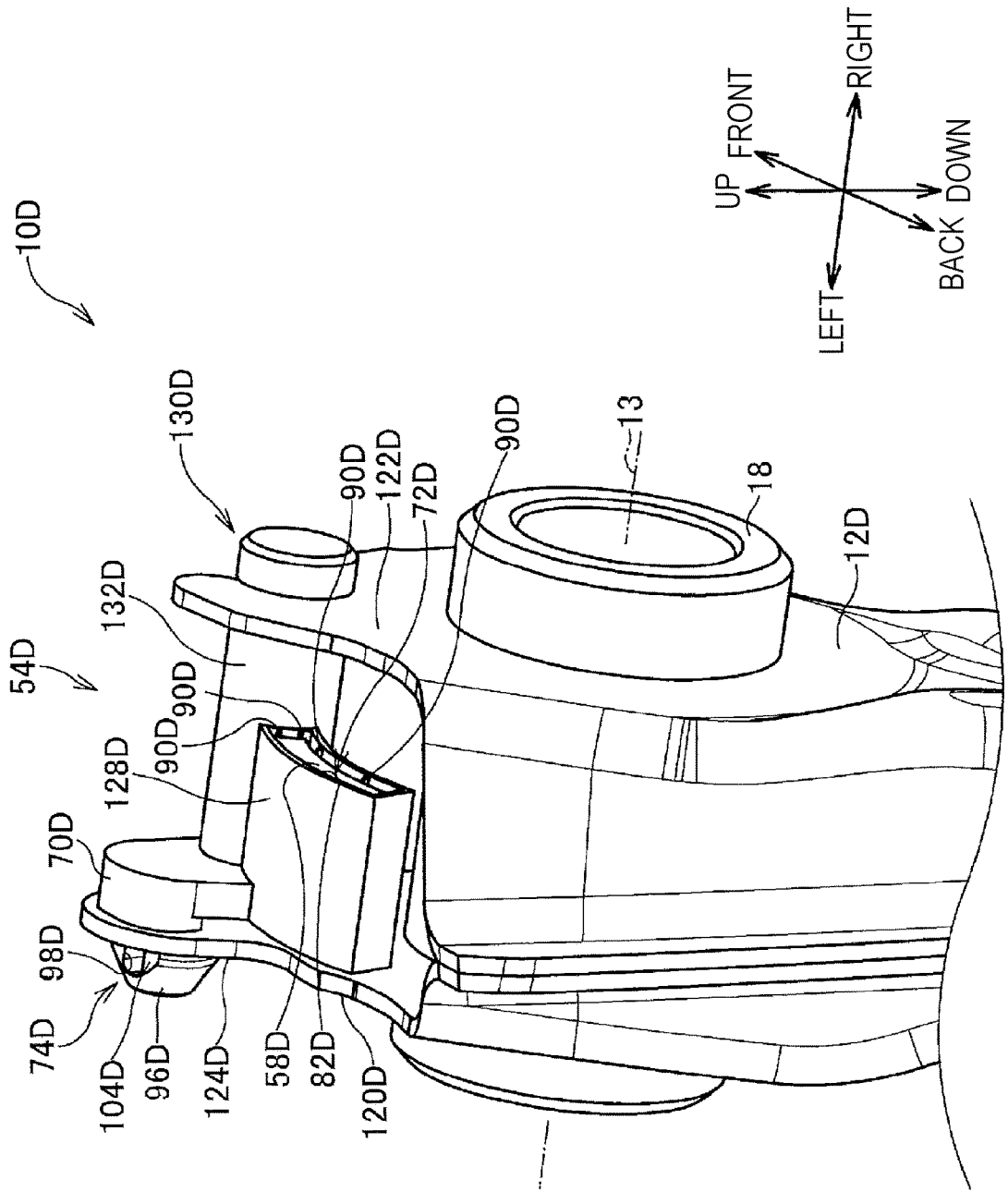
FIG. 39 is a perspective view illustrating a part of the vehicle operating pedal apparatus.
Figure 40:
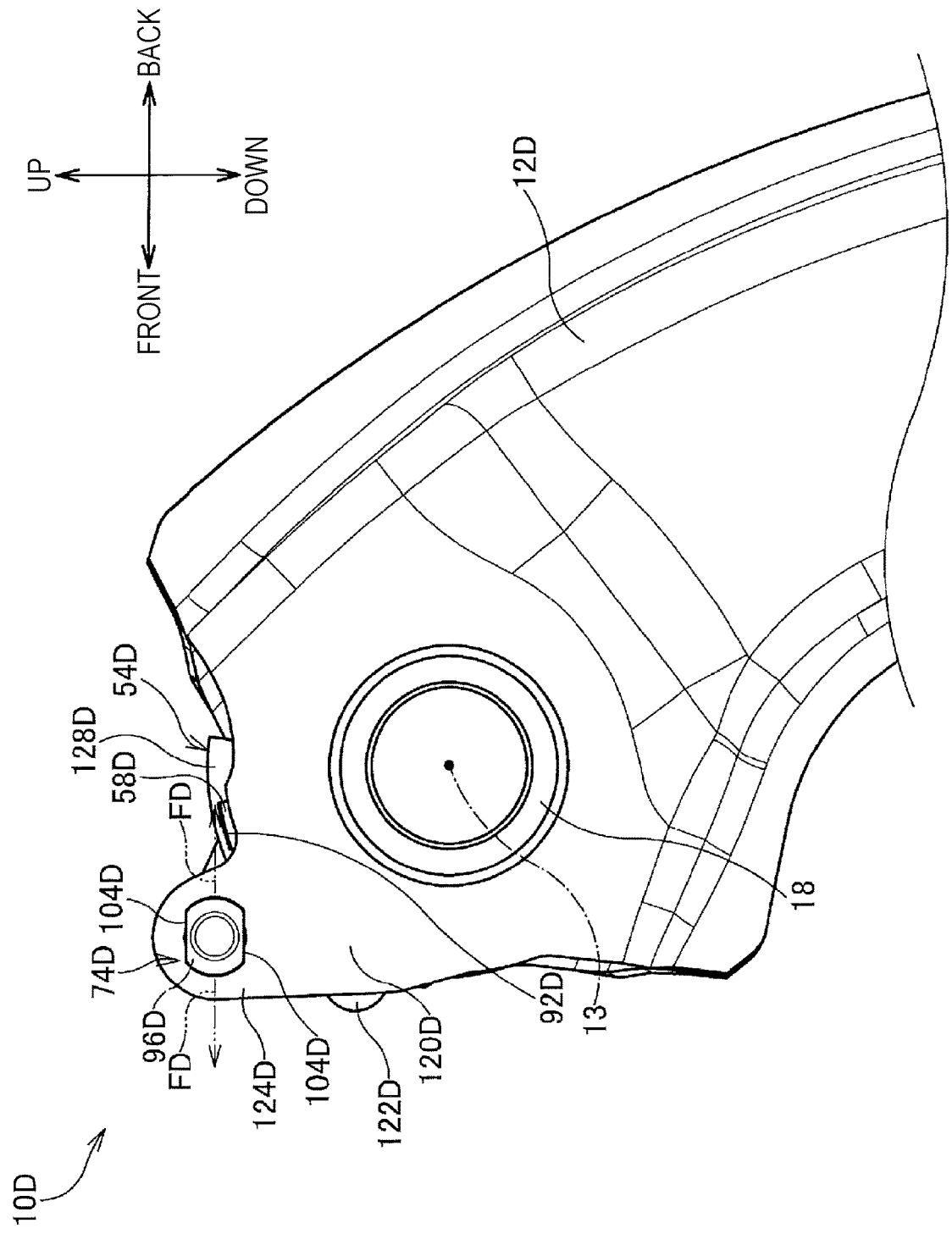
FIG. 40 is a side view illustrating a part of the vehicle operating pedal apparatus.
Figure 41:
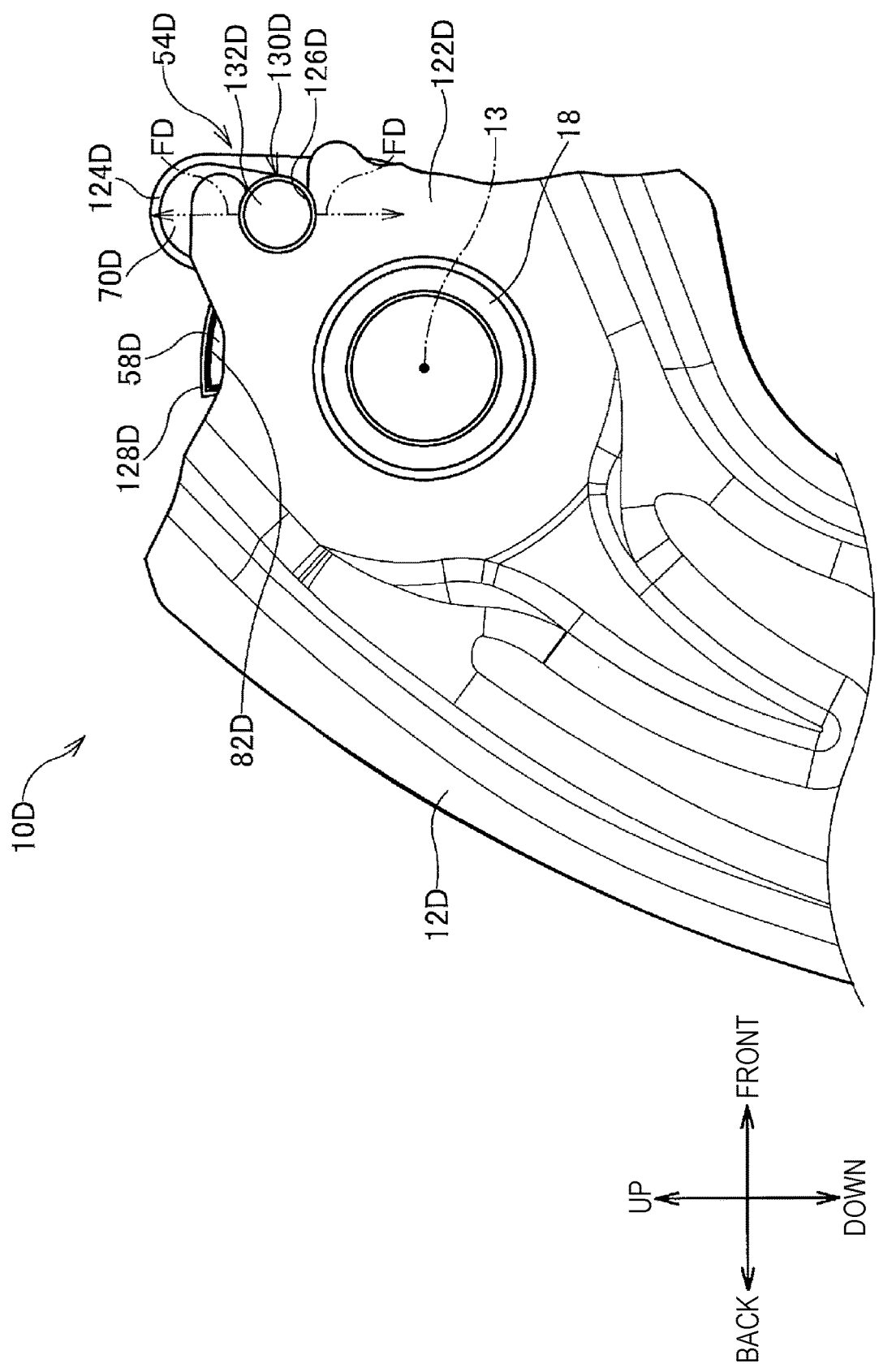
FIG. 41 is a side view illustrating a part of the vehicle operating pedal apparatus.

As illustrated in FIGS. 39 to 41, the magnet 58D is placed in the recessed portion 72D of the main body 70D of the magnet holder 54D through the opening 82D of the recessed portion 72D. At this point in time, the magnet 58D is inscribed with the bottom wall 84D (refer to FIG. 36) in the recessed portion 72D. Moreover, side wall 86D sides of the magnet 58D crush the crush ribs 90D of the recessed portion 72D. In this manner, the crush ribs 90D fix the magnet 58D easily in the recessed portion 72D of the main body 70D and prevent the magnet 58D from wobbling in the recessed portion 72D of the main body 70D.

Furthermore, the magnet holder 54D is mounted on the upper end of the operating pedal 12D with the opening 82D of the recessed portion 72D of the main body 70D of the magnet holder 54D pointed toward the right split half 122D of the operating pedal 12D. Consequently, the case portion 128D of the magnet holder 54D is placed at the upper end of the operating pedal 12D between the left split half 120D and the right split half 122D of the operating pedal 12D.

At this point in time, the snap-fit portion 74D of the magnet holder 54D is inserted into the mounting hole 78D of the operating pedal 12D from the right to the left, undergoing elastic deformation (compressive deformation) in the Y direction (refer to FIG. 38). A head 96D protrudes through the mounting hole 78D from a side (left side) opposite to a side (right side) where the snap-fit portion 74D is inserted, and is engaged with the left split half 120D of the operating pedal 12D. In contrast, the shaft 94D is located in the mounting hole 78D, and a pressing force FD (refer to FIG. 40) that presses back the peripheral wall of the mounting hole 78D in the Y direction is generated in the shaft 94D. The Y direction is substantially the same as the front-and-back direction in the fourth embodiment.

On the other hand, the groove mechanism 130D of the magnet holder 54D is inserted into the cut groove 126D of the right split half 122D from the front to the back. At this point in time, a ring-shaped groove portion 134D of a shaft 132D enters the cut groove 126D to press crush ribs 136D of the shaft 132D against the peripheral wall of the cut groove 126D and then be crushed. Consequently, at least a pressing force FD (refer to FIG. 41) that presses back the peripheral wall of the cut groove 126D in the up-and-down direction is generated in the shaft 132D.

In this manner, the magnet holder 54D is fixed to the operating pedal 12D by the two pressing forces FD generated in the different directions between the snap-fit portion 74D and the groove mechanism 130D.

(6) Summary

As described above in detail, the support member 14 pivotably supports the operating pedal 12A in the vehicle operating pedal apparatus 10A of the first embodiment. When the angle of rotation of the operating pedal 12A is detected, the magnet 58A is used. The magnet 58A is housed in the magnet holder 54A in the engaged state. The magnet holder 54A is fixed to the operating pedal 12A by the first snap-fit portion 74A and the first mounting hole 78A, and the second snap-fit portion 76A and the second mounting hole 80A. In terms of the first snap-fit portion 74A and the first mounting hole 78A, the magnet holder 54A is fixed to the operating pedal 12A with the pressing force FA in the Y direction. In contrast, in terms of the second snap-fit portion 76A and the second mounting hole 80A, the magnet holder 54A is fixed to the operating pedal 12A with the pressing force FA in the Z direction that is different from the Y direction. In this manner, in the vehicle operating pedal apparatus 10A of the first embodiment, the magnet 58A for detecting the angle of rotation of the operating pedal 12A is mounted on the operating pedal 12A via the magnet holder 54A that is fixed to the operating pedal 12A with the two pressing forces FA in the different directions. Hence, the accuracy of the mounting position of the magnet 58A is secured, and the magnet 58A resists being detached from the operating pedal 12A.

The same point can be made in respect of the second and fourth embodiments.

Moreover, the support member 14 pivotably supports the operating pedal 12C also in the vehicle operating pedal apparatus 10C of the third embodiment. When the angle of rotation of the operating pedal 12C is detected, the magnet 58C is used. The magnet 58C is housed in the magnet holder 54C in the engaged state. The magnet holder 54C is fixed to the operating pedal 12C by the snap-fit portion 74C and the mounting hole 78C, and the groove mechanism 130C and the cut groove 126C. In terms of the snap-fit portion 74C and the mounting hole 78C, the magnet holder 54C is fixed to the operating pedal 12C with the pressing force FC in the front-and-back direction. In contrast, in terms of the groove mechanism 130C and the cut groove 126C, the magnet holder 54C is fixed to the operating pedal 12C with the pressing force FC in the up-and-down direction that is different from the front-and-back direction. In this manner, in the vehicle operating pedal apparatus 10C of the third embodiment, the magnet 58C for detecting the angle of rotation of the operating pedal 12C is mounted on the operating pedal 12C via the magnet holder 54C that is fixed to the operating pedal 12C with the two pressing forces FC in the different directions. Hence, the accuracy of the mounting position of the magnet 58C is secured, and the magnet 58C resists being detached from the operating pedal 12C.

The same point can be made in respect of the fifth embodiment.

Moreover, the vehicle operating pedal apparatus 10A of the first embodiment includes the first snap-fit portion 74A and the second snap-fit portion 76A, which are provided to the magnet holder 54A, and the first mounting hole 78A and the second mounting hole 80A, which are provided to the operating pedal 12A. When the magnet holder 54A is fixed to the operating pedal 12A, the first snap-fit portion 74A of the magnet holder 54A is inserted into the first mounting hole 78A of the operating pedal 12A. In contrast, the second snap-fit portion 76A of the magnet holder 54A is inserted into the second mounting hole 80A of the operating pedal 12A in the left-and-right direction that is the same direction as the insertion direction of the first snap-fit portion 74A of the magnet holder 54A. Consequently, in the vehicle operating pedal apparatus 10A of the first embodiment, the work of fixing the magnet holder 54A to the operating pedal 12A is easy.

The same point can be made in respect of the second and fourth embodiments.

Moreover, the vehicle operating pedal apparatus 10C of the third embodiment includes the snap-fit portion 74C and the groove mechanism 130C, which are provided to the magnet holder 54C, and the mounting hole 78C and the cut groove 126C, which are provided to the operating pedal 12C. When the magnet holder 54C is fixed to the operating pedal 12C, the snap-fit portion 74C of the magnet holder 54C is inserted into the mounting hole 78C of the operating pedal 12C. In contrast, the groove mechanism 130C of the magnet holder 54C is inserted into the cut groove 126C of the operating pedal 12C in the front-and-back direction that is different from the left-and-right direction being the insertion direction of the snap-fit portion 74C of the magnet holder 54C. Consequently, in the vehicle operating pedal apparatus 10C of the third embodiment, the snap-fit portion 74C and the groove mechanism 130C of the magnet holder 54C are inserted into the mounting hole 78C and the cut groove 126C of the operating pedal 12C in the different directions. Hence, the magnet holder 54C is firmly fixed to the operating pedal 12C, which prevents the magnet holder 54C from wobbling.

The same point can be made in respect of the fifth embodiment.

Moreover, in the vehicle operating pedal apparatus 10A of the first embodiment, the shafts 94A of the first snap-fit portion 74A and the second snap-fit portion 76A have a tapered shape with the shaft diameter 102A increasing from the proximal end 100A toward the head 96A. Hence, at least portions, which are close to the heads 96A, of the shafts 94A of the first snap-fit portion 74A and the second snap-fit portion 76A, which are provided to the magnet holder 54A, are pressed against the first mounting hole 78A and the second mounting hole 80A, which are provided to the operating pedal 12A. Therefore, in the vehicle operating pedal apparatus 10A of the first embodiment, the magnet holder 54A can be fixed to the operating pedal 12A by, for example, changing the thickness of the operating pedal 12A even if the depths of the first mounting hole 78A and the second mounting hole 80A, into which the shafts 94A are inserted, change.

The same point can be made in respect of the second embodiment.

Moreover, in the vehicle operating pedal apparatus 10C of the third embodiment, the snap-fit portion 74C and the groove mechanism 130C are inserted into the mounting hole 78C and the cut groove 126C in the different directions as mentioned above. The groove mechanism 130C is provided with the crush ribs 136C on the side surface (circumferential edge) on the distal end side of the shaft 132C of the groove mechanism 130C. The crush ribs 136C deform when the groove mechanism 130C is inserted into the cut groove 126C, and the pressing force FC of the groove mechanism 130C and the cut groove 126C is generated. Consequently, in the vehicle operating pedal apparatus 10C of the third embodiment, the magnet holder 54C is firmly fixed to the operating pedal 12C, which prevents the magnet holder 54C from wobbling.

The same point can be made in respect of the fifth embodiment.

Moreover, in the vehicle operating pedal apparatus 10A of the first embodiment, the support member 14 pivotably supports the operating pedal 12A as mentioned above. When the angle of rotation of the operating pedal 12A is detected, the magnet 58A is used. The magnet 58A is in the recessed portion 72A of the magnet holder 54A by being placed through the opening 82A of the recessed portion 72A. Furthermore, when the magnet holder 54A is fixed to the operating pedal 12A, the opening 82A of the recessed portion 72A is blocked by the operating pedal 12A. In this manner, in the vehicle operating pedal apparatus 10A of the first embodiment, the magnet 58A for detecting the angle of rotation of the operating pedal 12A is mounted on the operating pedal 12A by being sandwiched between the operating pedal 12A and the magnet holder 54A fixed to the operating pedal 12A. Hence, the magnet 58A resists being detached from the operating pedal 12A.

Parenthetically, the support member 14 is an example of a "vehicle member" in the embodiments.

Moreover, in the first, second, and fourth embodiments, the magnet holder 54 is an example of a "holder." The first snap-fit portion 74 and the first mounting hole 78 are examples of a "first fixing mechanism." The Y direction is an example of a "first direction." The second snap-fit portion 76 and the second mounting hole 80 are examples of a "second fixing mechanism." The Z direction is an example of a "second direction." The shaft 94 of the first snap-fit portion 74 is an example of a "first shaft." The first mounting hole 78 is an example of a "first insertion portion." The shaft 94 of the second snap-fit portion 76 is an example of a "second shaft." The second mounting hole 80 is an example of a "second insertion portion." The left-and-right direction is an example of an "insertion direction" and the "same direction."

Moreover, in the first and second embodiments, the head 96 of the first snap-fit portion 74 and the head 96 of the second snap-fit portion 76 are examples of a "distal end."

Moreover, in the third and fifth embodiments, the magnet holder 54 is an example of the "holder." The snap-fit portion 74 and the mounting hole 78 are examples of the "first fixing mechanism." The front-and-back direction is an example of the "first direction." The groove mechanism 130 and the cut groove 126 are examples of the "second fixing mechanism."

The up-and-down direction is an example of the "second direction." The shaft 94 of the snap-fit portion 74 is an example of the "first shaft." The mounting hole 78 is an example of the "first insertion portion." The shaft 132 of the groove mechanism 130 is an example of the "second shaft." The cut groove 126 is an example of the "second insertion portion." The left-and-right direction is an example of the "insertion direction." The front-and-back direction is an example of a "direction different from the insertion direction." The crush rib 136 is an example of a "rib."

(7) Others

The present invention is not limited to the above embodiments, and can be modified in various manners within the scope that does not depart from the gist thereof.

For example, the shaft 94 of at least one of the first snap-fit portion 74 and the second snap-fit portion 76 may have a tapered shape in the first or second embodiment.

Figure 42:
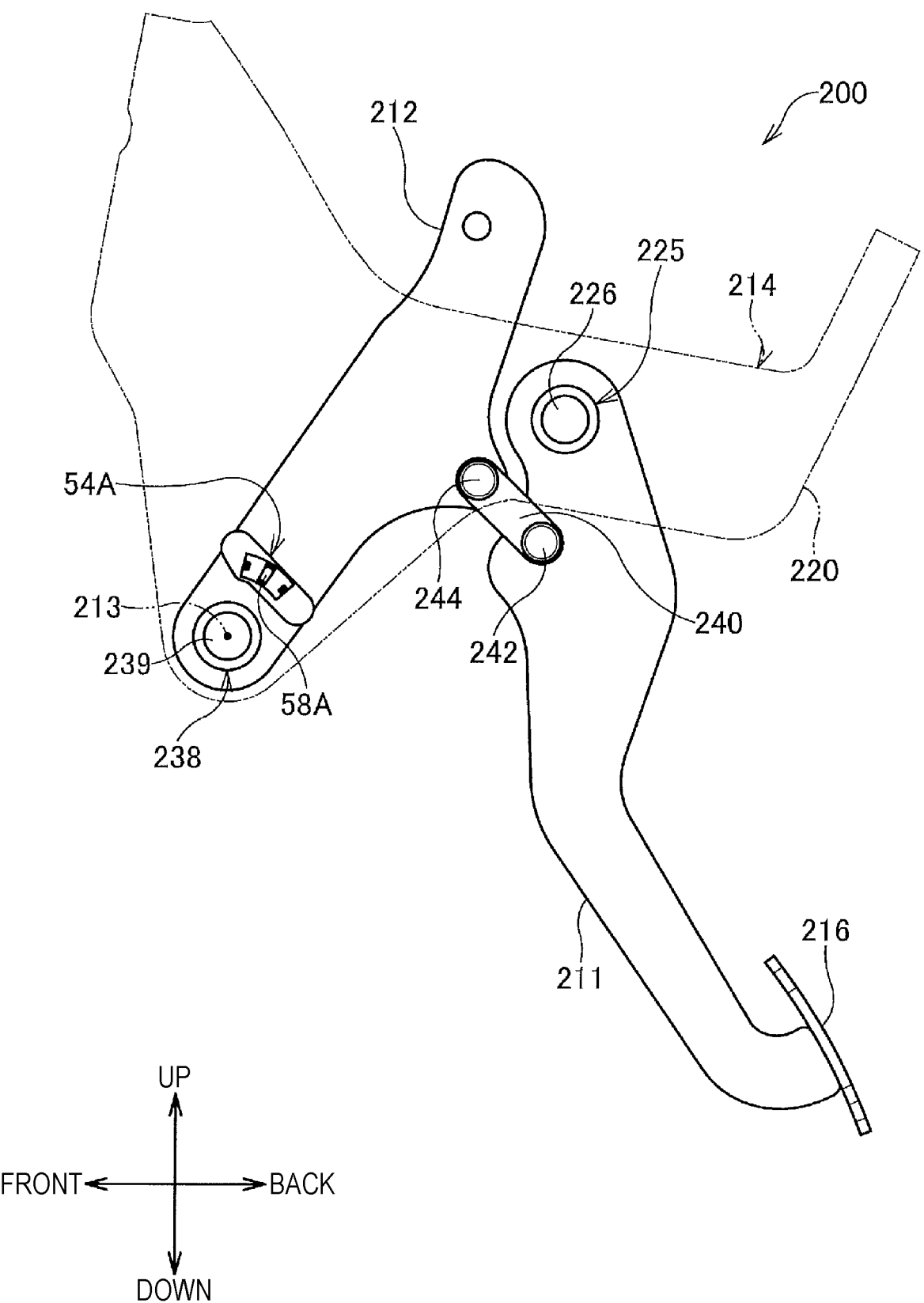
FIG. 42 is a side view illustrating a modification of a vehicle operating pedal apparatus.

Moreover, as illustrated in FIG. 42, the present invention may be carried out in a vehicle operating pedal apparatus 200 including what is called a link-type pedal mechanism. The vehicle operating pedal apparatus 200 includes a first operating pedal 211, a second operating pedal 212, and a pair of support members 214, and is installed on a vehicle.

The pair of support members 214 faces each other, spaced a predetermined distance apart from each other in the left-and-right direction, and is fixed to the vehicle (for example, the dash panel). In FIG. 42, a support member on the left side (hereinafter referred to as the "left support member") 220 of the pair of support members 214 is indicated by a chain double-dashed line, and a support member on the right side is not illustrated.

A first shaft 225 is placed at the upper end of the first operating pedal 211. The first shaft 225 includes a pivot bolt 226, pivot holes provided in the pair of support members 214, and a tubular boss, collar, bushing, nut, and the like that are provided to the first operating pedal 211 as in the pivot support structure of the operating pedal 12A according to the first embodiment. Consequently, the first operating pedal 211 is pivotably supported by the first shaft 225 between the pair of support members 214. A tread 216 is provided at the lower end of the first operating pedal 211. Therefore, the tread 216 can pivot relative to the pair of support members 214.

A second shaft 238 is placed at the lower end of the second operating pedal 212. The second shaft 238 includes a pivot bolt 239, pivot holes provided in the pair of support members 214, and a tubular boss, collar, bushing, nut, and the like that are provided to the second operating pedal 212 as in the pivot support structure of the operating pedal 12A according to the first embodiment. Consequently, the second operating pedal 112 is pivotably supported by the second shaft 238 between the pair of support members 214. A point indicated by a reference sign 213 indicates a pivot center line that is the pivot of the rotation of the second operating pedal 212 in a length direction of the pivot center line (the left-and-right direction). The midpoint of the second operating pedal 212 is coupled to the first operating pedal 211 by a link member 240 between the upper end and the lower end of the first operating pedal 211.

The link member 240 includes a first link pin 242 and a second link pin 244. The first link pin 242 is placed in the back part of the link member 240, and couples the link member 240 and the first operating pedal 211. Hence, the first link pin 242 supports the link member 240 in such a manner that the link member 240 is pivotable relative to the first operating pedal 211. In contrast, the second link pin 244 is placed in the front part of the link member 240 and couples the link member 240 and the second operating pedal 212. Hence, the second link pin 244 supports the link member 240 in such a manner that the link member 240 is pivotable relative to the second operating pedal 212.

Therefore, in the vehicle operating pedal apparatus 200, when the tread 216 at the lower end of the first operating pedal 211 is stepped forward, the first operating pedal 211 pivots on the first shaft 225. Such pivotal rotation of the first operating pedal 211 is transmitted to the second operating pedal 212 via the link member 240. Consequently, the second operating pedal 212 pivots on the pivot center line 213. An angle sensor detects the angle of rotation of the second operating pedal 212. However, in the modification, the illustrations of an IC holder and an IC among the components of the angle sensor are omitted. The IC is placed between the left support member 220 and the left side surface of the lower end of the second operating pedal 212.

The magnet holder 54A is fixed to the left side surface of the lower end of the second operating pedal 212 as in the first embodiment. Consequently, the magnet 58A of the magnet holder 54A is located in the form of an arc formed with a radius substantially equal to a distance between the pivot center line 213 and the IC.

Parenthetically, the second operating pedal 212 is an example of an "operating pedal" in such a modification.

LIST OF REFERENCE SIGNS

10 Vehicle operating pedal apparatus
12 Operating pedal
14 Support member
54 Magnet holder
58 Magnet
72 Recessed portion
74 Snap-fit portion
76 Snap-fit portion
82 Opening
78 Mounting hole
80 Mounting hole
92 Shaft
96 Head
100 Proximal end
102 Shaft diameter
126 Cut groove
130 Groove mechanism
132 Shaft
136 Crush rib
F Pressing force
200 Vehicle operating pedal apparatus
212 Second operating pedal

The invention claimed is:

1. A vehicle operating pedal apparatus comprising:
   an operating pedal pivotably supported by a vehicle member;
   a magnet used to detect the angle of rotation of the operating pedal;
   a holder housing the magnet in an engaged state;
   a first fixing mechanism configured to fix the holder to the operating pedal with a Dressing force in a first direction; and
   a second fixing mechanism configured to fix the holder to the operating pedal with a pressing force in a second direction different from the first direction, wherein
   the first fixing mechanism includes:
   a first shaft provided to the holder; and a first insertion portion provided to the operating pedal, into which the first shaft is inserted, and the second fixing mechanism includes:

a second shaft provided to the holder; and a second insertion portion provided to the operating pedal, into which the second shaft is inserted in the same direction as an insertion direction of the first shaft.

2. The vehicle operating pedal apparatus according to claim 1, wherein at least one of the first and second shafts has a tapered shape with a shaft diameter increasing from a proximal end toward a distal end.

3. A vehicle operating pedal apparatus comprising:

an operating pedal pivotably supported by a vehicle member;

a magnet used to detect the angle of rotation of the operating pedal;

a holder housing the magnet in an engaged state;

a first fixing mechanism configured to fix the holder to the operating pedal with a pressing force in a first direction; and a second fixing mechanism configured to fix the holder to the operating pedal with a pressing force in a second direction different from the first direction, wherein the first fixing mechanism includes:

a first shaft provided to the holder; and a first insertion portion provided to the operating pedal, into which the first shaft is inserted, and the second fixing mechanism includes:

a second shaft provided to the holder; and a second insertion portion provided to the operating pedal, into which the second shaft is inserted in a direction different from an insertion direction of the first shaft.

4. The vehicle operating pedal apparatus according to claim 3, wherein the first or second shaft includes a rib provided on a circumferential edge on a distal end side, the rib being configured to deform upon being inserted into the first or second insertion portion.

* * * * *

UNITED STATES PATENT AND TRADEMARK OFFICE
CERTIFICATE OF CORRECTION

| | | |
|---|---|---|
| PATENT NO. | : 12,013,714 B2 | Page 1 of 1 |
| APPLICATION NO. | : 17/998267 | |
| DATED | : June 18, 2024 | |
| INVENTOR(S) | : Tomohiro Tuguma | |

It is certified that error appears in the above-identified patent and that said Letters Patent is hereby corrected as shown below:

In the Claims

Column 22, Line 61, "with a Dressing force" should read --with a pressing force--.

Signed and Sealed this
Twenty-fourth Day of December, 2024

Derrick Brent
*Acting Director of the United States Patent and Trademark Office*